United States Patent
Willoughby et al.

(10) Patent No.: US 6,549,880 B1
(45) Date of Patent: Apr. 15, 2003

(54) RELIABILITY OF ELECTRICAL DISTRIBUTION NETWORKS

(75) Inventors: Ronald D. Willoughby, Waukesha, WI (US); James D. Foster, Burlington, WI (US)

(73) Assignee: McGraw Edison Company, Houston, TX (US)

( * ) Notice: Subject to any disclaimer, the term of this patent is extended or adjusted under 35 U.S.C. 154(b) by 0 days.

(21) Appl. No.: 09/396,473

(22) Filed: Sep. 15, 1999

(51) Int. Cl.$^7$ ................................................. G06F 17/50
(52) U.S. Cl. ........................... 703/13; 703/16; 706/46; 700/22; 700/286
(58) Field of Search ............................ 703/14, 16, 17, 703/13; 702/67; 700/286, 22; 706/10, 46, 51, 59, 61

(56) References Cited

U.S. PATENT DOCUMENTS

| | | | |
|---|---|---|---|
| 4,975,865 A | * 12/1990 | Carrette et al. | 364/513 |
| 5,751,592 A | * 5/1998 | Takai et al. | 364/488 |
| 5,768,148 A | * 6/1998 | Murphy et al. | 364/492 |
| 5,862,391 A | * 1/1999 | Salas et al. | 395/750.01 |

OTHER PUBLICATIONS

"V–GRAPH™ The Graphical Database Verdict™ One–line Diagram and Database Programs"; Electrical Apparatus 200–101, Nov. 1995, pp. 1–4, Cooper Power Systems.

"V–PRO® II The Protection Verdict™ Overcurrent Protection Program"; Electrical Apparatus 200–104, Feb. 1996, pp. 1–4, Cooper Power Systems.

"Power Verdict™ Series Software", Programs to Analyze System Operations from Systems Engineering, Nov. 1996, pp. 1–4, Cooper Power Systems.

D. G. Flinn, "Engineering Analysis Takes an Interactive View"; ISSN 0895–0156/95/1995 IEEE; IEEE Computer Applications in Power; Oct. 1995, pp. 39–42.

Mathew St. John et al., "Coordinating Overcurrent Protection Devices", ISSN 0895/96/1996 IEEE; IEEE Computer Applications in Power; Jul. 1996, pp. 41–44.

(List continued on next page.)

*Primary Examiner*—Kevin J. Teska
*Assistant Examiner*—T. Phan
(74) *Attorney, Agent, or Firm*—Fish & Richardson P.C.

(57) ABSTRACT

A computer-implemented system analyzes user-inputted hypothetical situations of an electrical distribution network design and automatically interprets, based on user input, a need to conduct analyses that improve reliability of the electrical distribution network. The computer-implemented system includes a storage device configured to store different configurations of the distribution network, data corresponding to elements of the distribution network, and a set of engineering analysis modules. The computer-implemented system includes a controller configured to display and use a graphical user interface (GUI) to prompt a user to answer one or more questions about the distribution network. The controller is configured to receive answers and data from the user and retrieve data corresponding to elements of the distribution network. Then, the controller automatically selects and runs one or more of the engineering analysis modules based on the received answers. Moreover, the controller automatically performs a reliability analysis of the distribution network based on the retrieved network data. The user data may include an engineering analysis module selection. The controller is configured to access one or more engineering analysis modules based on the engineering analysis module selection by the user. Based on the received user data and retrieved distribution network data, the controller poses hypothetical situations to the user to determine a distribution network design that improves reliability.

21 Claims, 61 Drawing Sheets

OTHER PUBLICATIONS 4.0 Phase 4–13 Scope and Deliverables: ADVISER™ 1.0; Proposal No. AIU–9609; Nov. 1996, pp. 1–12, Cooper Power Systems.
"Root Cause Analysis Software: Sample Screens" (Appendix D); Nov. 1996, pp. 1–3, Cooper Power Systems.
"ADVISER™ 1.0 Package: Sample Screens" (Appendix E); Nov. 1996, pp. 1–8, Cooper Power Systems.
"Monte Carlo Methods and Markov Chains" (Appenix F); Nov. 1996pp. 1–5, Cooper Power Systems.
"System Loss Evaluation Is key To Reducing Costs"; Cooper Ind. Bulletin 98043; Jan. 1999, pp. 1–2.
"Distribution Reliability Improvements"; Cooper Ind. Bulletin 98044; Sep. 1998, pp. 1–2.
Jim Foster "Tuning out Harmonic Problems"; Plant Engineering Electrical; May 16, 1991, pp. 1–4.
"V–HARM™ The Harmonic Verdict™ PowerSystem Harmonics Simulation Software Program" Cooper Ind. Bulletin 85034; Sep. 1991, pp. 1–2.
"V–CAP™ The Circuit Analysis Verdict™ Regulator and Capacitor Application Program" Electrical Apparatus 200–1–2; Nov. 1995, pp. 1–4, Cooper Power Systems.
Ronald Willoughby et al. "Harmonic Filters provide The Key TO Plant Reliability"; Power Reliability reprint from Pulp & Paper Europe; Apr. 1996, pp. 1–2.
"Overcurrent Protection Coordinator"; Cooper Ind. Bulletin 97045; 1997, pp. 1–5, Cooper Power Systems.

* cited by examiner

| Short Duration Variations | Duration | Voltage Magnitude |
|---|---|---|
| *Instantaneous* | | |
| Sag | 0.5 to 30 cycles | 0.1 to 0.9 per unit |
| Swell | 0.5 to 30 cycles | 1.1 to 1.9 per unit |
| *Momentary* | | |
| Interruption | 0.5 cycles to 3 s | <0.1 per unit |
| Sag | 30 cycles to 3 s | 0.1 to 0.9 per unit |
| Swell | 30 cycles to 3 s | 1.1 to 1.8 per unit |
| *Temporary* | | |
| Interruption | 3 s to 1 min | <0.1 per unit |
| Sag | 3 s to 1 min | 0.1 to 0.9 per unit |
| Swell | 3 s to 1 min | 1.1 to 1.8 per unit |
| Long Duration Variations | | |
| Sustained Interruption | >1.0 min | 0.0 per unit |
| Undervoltage | >1 min | 0.8 to 0.9 per unit |
| Overvoltage | >1 min | 1.1 to 1.2 per unit |

FIG. 5

| Equipment | Equipment Subclass | Failure Rate* | Hours of Downtime per Failure | | Average Replacement Time (Hours per Failure) |
|---|---|---|---|---|---|
| | | | Industry Average | Median | |
| Transformers | Oil Filled - All | 0.0062 | 356.1 | --- | 85.1 |
| | 300 - 10,000 kVA | 0.0059 | 297.4 | --- | 79.3 |
| | 10,000 + kVA | 0.0153 | 1178.5* | --- | 192.0** |
| Motors > 200 hp | Induction | | | | |
| | 0 - 1000 V | 0.0824 | 42.5 | 15.0 | --- |
| | 1001 - 5000V | 0.0714 | 75.1 | 12.0 | --- |
| | Synchronous | | | | |
| | 1001 - 5000V | 0.0762 | 78.9 | 16.0 | --- |
| Circuit Breakers | Fixed (Including Molded Case) - All | 0.0052 | 5.8 | 4.0 | --- |
| | Metalclad Drawout Type - All | 0.0030 | 129.0 | 7.6 | --- |
| Generators | Continuous Service Steam Turbine | 0.1691 | 32.7 | --- | --- |
| Disconnect Switches | Enclosed | 0.006100 | 1.6 | 2.8 | --- |

FIG. 7A

FIG. 7B

| Equipment | Equipment Subclass | Failure Rate* | Hours of Downtime per Failure | | Average Replacement Time (Hours per Failure) |
|---|---|---|---|---|---|
| | | | Industry Average | Median | |
| Switchgear | Insulated: 601 - 15,000 V | 0.001129 | 261.0 | 28.0 | --- |
| | Bare: 0-600 V | 0.000802 | 550.0 | 27.0 | --- |
| | Bare: Above 600 V | 0.001917 | 17.3 | 36.0 | --- |
| Open Wire (per 1000 Circuit Ft.) | 0-15,000 V | 0.01890 | 42.5 | 4.0 | --- |
| | Above 15,000 V | 0.00750 | 17.5 | 12.0 | --- |
| Cable - All (1000 Circuit Ft.) | Above Ground and Aerial | | | | |
| | 0-600 V | 0.00141 | 457.0 | 10.5 | --- |
| | 601-15,000 V - All | 0.01410 | 40.4 | 6.9 | --- |
| | Below Ground and Direct Burial | | | | |
| | 0-600 V | 0.00388 | 15.0 | 24.0 | --- |
| | 601-15,000V - All | 0.00617 | 95.5 | 35.0 | --- |
| | Above 15,000 V | 0.00336 | 16.0 | 16.0 | --- |
| Cable Joints - All | 601-15,000 V | | | | |
| | In Duct or Conduit Below Ground | 0.000864 | 36.1 | 31.2 | --- |

Source of Data: IEEE Gold Book

| i | Date | Time | Time on | Ckt | Event code | # Cust (Ni) | Load (kVA) | Interrupt type |
|---|------|------|---------|-----|------------|-------------|------------|----------------|
| 1 | 3/17 | 12:12:20 | 12:20:30 | 7075 | 107 | 200 | 800 | S |
| 2 | 4/15 | 18:23:56 | 18:24:26 | 7075 | 256 | 400 | 1600 | M |
| 3 | 5/5 | 00:23:10 | 01:34:29 | 7075 | 435 | 600 | 1800 | S |
| 4 | 6/12 | 23:17:00 | 23:47:14 | 7075 | 567 | 25 | 75 | S |
| 5 | 7/6 | 09:30:10 | 09:31:10 | 7075 | 678 | 2000 | 4000 | M |
| 6 | 8/20 | 15:45:39 | 20:12:50 | 7075 | 832 | 90 | 500 | S |
| 7 | 8/31 | 08:20:00 | 10:20:00 | 7075 | 1003 | 700 | 2100 | S |
| 8 | 9/3 | 17:10:00 | 17:20:00 | 7075 | 1100 | 1500 | 3000 | S |
| 9 | 10/27 | 10:15:00 | 10:55:00 | 7075 | 1356 | 100 | 200 | S |

FIG. 17

DRT = Damage Restoration Time
MRT = Manual Restoration Time
FIR = Fault Incident Rate
FPF = Fraction of Permanent Faults

2050 →

| Line Name | BUS From/To | Length | Repeat | Block Flag | Customers |
|---|---|---|---|---|---|
| Line1 | Bus1 Bus2 | 0.200(miles) | No | No | Type 1 - 30, 30, 30 Type 2 - 0, 0, 0 Type 3 - 0, 0, 0 |
| Line2 | Bus3 Bus4 | 1.000(miles) | No | No | Type 1 - 20, 20, 20 Type 2 - 0, 0, 0 Type 3 - 0, 0, 0 |
| Line3 | Bus3 Bus5 | 1.000(miles) | No | No | Type 1 - 30, 30, 30 Type 2 - 0, 0, 0 Type 3 - 0, 0, 0 |

*FIG. 20B-1*

DRT = Damage Restoration Time
MRT = Manual Restoration Time
FIR = Fault Incident Rate
FPF = Fraction of Permanent Faults

2050 →

| Restoration Time | | FIR | FPF |
|---|---|---|---|
| DRT | MRT | | |
| 3.000 | 1.500 | Phase 1 0.220<br>Phase 2 0.220<br>Phase 3 0.220 | Phase 1 0.200<br>Phase 2 0.200<br>Phase 3 0.200 |
| 3.000 | 1.500 | Phase 1 0.220<br>Phase 2 0.220<br>Phase 3 0.220 | Phase 1 0.200<br>Phase 2 0.200<br>Phase 3 0.200 |
| 3.000 | 1.500 | Phase 1 0.220<br>Phase 2 0.220<br>Phase 3 0.220 | Phase 1 0.200<br>Phase 2 0.200<br>Phase 3 0.200 |

*FIG. 20B-2*

V-CAP - Economic Results

Economic Summary
(in thousands of dollars)

| Case Name | Lost Cost | Cost of Substation Capacity | Cost of Generation Capacity | Capacitor Cost | Regulator Cost | Change From Base Case |
|---|---|---|---|---|---|---|
| Base Case | 3.81 | 90.97 | 0.00 | 0.00 | 0.00 | -0.00 |
| Optimize | 2.99 | 77.66 | 0.00 | 4.32 | 0.00 | -9.81 |

V-CAP - System Results Table

General Results Summary
(Single Phase Quantities)

| Bus Name | V Mag(kV) | V Phase(°) | I (A) | kW | kVar | PF | |
|---|---|---|---|---|---|---|---|
| Bus 1 | | | | | | | |
| A | 0.9974 | -0.1 | 85.2 | 1667.8 | 527.5 | 0.958 | LAG |
| B | 0.9982 | -120.1 | 69.8 | 1352.4 | 310.7 | 0.975 | LAG |
| C | 0.9896 | +119.9 | 42.6 | 848.0 | -70.0 | 0.987 | LEAD |
| Bus 2 | | | | | | | |
| A | 0.9786 | -4.0 | 295.6 | 1595.7 | 406.6 | 0.969 | LAG |
| B | 0.9870 | -123.4 | 193.1 | 1344.3 | 229.7 | 0.986 | LAG |
| C | 0.9896 | +117.9 | 118.0 | 842.0 | -128.2 | 0.942 | LEAD |
| Bus 3 | | | | | | | |

*FIG. 30C*

RELIABILITY OF ELECTRICAL DISTRIBUTION NETWORKS

TECHNOLOGY FIELD

The invention relates generally to power distribution system reliability, and more specifically to a reliability optimization workstation for use in monitoring and evaluating a power distribution system.

BACKGROUND

Reliability may be defined generally as a probability that a particular system, where a system may include a device or product, will perform satisfactorily for at least a predetermined period of time when used under a set of predetermined conditions.

Well-known examples of systems include television sets, automobiles, video cassette recorders, light bulbs, refrigerators, washing machines, personal computers, furnaces, and air conditioners. When a particularly inexpensive system, such as a light bulb, a video cassette, or a ball point pen, fails, a user of the system is likely to discard and replace it. On the other hand, when a particularly expensive system, such as an automobile, a furnace, an air conditioner, or a television set, fails, a user of the system is likely to repair, rather than discard, the system. Generally, the ultimate decision of whether to replace or repair a failed system is based on economics. More particularly, a user of the failed system is compelled to evaluate whether it is less expensive to get the device repaired or to buy a new one.

SUMMARY

The invention provides a computer-implemented system for use in improving reliability of an electrical distribution network. To this end, the system includes a storage device configured to store different configurations of the distribution network, data corresponding to elements of the distribution network, and a set of engineering analysis modules.

In one general aspect, the system includes a processor configured to display and use a graphical user interface (GUI) to prompt a user to answer one or more questions about the distribution network. The processor is configured to receive answers from the user and retrieve data corresponding to elements of the distribution network Then, the processor automatically selects and runs one or more of the engineering analysis modules based on the received answers. Moreover, the processor automatically performs a reliability analysis of the distribution network based on the retrieved data.

Implementations may include one or more of the following features. Performing the reliability analysis may include running one or more of the engineering analysis modules.

The set of engineering analysis modules may include a reliability module that causes the processor to compute distribution network reliability indices. A power flow module may be included in the set of engineering analysis modules, the power flow module causing the processor to compute load or power flow for three-phase balanced distribution networks. The set of engineering analysis modules may also include a short circuit module that causes the processor to analyze currents and voltages in the distribution network for short circuit situations. The set of engineering analysis modules may further include a protection module that causes the processor to coordinate action of overcurrent devices in the distribution network. An unbalanced power flow module may be included in the set of engineering analysis modules, the unbalanced power flow module causing the processor to compute load or power flow for three-phase unbalanced distribution networks. The set of engineering analysis modules may include a capacitor bank placement module that causes the processor to determine size and location of capacitor banks or voltage regulators and apply economic factors. A harmonics module may also be included in the set of engineering analysis modules. The harmonics module causes the processor to calculate steady-state harmonic frequency levels throughout the distribution network.

The computer-implemented system may further include an external database associated with a utility company that supports the electrical distribution network. The processor may be configured to select and run an engineering analysis module included in the external database.

The processor may be configured to display a visual representation of the distribution network. Moreover, the visual representation may include a one-line circuit diagram. Likewise, the processor may be configured to display commands and tools that enable the user to manipulate the visual representation. The processor may be configured to display results of the reliability analysis.

In another general aspect, the computer-implemented system includes a controller configured to display a graphical user interface and receive data from a user. The user data includes an engineering analysis module selection. The controller is configured to retrieve data corresponding to elements of the distribution network, and access one or more engineering analysis modules based on the engineering analysis module selection. Based on the received user data and distribution network data, the controller computes reliability indices of the distribution network to improve distribution network reliability. Furthermore, based on the received user data and distribution network data, the controller poses hypothetical situations to the user to determine a distribution network design that improves reliability.

Implementations may include one or more of the following features. The computer-implemented system may further include an expert system that causes the controller to prompt the user to answer one or more questions about the distribution network. The expert system automatically selects and runs one or more of the engineering analysis modules based on received answers.

The set of engineering analysis modules may include a reliability module that causes the controller to compute distribution network reliability indices. The set of engineering analysis modules may also include a power flow module that causes the controller to compute load or power flow for three-phase balanced distribution networks. A short circuit module may be included in the set of engineering analysis modules. The short circuit module causes the controller to analyze current and voltages in the distribution network for short circuit situations. A protection module may also be included in the set of engineering analysis modules. The protection module causes the controller to coordinate action of overcurrent devices in the distribution network. The set of engineering analysis module may further include an unbalanced power flow module that causes the controller to compute load or power flow for three-phase unbalanced distribution networks. A capacitor bank placement module that may be included in the set of engineering analysis modules causes the controller to determine size and location of capacitor banks or voltage regulators. Lastly, a harmonics module that may be included in the set of engineering analysis modules causes the controller to calculate steady-state harmonic frequency levels throughout the distribution network.

The computer-implemented system may also include an external database associated with a utility company that supports the electrical distribution network. The controller may be configured to select and run an engineering analysis module included in the external database.

The controller may be configured to display a visual representation of the distribution network. The visual representation may include a one-line circuit diagram. The controller may be configured to display commands and tools that enable the user to manipulate the visual representation. The controller may be configured to display results of the computed reliability indices and the determined distribution network design that improves reliability.

A reliability index may include a frequency or duration of outages in the distribution network. The reliability indices may include standard indices recommended by the Institute of Electrical and Electronics Engineers (IEEE).

Other features and advantages will be apparent from the following description, including the drawings, and from the claims.

DESCRIPTION OF THE DRAWINGS

FIG. 5 is a table of IEEE P1159 Definitions of root-mean-squared (rms) voltage disturbances found in a power distribution system.

FIG. 7 is a table of reliability data for equipment used in a power distribution system.

FIG. 17 is a table of a utility's customer information system database for a particular feeder on a distribution system.

FIG. 20B is a reliability report for feeder lines of FIG. 19.

FIGS. 30B and 30C are windows showing results of implementing the capacitor bank placement module.

DETAILED DESCRIPTION

Figure 1:
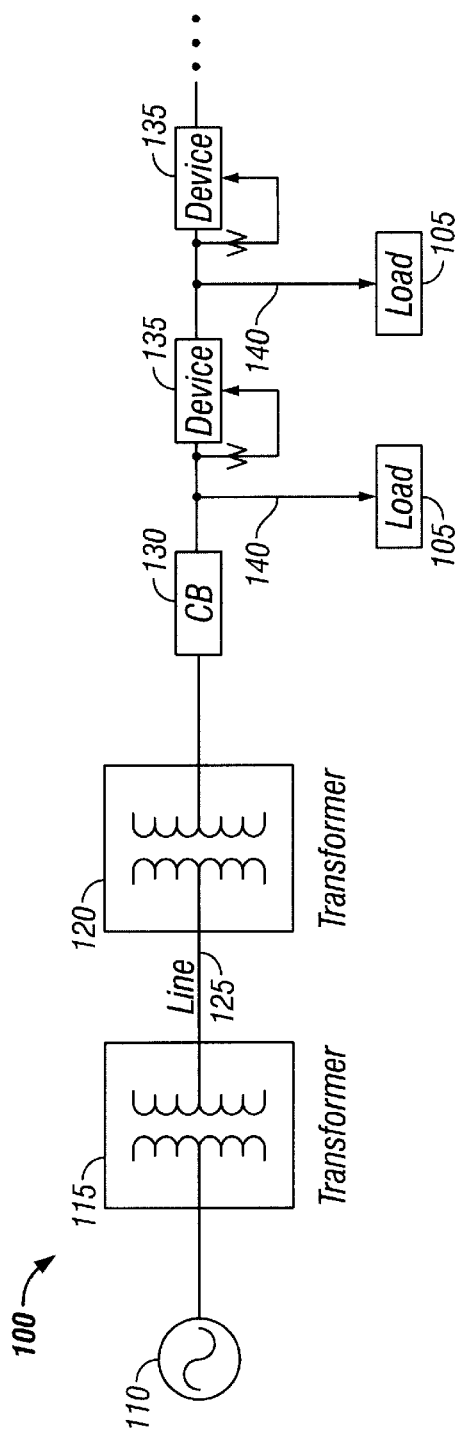
FIG. 1 is a block diagram of a generalized power distribution system.

Referring to FIG. 1, a power distribution system 100 supplies electric power to one or more loads 105. Most major devices used in the power distribution system 100 are repairable. These major devices may include a generator 110, a set of transformers 115, 120, a distribution line 125, and one or more protective devices, such as a circuit breaker 130. The generator 110 supplies a low-voltage electric signal, and the first transformer 115 steps up the electrical signal from the generator 110 and transmits a high-voltage signal through the distribution line 125. The second transformer 120 steps down the higher-voltage signal to a level needed by the load 105. This setup ensures efficient transmission of electric power along line 125 while providing both efficient and safe generation (at generator 110) and consumption (at load 105). One or more protective devices 135 interrupt the signal if a fault occurs on any one of a string of feeder lines 140.

Often it is more economical to simply replace (rather than repair) distribution power system devices such as failed distribution transformers along feeder lines, capacitors, and fuses (not shown in FIG. 1).

Figure 2:
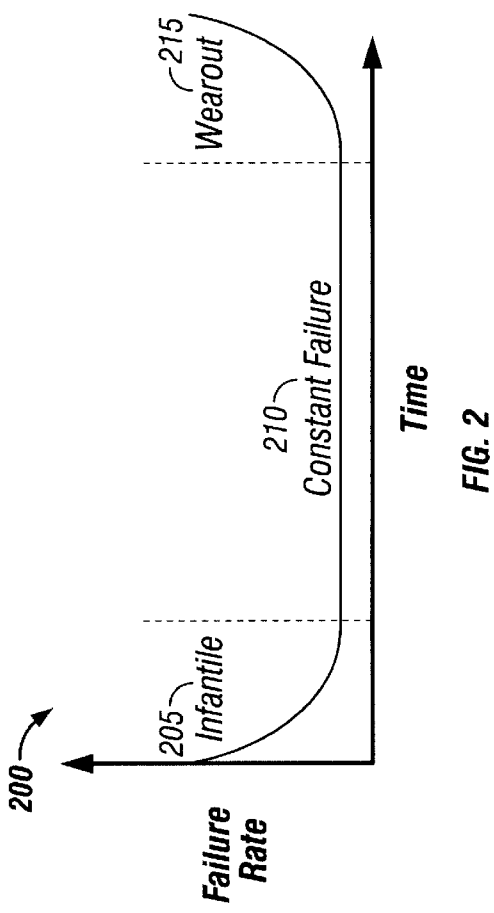
FIG. 2 is a graph of a model of a typical system failure rate.

Referring to FIG. 2, a graph 200 displays a model of a failure rate of a typical system, such as the power distribution system 100 versus time. This model is usually called a "bathtub curve" because its shape, which displays a common relationship of failure rate and time for such systems, resembles the shape of a bathtub. This failure rate model 200 is typical of many systems, including devices and products purchased by consumers.

Many users have bought products or devices that failed within a short time of initial use (for example, a new tire, a light bulb, or a toaster). These devices that fail within a short time of initial use probably failed due to a manufacturing defect (either in material or quality of work or design) or an application error (for example, incorrect ratings). These early failures may be referred to as infantile failures, and occur in an infantile interval 205 that ends early in the expected life of the device.

After the infantile interval 205, devices or systems tend to move into a constant failure rate time span 210 in which failures are random. After the constant failure interval, the devices enter a wearout interval 215 in which devices, particularly those with moving parts, fail due to wear.

The typical duration of the infantile interval 205 may be drastically reduced using one or more preventative measures. For example, a maker of the device may employ quality control of materials used in the device. Likewise, the maker of the device may inspect the quality of work used to build the device in addition to testing completed devices. Lastly, the maker of the device may "burn in" the device by initially operating the device under a high stress.

The wearout interval 215 may be practically eliminated by determining a useful lifetime of the device and retiring the device from service before it wears out. Fortunately, most electrical devices, such as resistors, integrated circuits, diodes, or capacitors, do not exhibit wearout. Electrical devices that do tend to wear out include cathode ray tubes (CRTs) and insulation systems such as those found in motors, generators, transformers, and cables. Typically, the life of these insulation systems is measured in years, if not decades.

Because reliability in both the infantile interval 205 and the wearout interval 215 can be reduced using the above measures, it is advantageous to improve reliability in the constant failure rate interval 210.

To reiterate, reliability is a probability that a system performs its intended function for a predefined period of time under specified operating conditions. This definition of reliability has four important elements that are discussed below.

First, reliability may be represented as a probability value between zero and one. Expressing reliability in this manner gives it a precise meaning and allows comparison of different systems or designs based on their corresponding probability values. For example, a reliability of 0.99 is interpreted to mean that, on average, 99 of 100 devices (or systems) will perform the intended function for a predefined time period under a predefined set of operating conditions.

Second, reliability for a system or device must have a time associated with it. For example, a transformer that has a reliability of 0.99 for 30 years would generally be viewed to be a higher quality device when compared with a transformer that has a reliability of 0.99 for 10 years.

Third, the intended function of the system or device must be defined, such as in a specification. A failure occurs when the device or system fails to perform its intended function or has been incorrectly applied. For example, if the device or system is a power distribution system 100, a failure of the system would depend on the definition of an outage in the system. Historically, a momentary outage would not have been considered when tallying outages. An outage was only counted if the protective device locked open resulting in a sustained outage. Outages that had a duration of less than two minutes, for example, were therefore ignored in the measurement and definition of system performance. On the other hand, in recent years, any loss of even a half cycle of voltage would be considered a problem by some customers. Therefore, the present measurement of system performance would be different from the prior measurement of system performance.

Fourth, operating conditions, including the type and amount of usage and the environment in which the product is used, must be specified when defining reliability. By specifying operating conditions, systems and devices may be designed and tested to measure the probability of survival of the device and/or system. Most power distribution systems are expected to operate in any and all extremes of, for example, temperature, humidity, rain, and snow. For example, power distribution systems are even expected to operate under the influence of lightning. The economic design of most power distribution systems would not result in the expectation that a line could successfully operate through a direct lightning strike. However, a momentary interruption of service would be expected to successfully clear the fault and restore service to customers.

Objective measures of reliability, such as reliability indices defined by the IEEE, remove arbitrary customer perceptions from the evaluation of reliability. However, many other variables still remain. Thus, it may be difficult to determine where resources should be allocated to improve the reliability of the power distribution system 100.

An unplanned customer outage is generally caused by a fault on a system operated by a utility company, which may include any company that provides a utility or service to residential, commercial, and industrial users. For example, an electric company, a cable television company, a telephone company, and a wireless communications company are all utility companies. Thus, an outage involves a loss of service such as a loss of electricity or a disruption in a cable television signal. In power distribution systems used by electric utility companies such as the simplified system 100 in FIG. 1, a fault is any event that causes an interruption in electric service to the load 105. The load 105 is usually a string of feeder lines (detailed in later figures) that supply electricity to customers—residential, commercial, and industrial.

Figure 3:
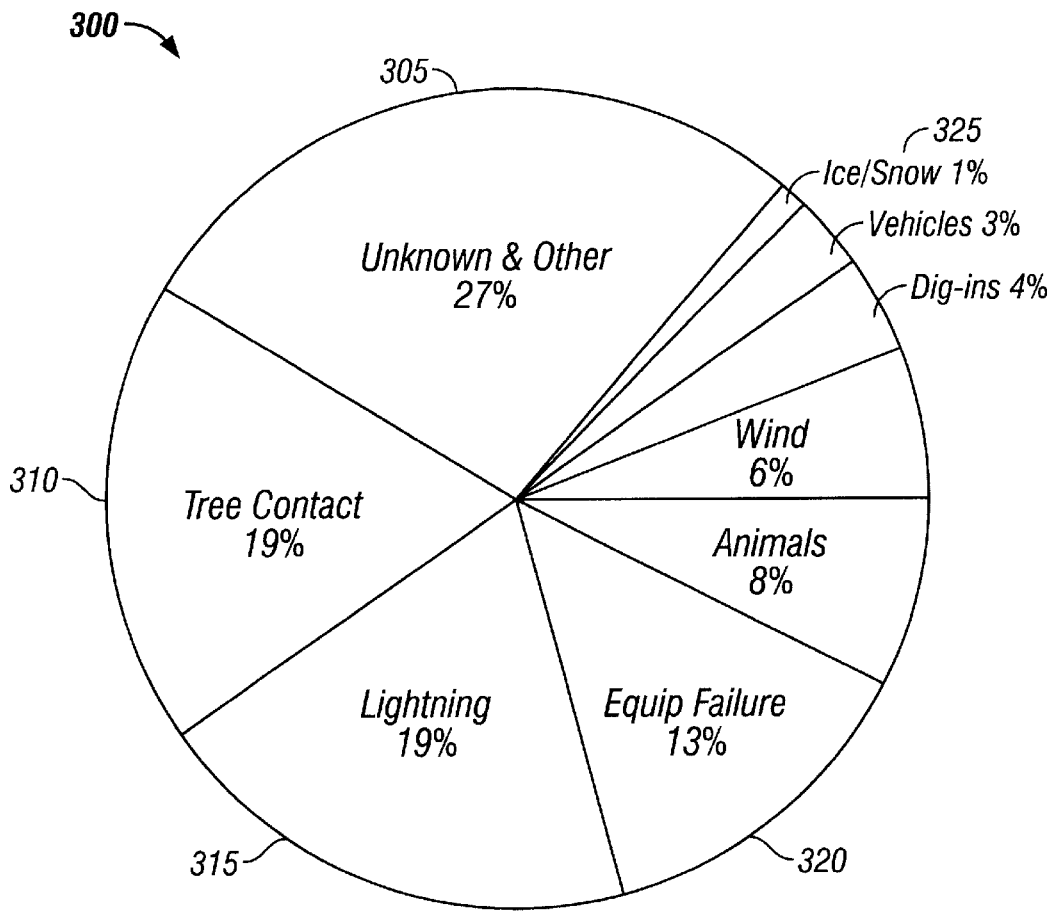
FIG. 3 is a chart showing common causes and relative frequencies of faults occurring in a power distribution system.

FIG. 3 shows some common causes of distribution system faults and their relative frequency in a pie chart 300, the data for which are based on a survey of 13 utilities throughout the United States. The most common cause of these faults, which occurs at a relative frequency of 27%, is classified as "Unknown & Other," as indicated by pie segment 305. The two second most common causes—tree contact 310 and lightning 315—each occur at relative frequencies of 19%. Furthermore, the third most common cause—equipment failure 320—occurs at a relative frequency of 13%.

Because the survey data for chart 300 was taken throughout the country, regional variances are not evident in the chart 300. For example, southern utility companies probably have a smaller number of ice/snow related faults, as shown in segment 325, than do northern utility companies. As another example, utility companies in Florida most likely deal with more faults due to lightning 315 than utility companies in the western or desert regions. Therefore, based on geography, environment, and demographics of customers that it serves, each utility company must deal with a unique distribution of fault causes.

Faults in power distribution systems 100 can be classified as either transient faults or permanent faults. Approximately 60% to 80% of all faults in distribution systems 100 are classified as transient, or temporary faults, and do not require corrective action to remove the fault from the power distribution system 100. Rather, transient faults can be automatically removed from the system 100 using overcurrent protection devices 135 such as reclosers or fuses. Typical causes of transient faults are lightning, wind that blows power lines together, or tree limbs that fall across two conductors and then soon after drop away. Transient faults also may be the result of arcs over porcelain surfaces of elements in the distribution system 100. These arcs often are caused by lightning and are plasmas that continue conducting after the initial lightning current has passed—a phenomena known as "power follow current." If the power follow current can be interrupted for a sufficient period of time, the plasma will dissipate and cease to be a conductor since the free electrons will re-combine with the ions in the arc. The duration of time for which the current needs to be extinguished to allow a successful reclose is not an exact science. Environmental factors, such as wind and relative humidity, are important. For example, wind velocity tends to disperse the ions, thus clearing the arc (plasma) quicker. Since cooling the arc is also important, ambient temperature is another influencing factor.

All non-transient faults are permanent faults. A permanent fault can be defined as one that will remain after the voltage has been removed for a period of time and then restored. This definition includes permanent-by-nature faults (for example, faults caused by a broken insulator or an automobile knocking down a pole), as well as faults that were initially transient-by-nature (for example, faults caused by lightning) but resulted in permanent damage because a protective device such as a fuse, recloser, relay, or breaker did not interrupt the fault current quickly enough. Often, a permanent fault results from metal-to-metal contact—for example, objects falling into phase conductors, fallen conductors and other physical damage to the system.

Figure 4:
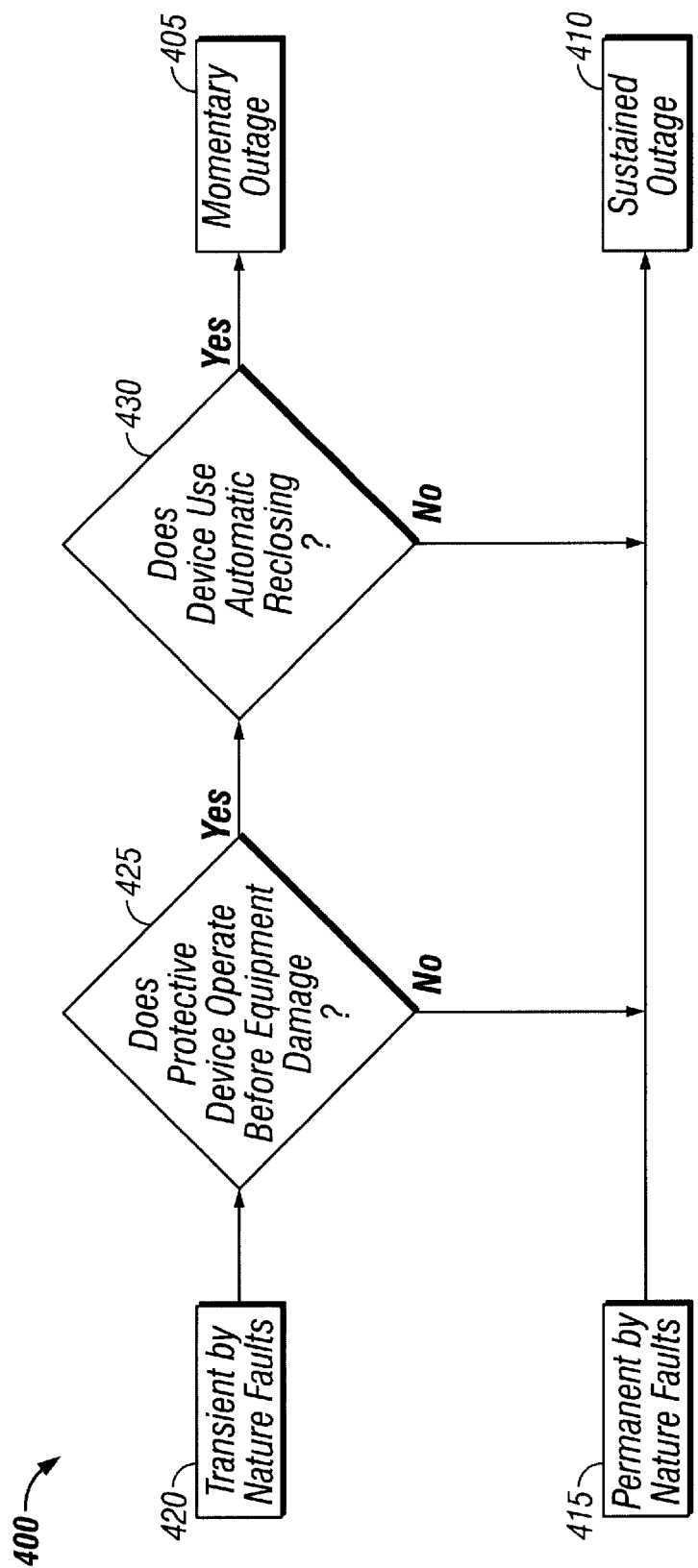
FIG. 4 is a flow chart showing relationships between outages and faults.

Referring also to a flow chart 400 of FIG. 4, faults may result in momentary outages 405, in which electric service is restored within an automatic reclosing interval, or sustained outages 410, in which electric service is not restored within the automatic reclosing interval. Because a permanent fault 415 requires corrective action, it always results in a sustained outage 410. A transient fault 420 may result in either a momentary outage 405 or a sustained outage 410. For example, if a protective device fails to operate to interrupt the transient fault 420 before equipment is damaged on the line, then the transient fault 420 results in a sustained outage 410 (step 425). If the protective device operates before equipment is damaged (step 425), but does not use automatic reclosing, the transient fault 420 results in a sustained outage 410 (step 430). The transient fault 420 will result in a momentary outage 405 if the protective device operates promptly (step 425) and uses automatic reclosing (step 430).

The fraction of faults that become permanent is influenced by the ability of the overcurrent device protecting the distribution line to keep transient faults 420 from turning into sustained outages 410 or permanent failures. For example, if the device interrupting the fault is a fuse, which inherently does not have reclosing capability, 100% of faults, whether transient or permanent, will cause a sustained outage 410. Now suppose that the fuse is replaced with a recloser. Since the recloser acts as a switch that opens and then, after a preset time, closes the distribution line, transient faults 420, which may constitute, for example, 80% of all faults, will cause momentary outages 405 rather than sustained outages 410.

In past years, momentary outages 405 due to temporary faults in a power distribution system 100 caused little or no customer concerns or inconvenience. In fact, when a brief power loss occurred and the only result was a dimming of lights or a momentary loss of service, there was generally a feeling of relief because there was no long-term outage.

Today, however, a momentary outage 405 can disrupt the operation of many sensitive electronic devices found on the load 105, such as computers, digital clocks, video cassette recorders, microwave ovens, and industrial processes. Therefore, the momentary outage 405 can result in customer annoyance at having to reset and reprogram the equipment. The impact of these interruptions is even more severe for businesses, manufacturers, and other organizations that rely on computers, digital controls, and automatic systems to operate properly and efficiently.

Referring also to the table 500 shown in FIG. 5, a momentary interruption (or outage) 405 is defined, according to IEEE P1159, as a 0.5 cycles to 3 seconds of a voltage magnitude less than 0.1 per unit; that is, a momentary interruption occurs when the voltage magnitude remains at less than 10% of its expected value for from 0.5 cycles to 3 seconds. Also shown in FIG. 5 are other definitions of root-mean-squared (rms) voltage disturbances, such as momentary sags 505 and swells 510. Additionally, a sustained interruption (or outage) 410 is defined as greater than one minute of no voltage.

Figure 6:
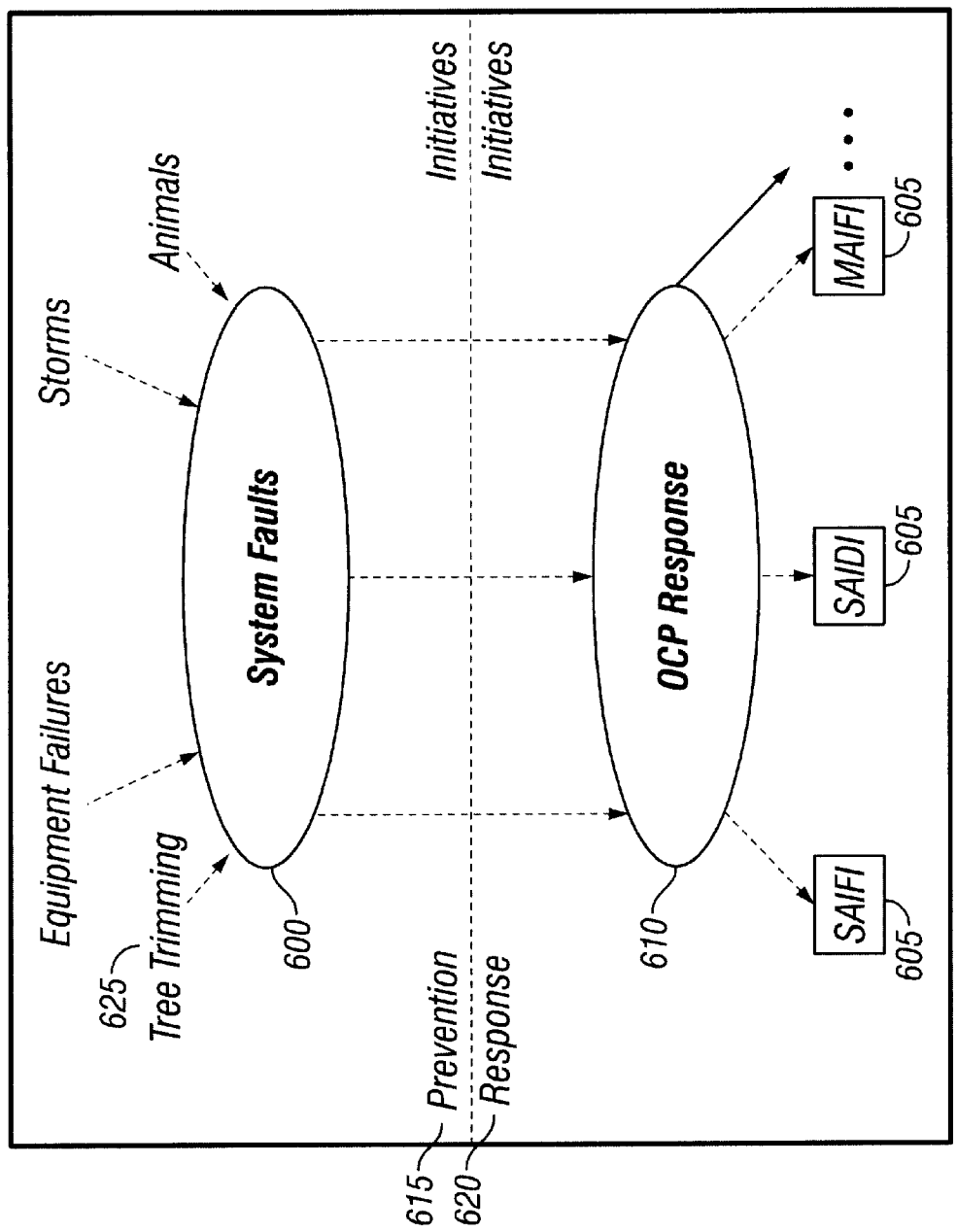
FIG. 6 is a block diagram showing reliability improvement initiatives aimed at power distribution systems.

Distribution system reliability is an increasingly important goal for electric utility companies because customers have become accustomed to dependable electric service from the system 100. Referring also to FIG. 6, although the number of system faults 600 that occur on the power distribution system 100 directly impacts the resulting IEEE reliability indices 605, the response of an overcurrent protection system 610 can also have a large impact on factors, such as a total outage time and a number of customers out of service, that influence the reliability indices 605.

Presently, many utility companies focus reliability improvement initiatives around prevention initiatives 615 that are aimed at reducing the number of faults that occur on the power distribution system 100. Recent prevention initiatives 615 include, for example, increased expenditures on tree trimming or other maintenance activities over that utilized in the past. These renewed prevention initiatives 615 are aimed at reducing the number of faults that occur on the power distribution system 100. However, the broad variety of causes of faults makes this a challenging task. For example, referring again to FIG. 3, faults having "unknown" causes 305 often may be the largest category of fault.

Some utility companies are attempting to reduce momentary outages 405 by eliminating fast tripping on relayed circuit breakers and reclosers. Unfortunately, the elimination of fast tripping, although it may reduce momentary outages 405, increases the overall sustained outage time. Because temporary faults 420 on portions of the power distribution system 100 may not be cleared by reclosing devices that respond slowly, these temporary faults 420 may lead to sustained outages 410. Also, some faults that would have been temporary with fast tripping now may become permanent faults 415 due to the increased possibility of permanent damage from longer fault times.

System design changes in a power distribution system 100 may include the use of standby systems, multiple paths of supply provided by a network system, or simply several levels of fault isolation on a given feeder. However, regardless of the number of faults that are experienced, the design of the overcurrent protection system 610 can impact both the momentary and sustained outage statistics for the system. Thus, investments in response initiatives 620, such as the design of the overcurrent protection systems 610 that sectionalize the system after a fault event, also have a major impact on the reliability results.

There are four dominant methods in which an electric utility company can upgrade system reliability to a target level using reliability improvement including both prevention initiatives 615 and response initiatives 620. First, the electric utility company can use automatic reclosing to minimize outages caused by transient faults—called "Transient Fault Protection." Second, the electric utility company can sectionalize the power distribution system 100 to limit the number of customers affected by a permanent fault and reduce the time necessary to locate a fault—called "Permanent Fault Protection." Third, the electric utility company can reduce device hazard rates using Root Cause Analysis. And fourth, the electric utility company can build systems 100 for improved reliability—called "Planning for Reliability."

The expected reliability of industrial, commercial, and residential electrical power distribution systems can be estimated from the reliability data of the individual components of the system. The failure characteristics of individual components can be partially described by the following basic reliability statistics: failure rate, often expressed as failures per year per component; and downtime to repair or replace a component after it has failed in service.

To optimize the reliability indices 605 and approach reliability goals, failure rates and repair times both must be minimized. Typically, reliability goals include reducing a number of outages per customer in a year to below a minimum threshold number (around 1.5) and reducing a total outage time per customer in a year to below a minimum threshold time (about 1.5 hours). These thresholds may be achieved through reductions in the failure rate or the repair time.

Overhead power lines used in distribution systems contribute significantly to high failure rates. Failure rates can be reduced through increased maintenance programs on these overhead lines, with probably the most important program being the clearing of brush and trees on distribution rights-of-way. Other maintenance tasks include cleaning of insulators, preventive maintenance on circuit breakers, and transformer oil dissolved gas analysis.

Another option to reduce failure rates is to replace overhead lines with underground distribution lines. Underground installations of distribution lines are much more costly to perform than overhead line installations. In addition, while the fault incidence rate of an underground line is significantly lower than that of an overhead line, the repair time for an underground line can be many times longer than that for an overhead line.

In contrast to failure rates, repair times depend on personnel and material resources. Specifically, a number of line crews is a key factor. During storms, multiple line outages often occur on a large distribution system. In this type of situation, a small number of line crews can be overwhelmed by a large number of simultaneous outages. In addition, a line crew has to get to the geographical location of the fault before the crew can repair the damaged components. Thus, a sufficient number of line crews is needed to cover the distribution system and to reach problem areas in a reasonable time period.

Another aspect of repair time is that the line crews must have access to materials and components, such as fuse links or transformers, that are needed to restore service to customers. Generally, it takes longer to repair a component than to replace it. Thus, it is vital that often-used items be available on trucks used by line crews.

In general, the reliability indices 605 are directly related to repair time and failure rate. An economic judgment must be made to determine if system reliability indices can be more easily improved by reducing failure rates or by reducing repair times.

Referring also to FIG. 7, the IEEE Recommended Practice for the Design of Reliable Industrial and Commercial Power Systems (the Gold Book, Std 493–1990) contains equipment reliability data 700 for various power system components such as transformers 705, generators 710, and protective devices such as circuit breakers 715. The selected data in FIG. 7 is taken from a 1979 summary of a long-term equipment reliability study detailed in the Gold Book (p. 54).

Both the average downtime per failure data 720 and median downtime per failure data 725 are given in the table so that the effect of a few very long outages on the average downtime 720 can be indicated by a large difference between the average and median values. The averages shown represent only those cases where restoration work was begun immediately. Those instances in which the repair or replacement was deferred were excluded to avoid distorting the average outage duration time data.

Replacement data 730 is given for transformers only. The data 700 clearly indicates that the restoration of a unit to service by repair rather than replacement results in a much longer average outage duration time. These results show the obvious benefits of having spares or standby equipment readily available. However, one could reason that large failed transformers are not always simply replaced due to the economics of the situation.

RELIABILITY OPTIMIZATION

Figure 8:
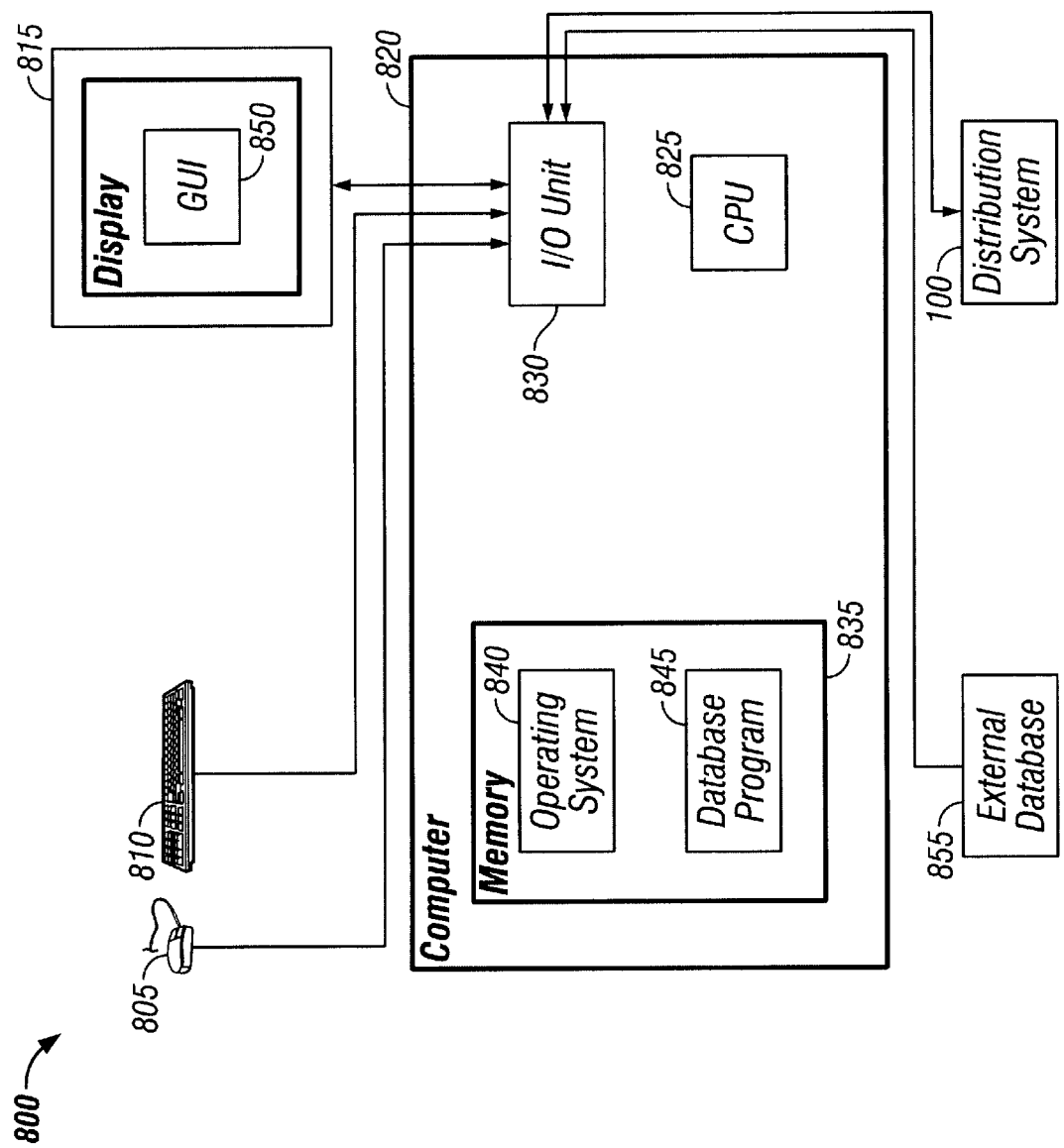
FIG. 8 is a block diagram of a computer-implemented reliability optimization system used in a power distribution system.

Referring also to FIG. 8, a computer-implemented system 800 may be used to optimize reliability in an electrical distribution system 100. The reliability optimization system 800 includes input/output (I/O) devices (for example, a mouse 805, a keyboard 810, and a display 815) and a general purpose computer 820 having a processor 825 and an I/O unit 830. The system 800 also may include a connection to the distribution system 100.

A storage device or memory 835 stores data and programs such as an operating system 840 and a database program 845. The database program 845 integrates various engineering analysis modules, a logic engine that decides which engineering analysis modules to operate, and a graphical front-end module. The graphical front-end module (called V-GRAPH) displays to a user a graphical user interface (GUI) 850 and an expert system interface used by the logic engine. An external database 855 also may be accessed by the reliability system 800.

Figure 9:
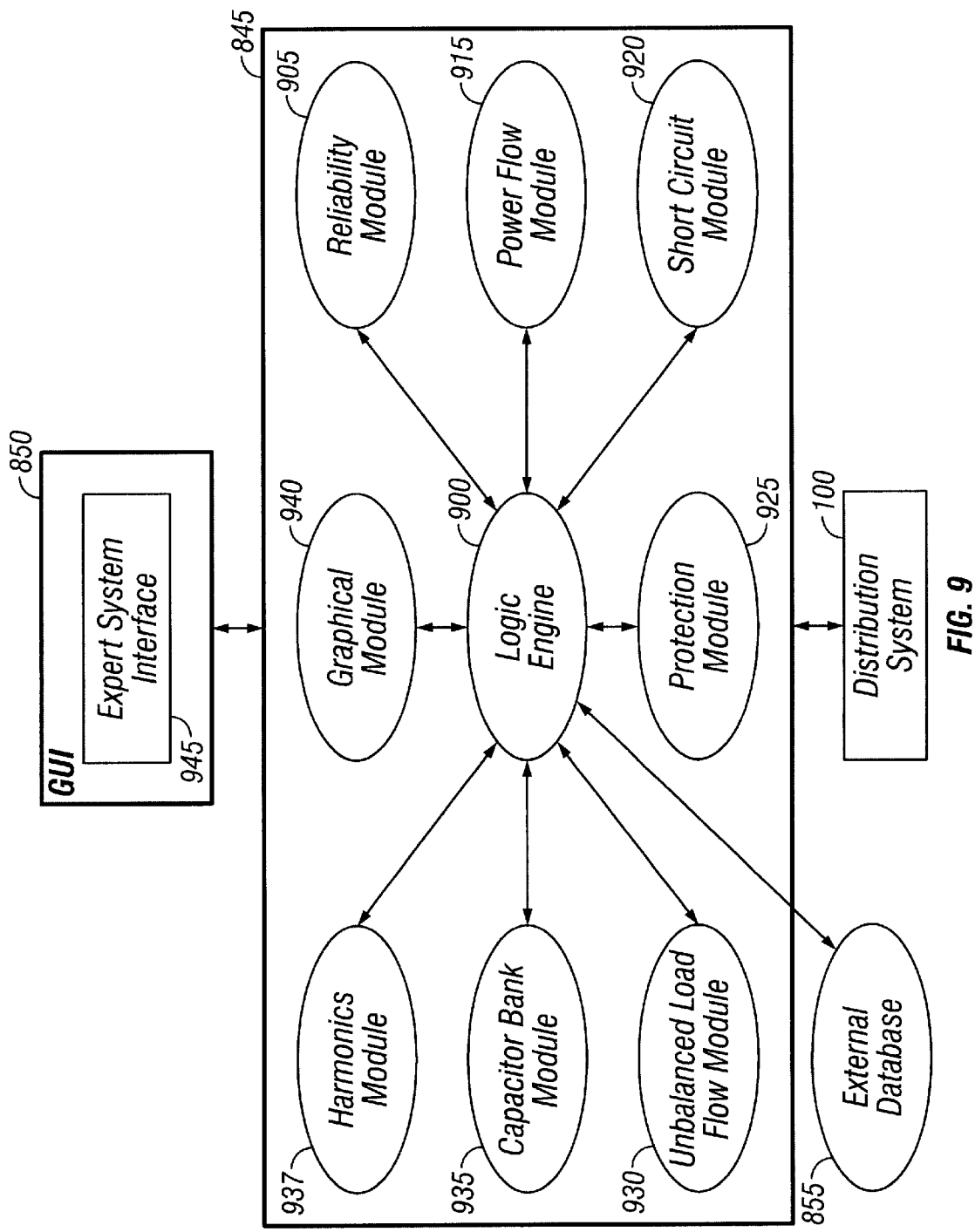
FIG. 9 is a block diagram of specific modules used by the reliability optimization system.

Referring also to FIG. 9, the I/O unit 830 receives data from elements in the distribution system 100 and from a user who inputs information via the mouse 805 or the keyboard 810, in response to the graphical user interface 850 manifested on the display 815. The user may input hypothetical situations of distribution system design to the reliability system 800. In response, the reliability system 800 analyzes these hypothetical situations based on the current distribution system design and supplies the user with results of the analyses. These analyses are performed using any one or more of the engineering analysis modules.

Under control of a logic engine 900, the processor 825 automatically interprets, based on user input, a need to conduct studies of the complicated distribution system 100. For example, the logic engine 900 may call a reliability module (called DISTRELY™) 905 that causes the processor 825 to compute reliability indices 605 for numerous trial positions of elements, such as protective devices 715, on the distribution system 100. The processor 825 then optimizes placement of these elements using various engineering analysis modules in the database program 845.

A complete database includes all engineering analysis modules from the internal database program 845 and any engineering analysis modules included in the external database 855 associated with the utility company. For example, some commonly used utility modules are Automated Mapping/Facilities Management (AM/FM) and Geographic Information Systems (GIS).

Engineering analysis modules found in the internal database program 845 include the reliability indices module (DISTRELY) 905 that, when accessed, causes the processor 825 to compute the IEEE reliability indices 605. Under control of a power flow module (called V-FLOW™) 915, the processor 825 computes load or power flow for the distribution system. Under control of a short circuit module (called V-NET™) 920, the processor 825 analyzes currents and voltages in the distribution system 100 for a situation in which a circuit is shorted phase-to-phase or phase-to-ground.

Under control of a protection module (called V-PRO II®) 925, the processor 825 coordinates the action of overcurrent devices such as circuit breakers, reclosers, or fuses. Furthermore, under control of an unbalanced power flow module 930, the processor 825 computes load or power flow using a more detailed model of the circuit than it does under control of the power flow module 915. For example, the module 930 causes the processor to account for all three phases of an unbalanced circuit.

Under control of a capacitor bank placement module (called V-CAP™) 935, the processor 825 determines placement and size of capacitor banks and voltage regulators to balance flow in the distribution system 100. Under control of the graphical module 940, the processor 825 interacts with a user through the graphical user interface 850. Under control of a harmonics module 937 (called V-HARM™), the processor 825 calculates harmonic levels throughout the distribution system 100.

A description of each of the modules is provided below.

GRAPHICAL MODULE (940)

Figure 10:
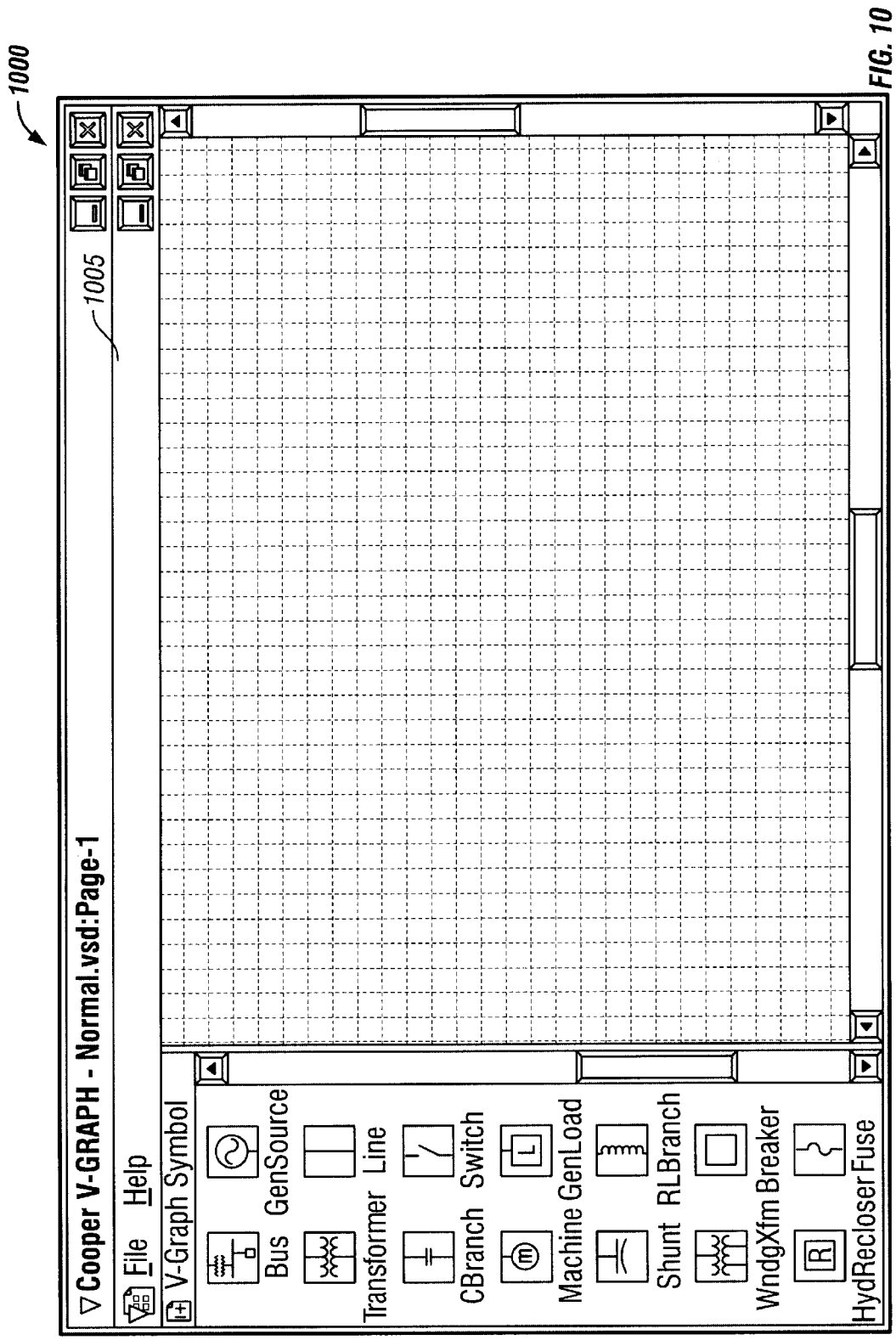
FIG. 10 is a screen shot of a limited-functionality view of a graphical user interface (GUI) implemented by the reliability optimization system.

Referring also to FIG. 10, the graphical module 940 (called V-GRAPH™) implemented by the processor 825 displays the graphical user interface 850 that allows the user to model and study distribution systems. FIG. 10 shows a main, no-document view 1005 of the graphical user interface 850. In the main no-document view 1005, the user has limited functionality and can only create, open, or delete a circuit.

Figure 11:
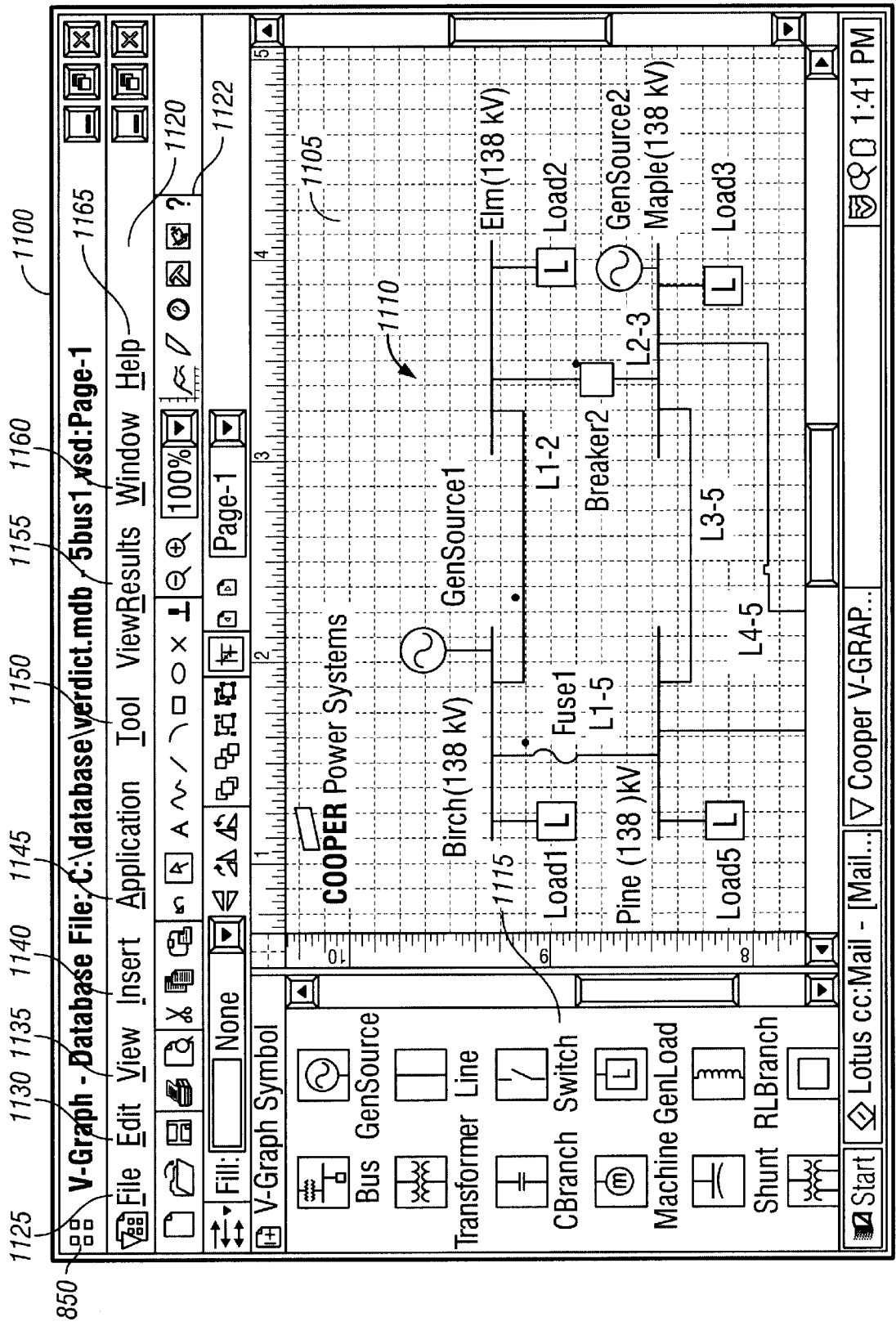
FIG. 11 is a screen shot of a complete-functionality view of the GUI.

Referring also to FIG. 11, the GUI 850 displays a main, with-document view 1100 after the user has created or opened a circuit. In the main with-document view 1100, complete functionality is available to the user.

Shown in FIG. 11 is a workspace 1105 in which the user can create and edit a One-Line Diagram 1110. The one-line diagram 1110 is a visual representation of a circuit that provides double-click access to individual device data in the circuit, display of result data, and basic data manipulation such as ASCII transfer or library-data functionality. A user who wants to edit a one-line diagram selects components from the symbol bar 1115 to the left of the circuit workspace 1105. Furthermore, the user can select a command from a menu bar 1120 positioned above the work space 1110. A tool bar 1122, shown displayed below the menu bar 1120, may provide a shortcut for certain user-selected commands that are otherwise accessed through the menu bar 1120. These shortcut tools may be those items that are used most often by the user.

From the GUI 850, results of any or all engineering analysis implemented by the processor may be displayed. The user can enter data for devices used on the distribution system through the GUI 850. Furthermore, the user can interact with all engineering modules through the GUI 850.

Referring also to FIGS. 12A–12I, the user can select various menu items from the menu bar. To open, close, print, or save a file or to exit the system 800, the user selects "File" 1125 from the menu bar 1120 (shown in FIG. 12A). To edit a one-line diagram or circuit drawings 1110, the user selects "Edit" 1130 from the menu bar 1120 (shown in FIG. 12B). For example, the user can cut and paste a one-line diagram from one circuit into another circuit using the "Cut" and "Paste" commands.

Figure 12A:
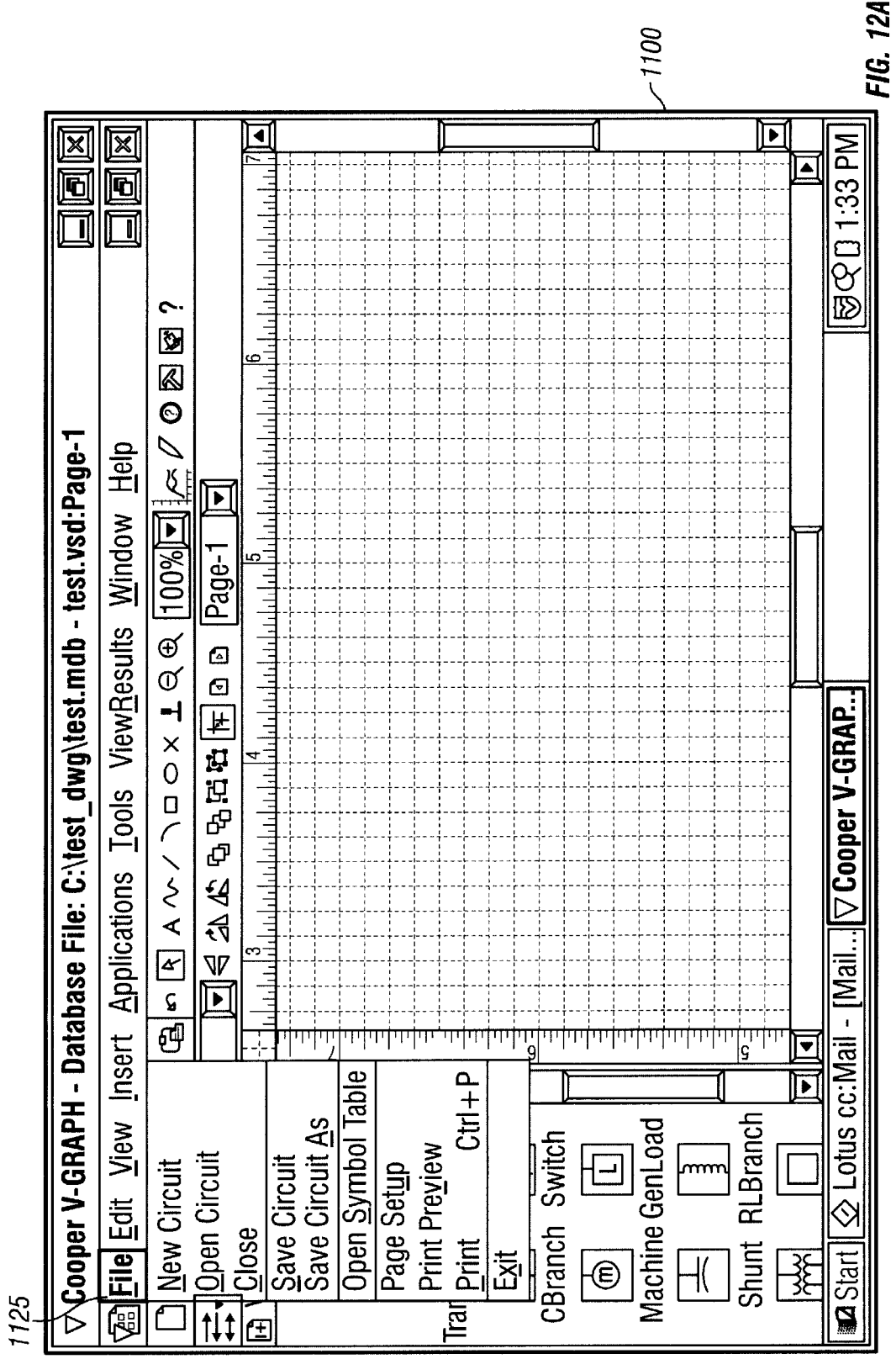
FIGS. 12A–12I are screen shots, of various menu items in the GUI complete-functionality view.
Figure 12B:
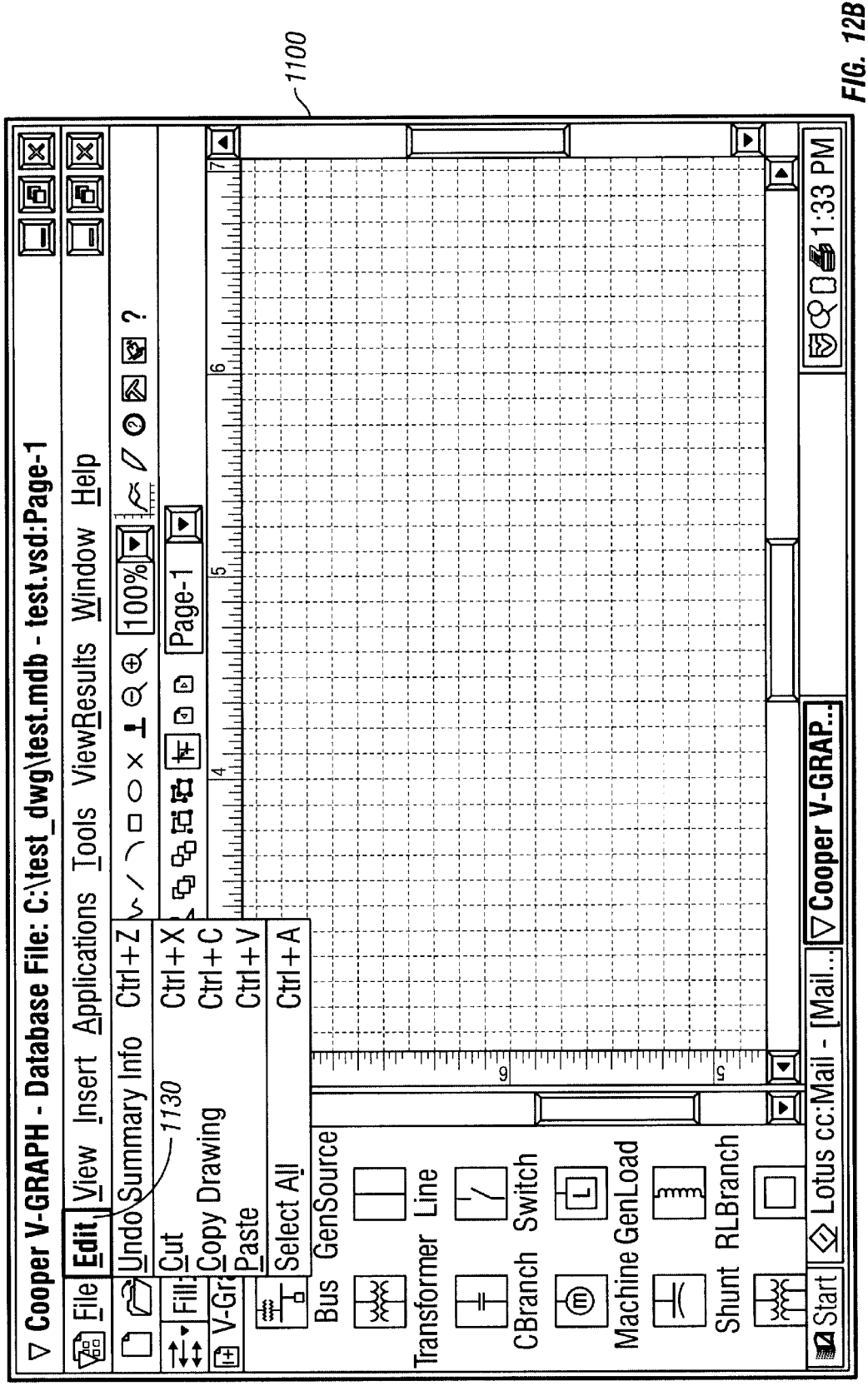
Figure 12C:
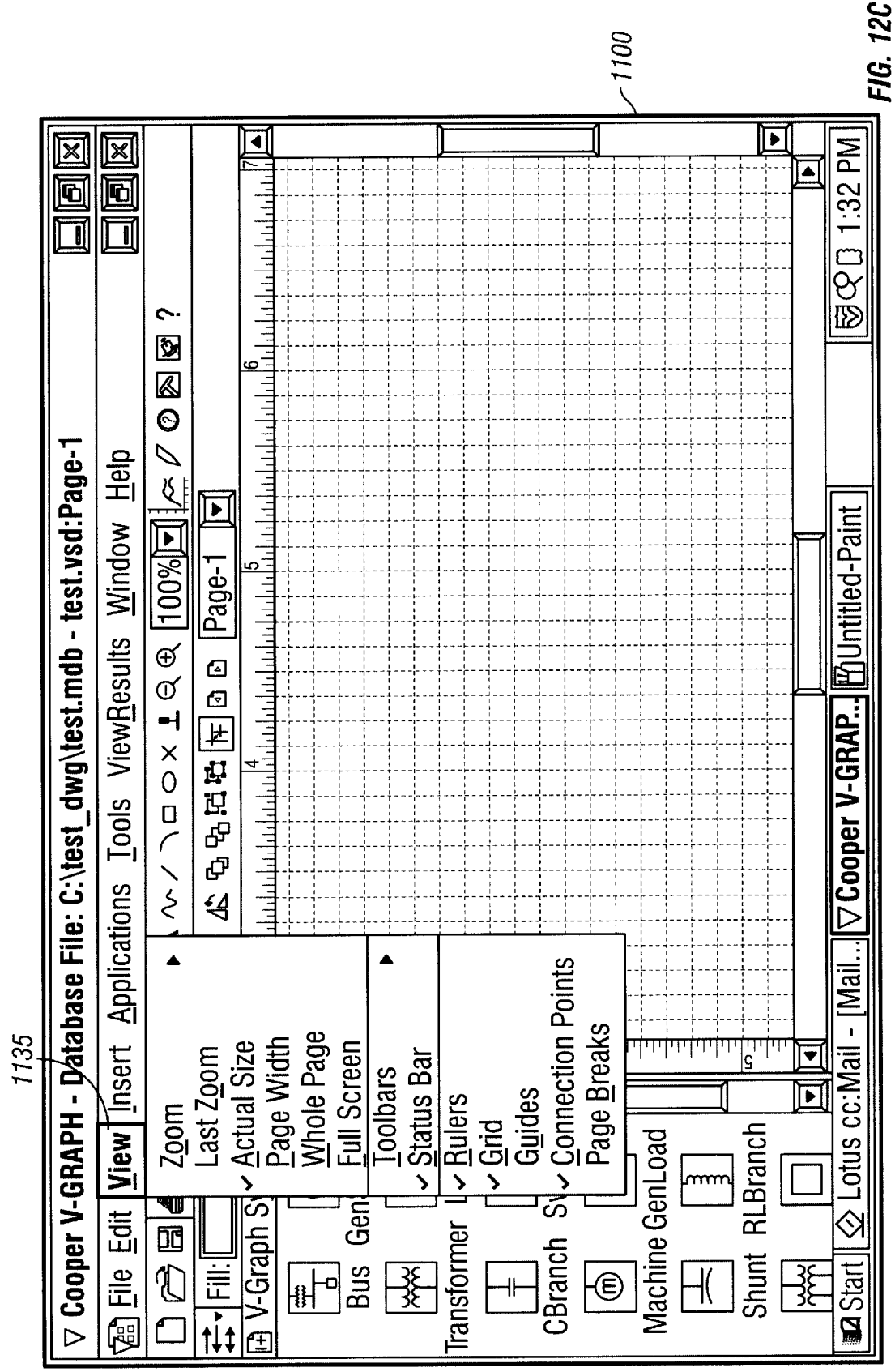

Referring to FIG. 12C, to adjust a view of the work space, the user selects "View" 1135 from the menu bar 1120. For example, when the user selects the command "Whole Page", the view of the circuit drawing in the work space covers the whole work space area. Similarly, the user can more finely adjust a size of the circuit drawing by using the "Zoom" command.

Figure 12D:
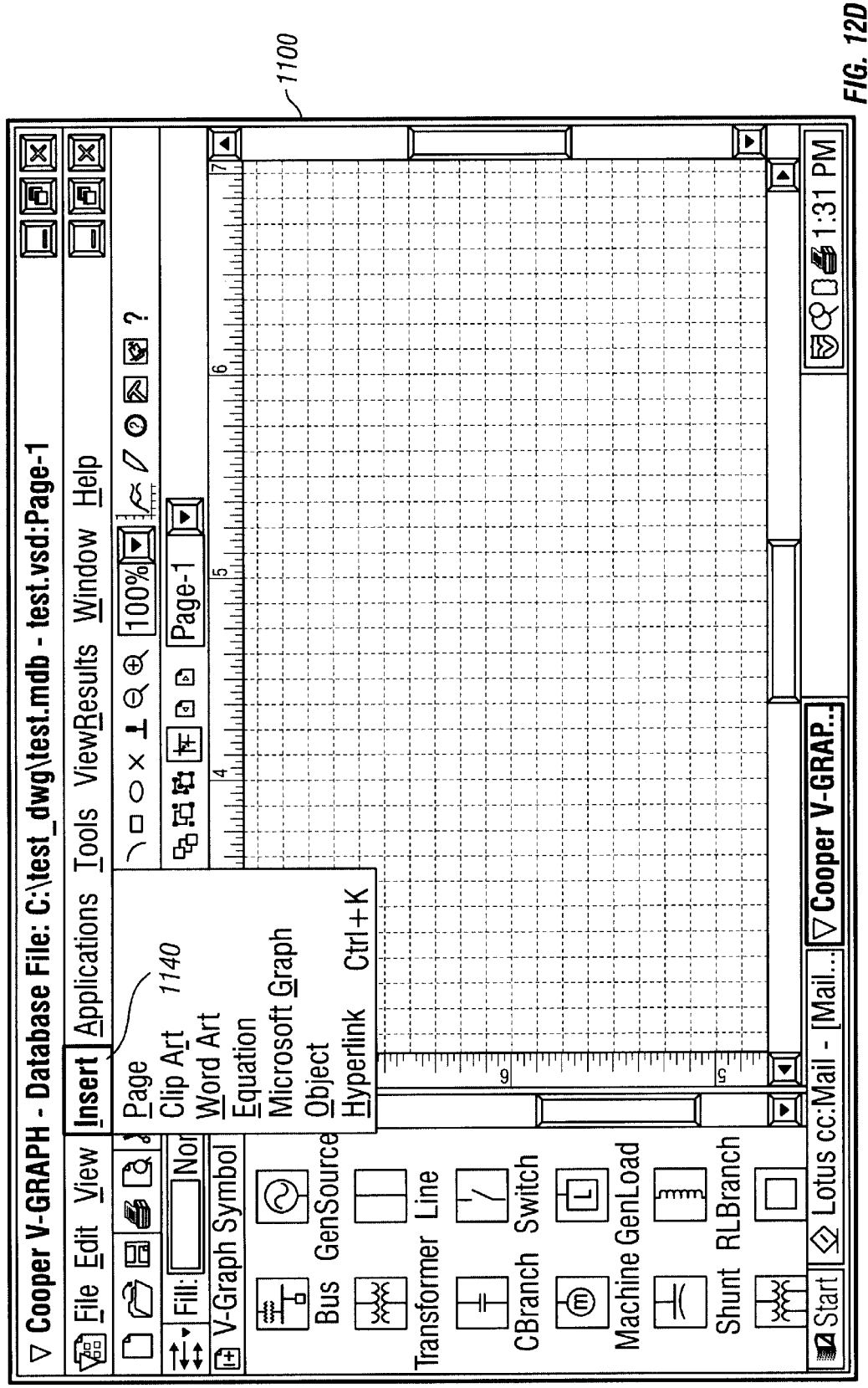

Referring to FIG. 12D, to insert data from another file into the file shown in the work space, the user selects the "Insert"

command 1140 from the menu bar 1120. For example, the user may select the "Page . . . " menu item from the Insert menu to insert additional drawing pages into the GUI. For complicated circuits, this feature is helpful because it permits the user to spread a one-line diagram over multiple pages and avoid clutter and obfuscation that could result from trying to cram many busses, branches, and devices onto a single page. The user may select the "Equation . . . " link to create an equation on the drawing.

Figure 12E:
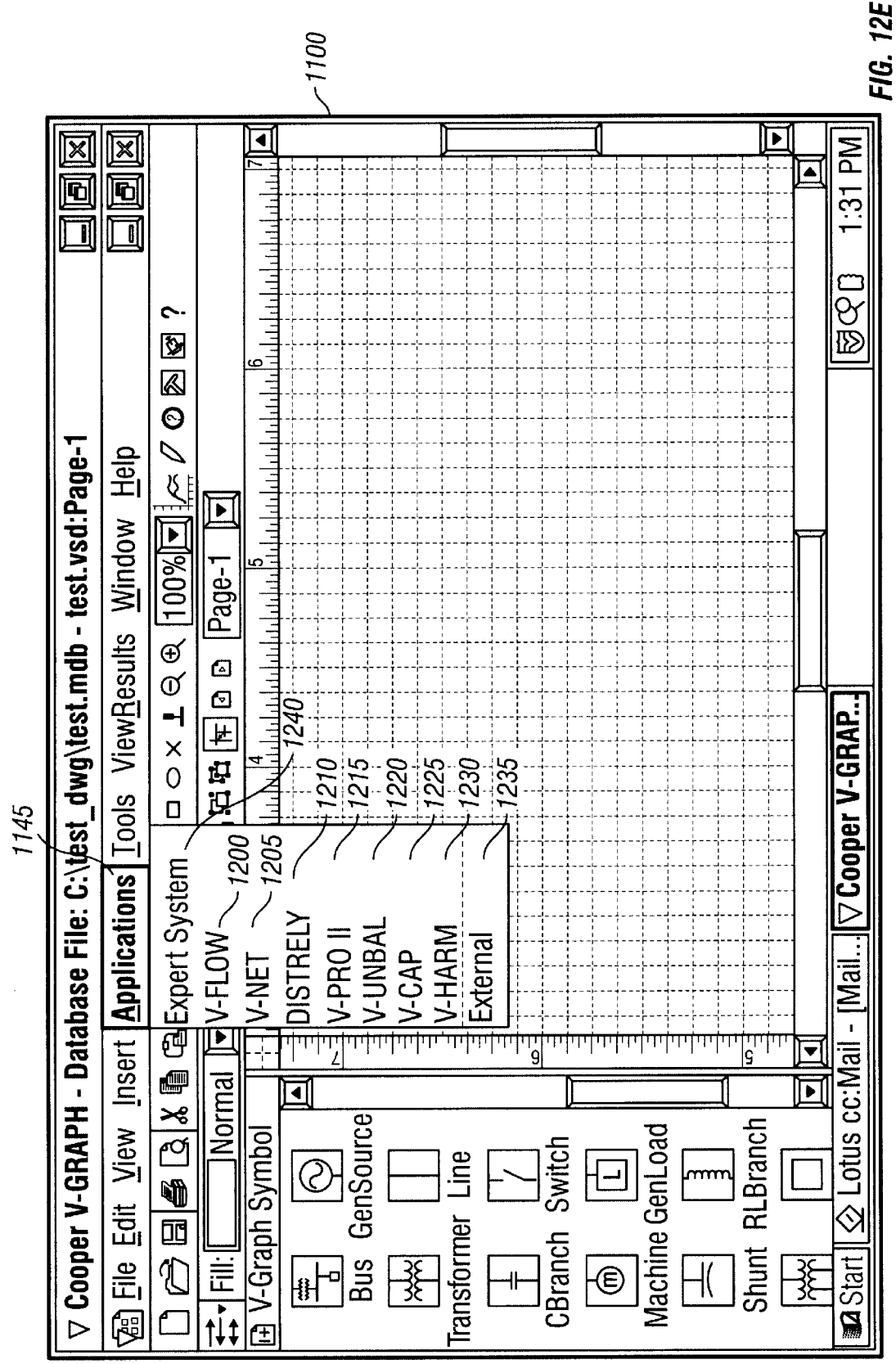

Referring to FIG. 12E, when the menu item "Application" 1145 is selected from the menu bar 1120, the user may choose to run an engineering analysis module from the database 845. For example, in the implementation shown in FIG. 12E, the user may select "V-FLOW" 1200 to run the power flow module 915, "V-NET" 1205 to run the short circuit module 920, "DISTRELY" 1210 to run the reliability module 905, "V-PRO II" 1215 to run the protection module 925, "V-UNBAL" 1220 to run the unbalanced load flow module 930, "V-CAP" 1225 to run the capacitor bank placement module 935, or "V-HARM" 1230 to run the harmonics module 937. The user may also choose to run an external module from the external database 855, labeled as an "External" menu item 1235. Alternatively, the user may run the logic engine 900, labeled as "Expert System" menu item 1240.

Figure 12F:
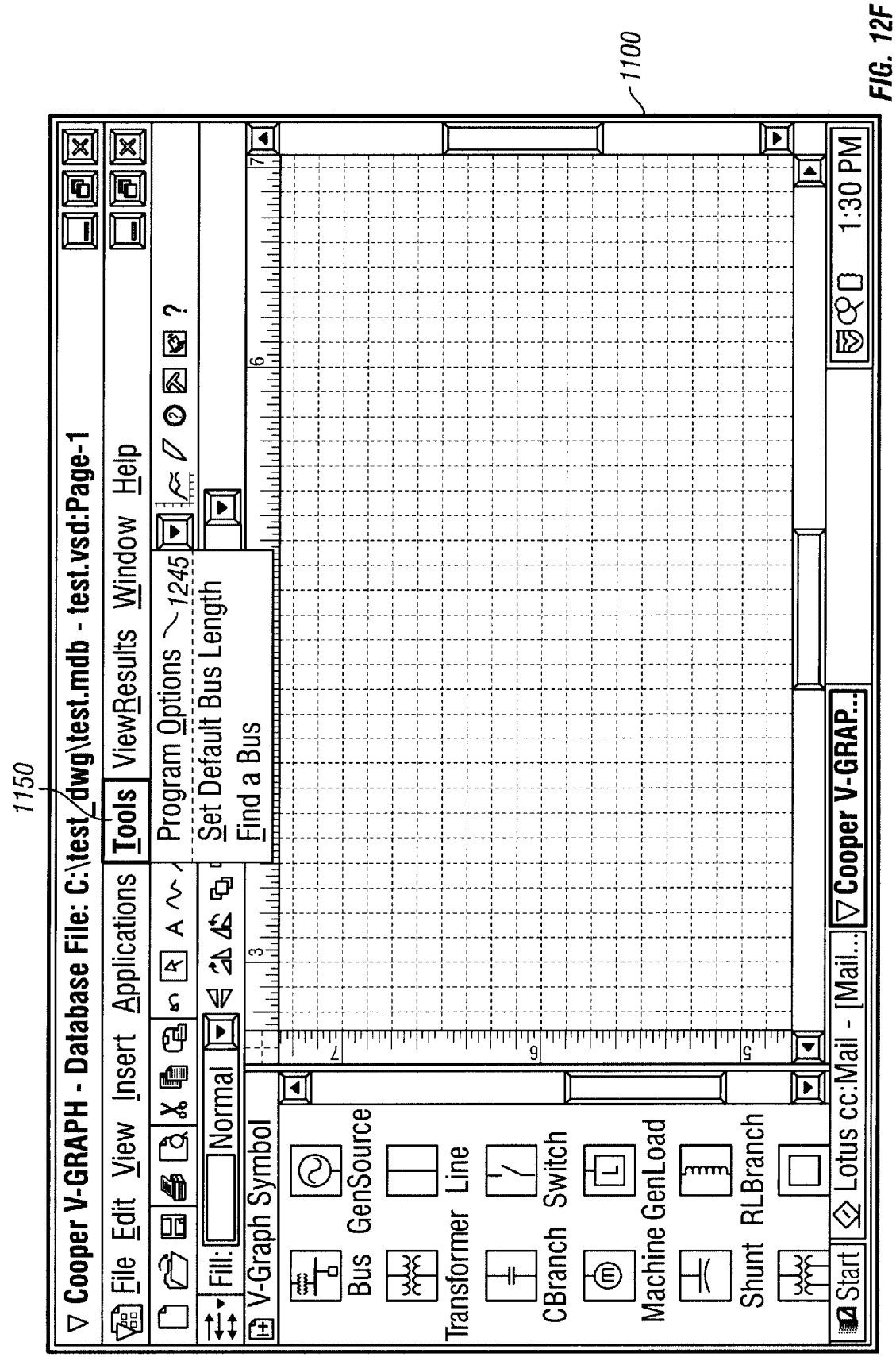

Referring to FIG. 12F, when the user selects a "Tool" menu item 1150 from the menu bar 1120, a "Program Options" item 1245 may be selected, thus invoking a dialog box (shown in FIG. 13) that permits the user to enter default parameters for the drawing or for each of the engineering modules that are used in the system 800.

Figure 13:
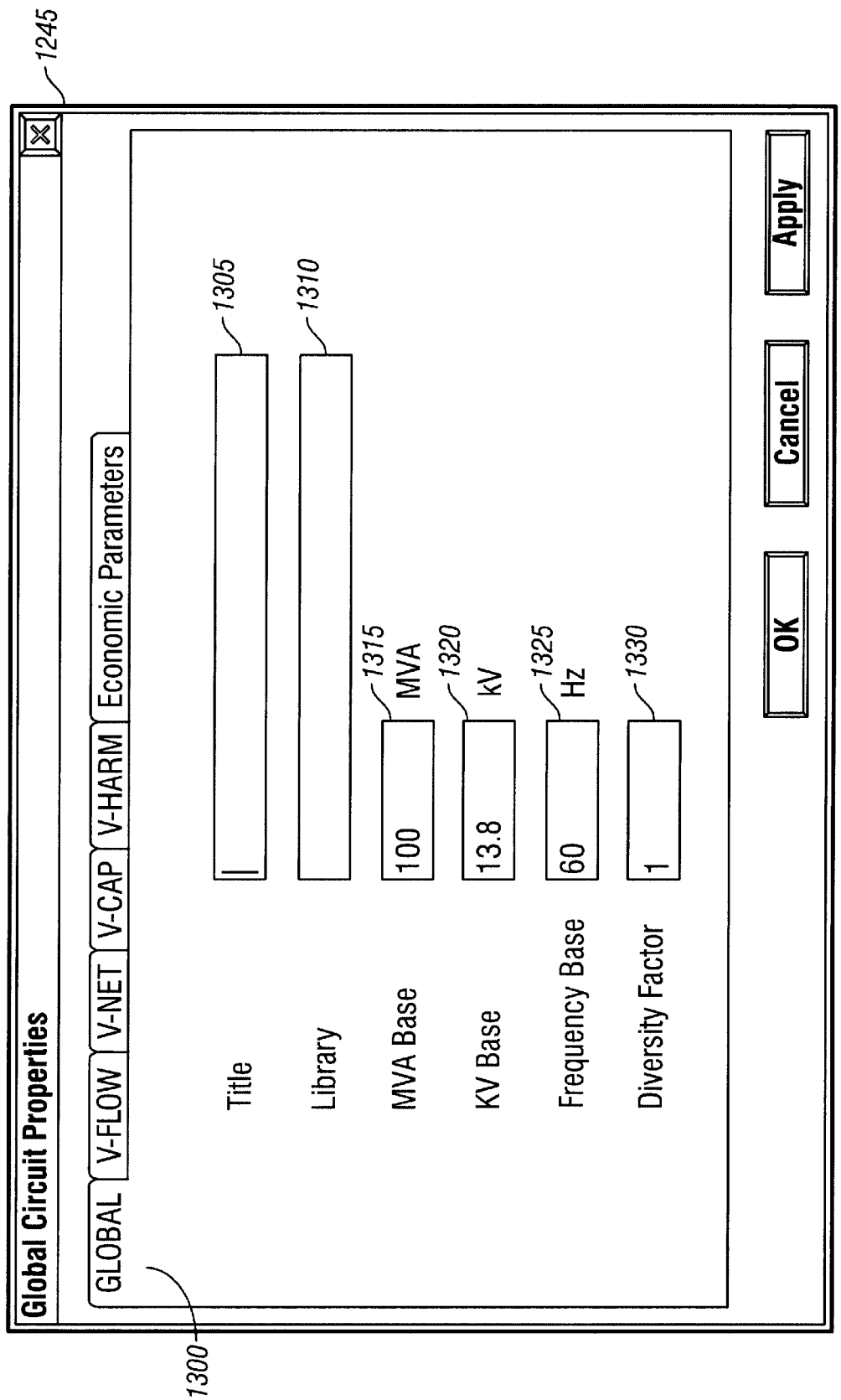
FIG. 13 is a window for setting global default parameters in the reliability optimization system.

For example, as shown in FIG. 13, a global set of default parameters 1300 contains data that applies to the entire circuit drawing. The user may create or edit a title for the circuit in box 1305 that can be used in output reports of analysis. In box 1310, the user may select a library file, that is, a separate database file that holds "code" data such as line code data, transformer code data, or machine code data. In box 1315, the user may enter or edit a power unit (called MVA Base) that is used to convert all power calculations to uniform units. In box 1320, the user may also enter or edit a voltage unit (called kV Base) that is used to convert all voltage calculations to uniform units. If the harmonics module 937 is used, then the user may enter or edit a Frequency Base or unit in box 1325 that indicates a fundamental frequency on which harmonic multiples are calculated. In box 1330, the user may enter or edit a Diversity Factor which is used for calculating loads.

A user can also define a subset of buses or branches in the circuit for which to display analysis results. Likewise, the user may define an additional subset of the type of results to display. For example, of the possible fault current types, a user may wish to view only three-phase fault currents.

Figure 12G:
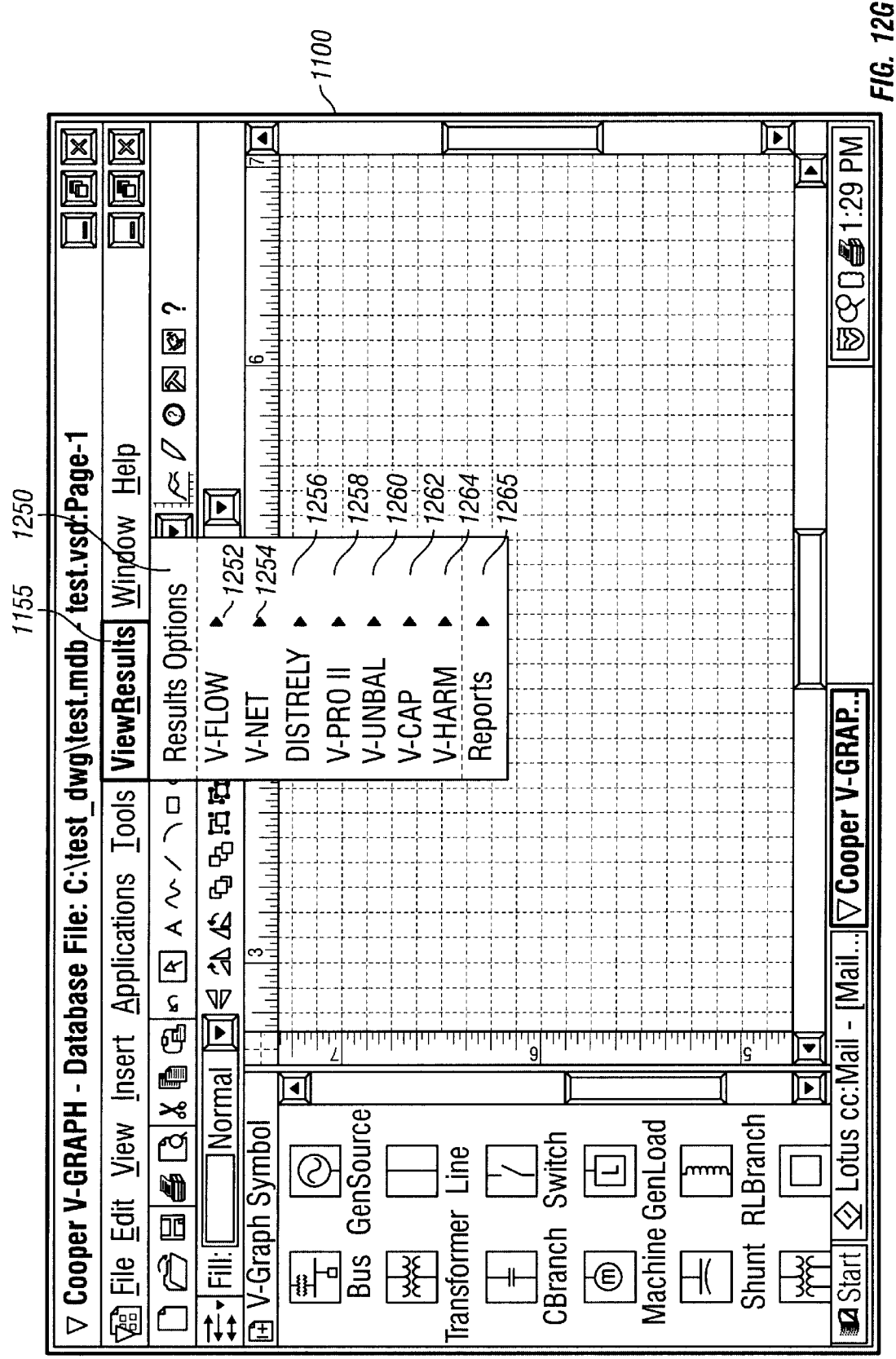

Referring to FIG. 12G, the user may view results from the engineering modules using the "View Results" 1155 menu item from the menu bar 1120.

Figure 14A:
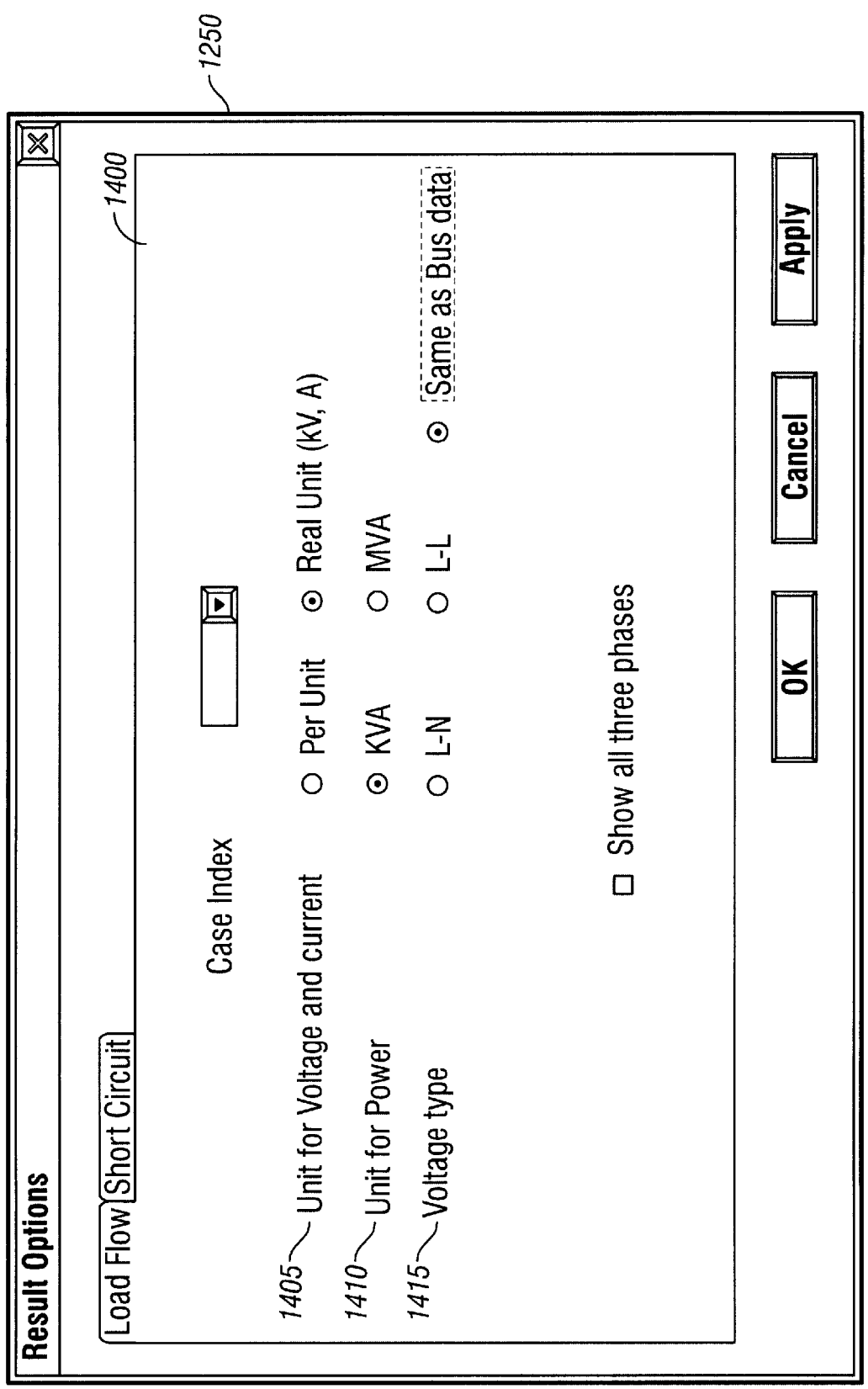
FIGS. 14A and 14B are windows for adjusting the display of reliability results.
Figure 14B:
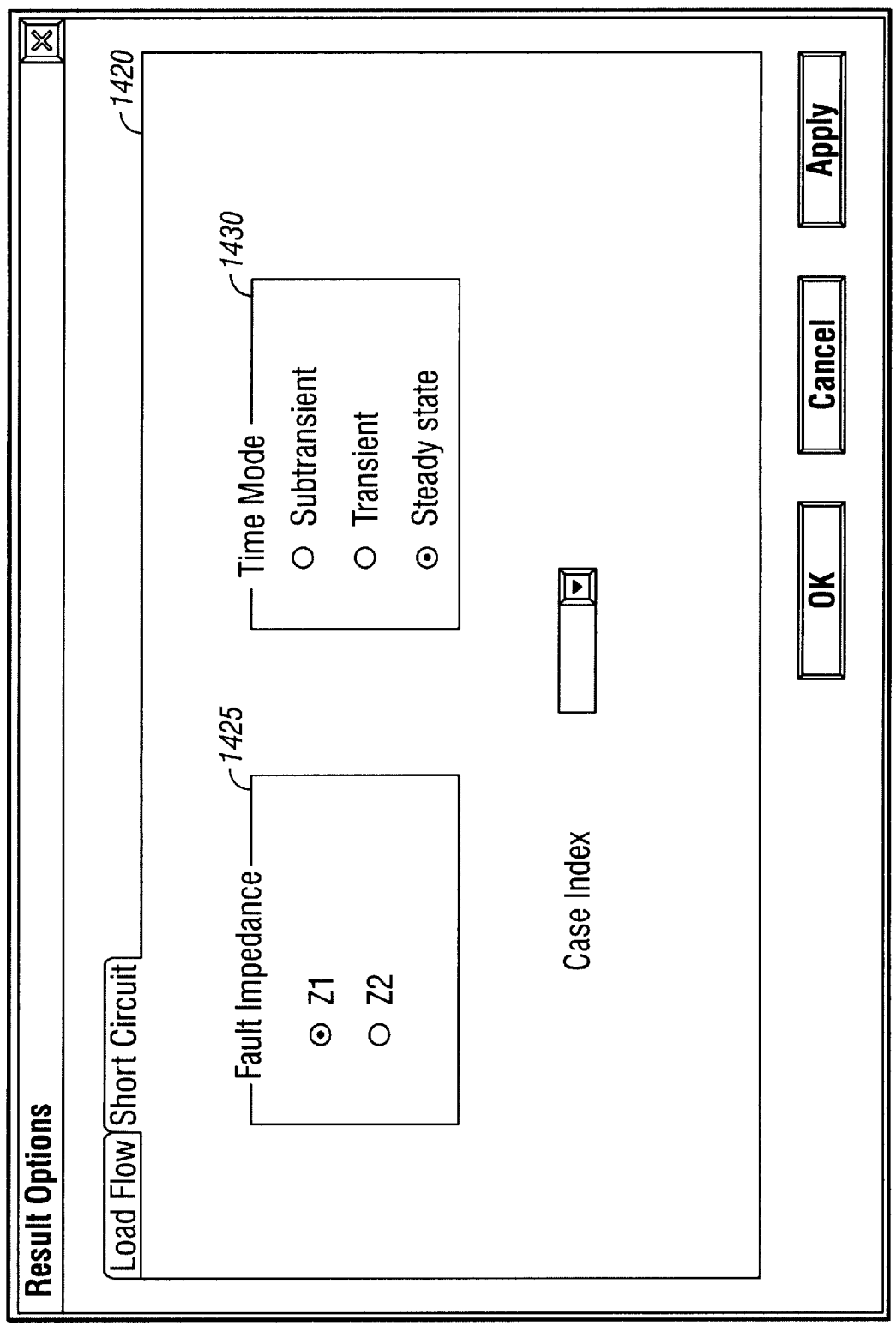

When the user selects the "Result Options" item 1250, the user can then adjust how the results are displayed. Referring to FIG. 14A, for example, the user may select "load flow" 1400 to change display units for voltage and current 1405, and power 1410 or display voltage type 1415. Referring to FIG. 14B, the user may select "short circuit" 1420 to change a display fault impedance 1425 or a display time mode for faults 1430.

A set of results menu items are displayed under the View Results menu 1155. In the implementation shown in FIG. 12G, the engineering analysis modules implemented are displayed in menu items V-FLOW 1252, V-NET 1254, DISTRELY 1256, V-PRO II 1258, V-UNBAL 1260, V-CAP 1262, and V-HARM 1264. A results menu item may be selected from this set by the user to display results of the selected engineering module analysis based upon conditions set up in the GUI.

Figure 14C:
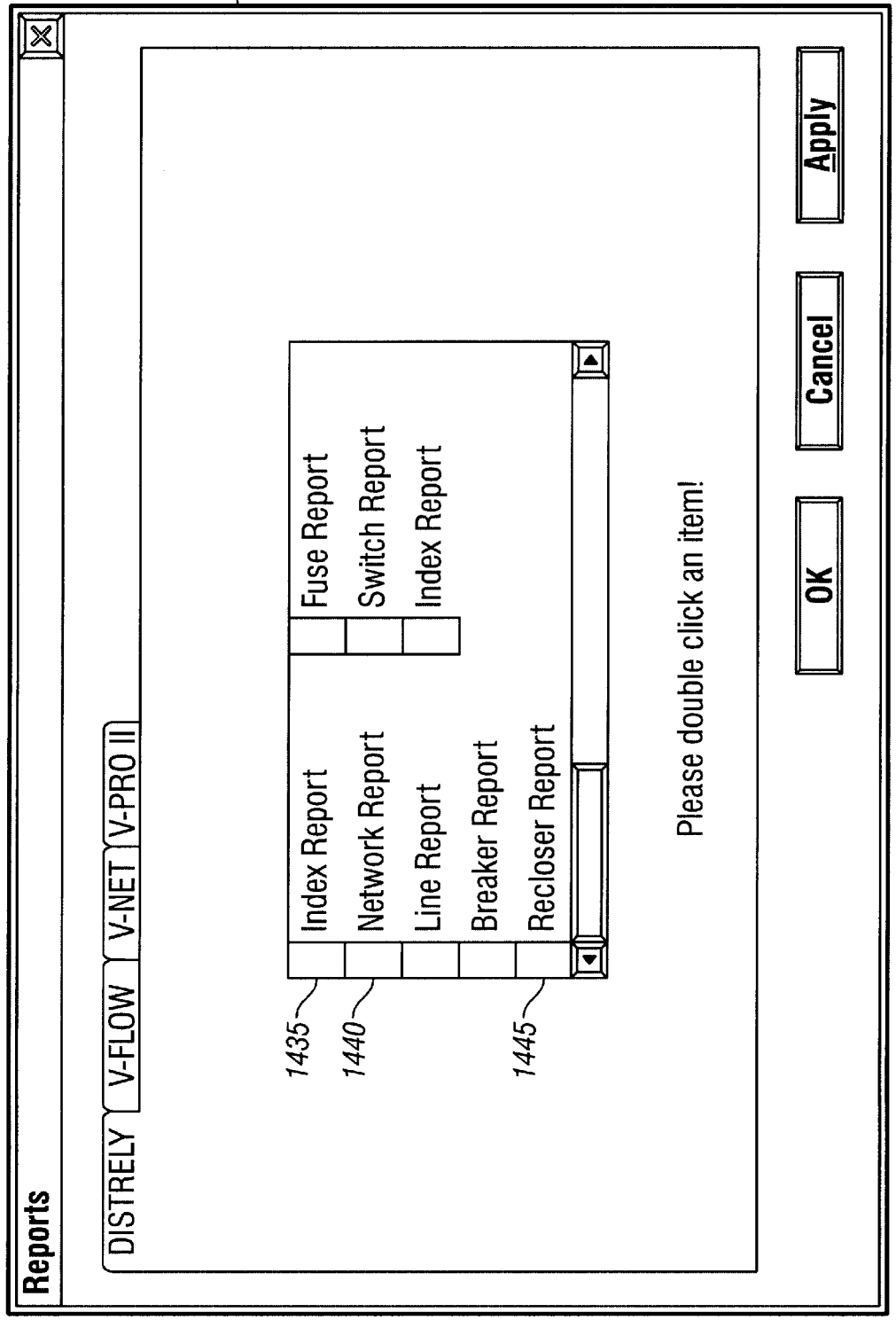
FIG. 14C is a window for selecting status reports about various devices and calculations used by the optimization system.

Referring to FIG. 14C, a "Reports" menu item 1265 may be selected to generate status reports about various devices and calculations used by the engineering analysis modules. For example, reports that may be generated by the reliability module 905 include a reliability index report 1435, a distribution network report 1440, and a recloser report 1445.

Figure 12H:
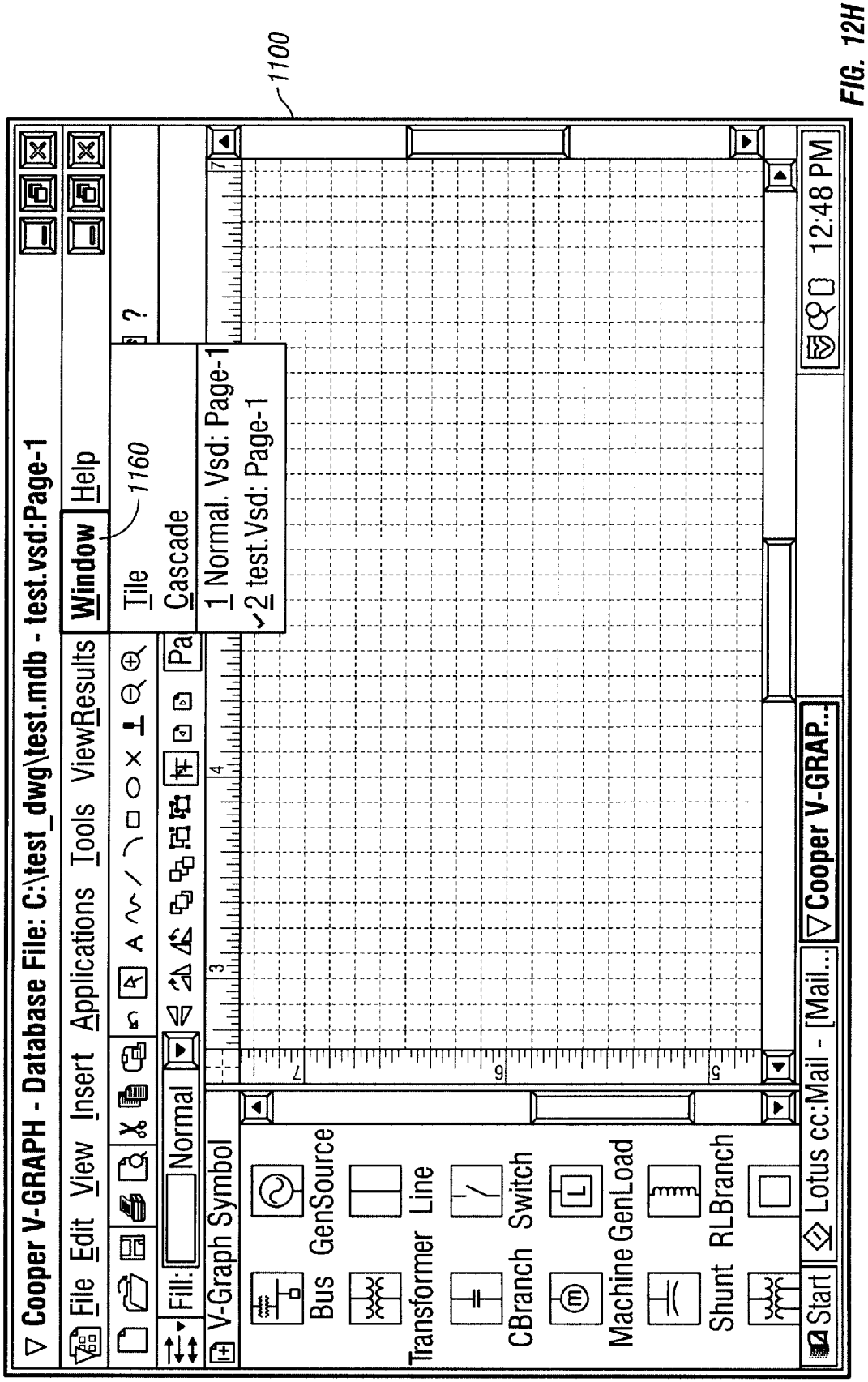

Referring to FIG. 12H, the user, upon selection of the "Window" menu item 1160, may adjust a view of the work space windows by tiling or cascading windows, or selecting a particular window.

Figure 12I:
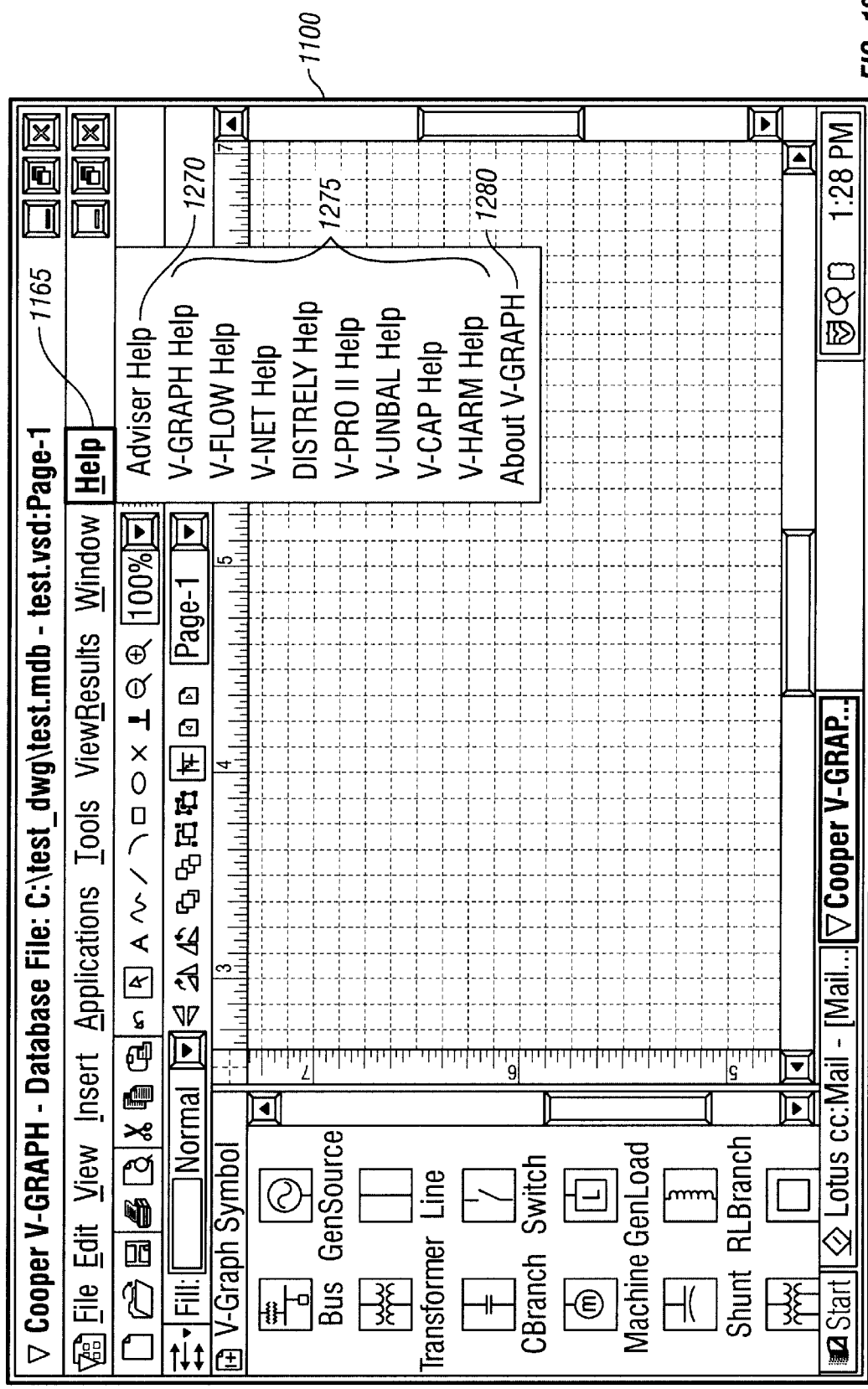

Referring to FIG. 12I, the user may obtain helpful information when selecting the "Help" menu item 1165. After selecting "Adviser Help" 1270, the user receives information about how to operate the reliability optimization system 800. After selecting one of the menu items from the engineering analysis module set 1275, the user receives information about how to use the engineering modules. In the implementation shown in FIG. 12I, help is available for all engineering analysis modules. After selecting "About V-GRAPH" 1280, the user receives information about a recent version of the graphical module.

LOGIC ENGINE 900

If the user selects the logic engine application 1240 from the menu item Application 1145 in the menu bar 1120, the logic engine module 900 runs. Likewise, the logic engine 900 may be called by any other suitable method, such as when the user first enters or uses the reliability optimization system 800.

Figure 15A:
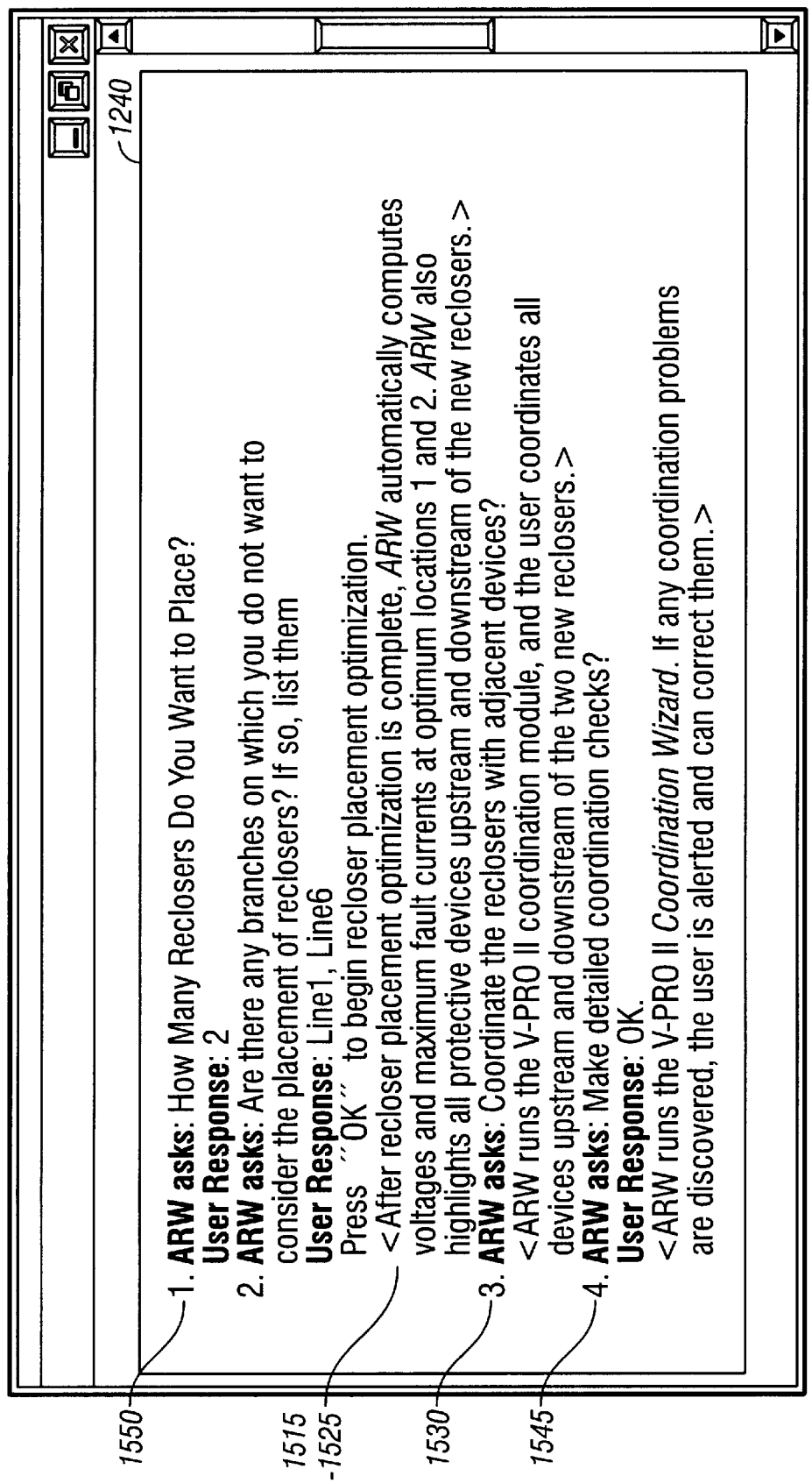
FIG. 15A is an interactive expert system window that aids in selecting a specific module to run to accomplish a given task.
Figure 15B:
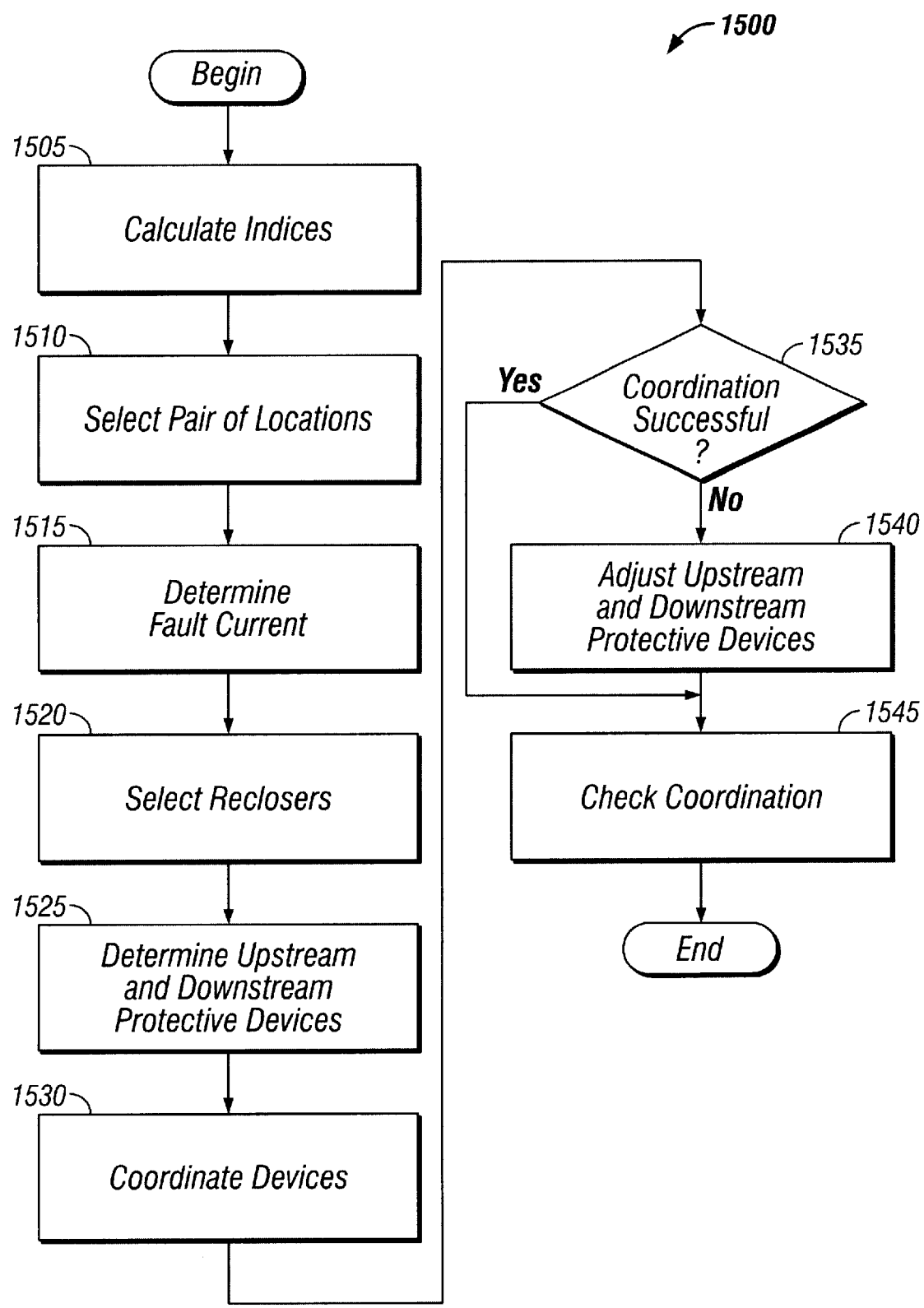
FIG. 15B is a flow chart of a procedure that optimally places and coordinates two reclosers in the distribution system.

Referring also to FIG. 15A, when the user selects the expert system, the processor 825, displays a window 1240 on the GUI 850. The user can then interact with the expert system. The expert system aids the user in selecting which analysis modules to run to accomplish a given task. FIG. 15A shows the interaction between the user and the expert system in placing two reclosers. Referring also to FIG. 15B, several tasks are implemented using a procedure 1500 that optimally places the two reclosers and coordinates them with other protective devices.

Initially, the processor 825 calculates standard reliability indices for every pair of possible recloser placement locations in the distribution system 100 (step 1505). Possible recloser placement locations include any location that is not ruled out due to inaccessibility, lack of available space, political considerations, or other factors. After calculating the indices, the processor selects the pair of possible recloser locations that have the best overall calculated reliability indices (step 1510).

Assuming that the reclosers are placed at each of these optimum locations, the processor determines a maximum fault current and voltage that could occur at each of those locations under worst-case conditions (step 1515). This task determines the maximum current that must be interrupted during a fault. Based on these values, the processor then selects reclosers to be placed at the two locations (step 1520).

Once the reclosers are selected (step 1520), the processor determines all existing protective devices upstream and downstream of each of the two selected locations (step 1525). The processor then coordinates each of the two new reclosers placed at the selected locations with all existing protective devices (step 1530). If coordination is not successful (step 1535), the processor determines what adjustments could be made of the one or more existing protective devices to obtain coordination (step 1540). For example, a protective device, such as a fuse downstream of a new recloser, may need to be changed to another type of protective device. As another example, a protective device, such as a tripped breaker or relay, may need to be reset. After a device coordination scheme is selected, the processor makes detailed checks to ensure that the newly-placed reclosers indeed coordinate with surrounding devices (step 1545).

Referring again to FIG. 15A, the expert system interface 945 makes the device placement and coordination procedure 1500 more user-friendly by walking the user through the procedure by displaying a series of simple questions for the user to answer in window 1240. In response to the user's answers, the processor 825 may automatically call the necessary database modules. As noted above, FIG. 15A shows the dialog 1550 between the expert system and a user who wants to optimally place and coordinate two reclosers. The dialog 1550 walks the user through the detailed procedure 1500 shown in FIG. 15B. For example, after the expert system interface asks the user whether reclosers should be coordinated with adjacent devices, and the user responds positively, the processor runs the V-PRO II coordination module (that is, the protection module 925) to coordinate the reclosers with adjacent devices (step 1530).

The reliability optimization system 800 integrates the functionality of a collection of engineering analysis modules into a single user-friendly package. Because of this integrated analysis design, the reliability optimization system 800 can focus on reliability analysis, design, and improvement in addition to more conventional analysis functions such as the determination of distribution system currents, voltages, and other operating parameters. Additionally, the reliability optimization system 800 provides the expert system interface 945 to assist the user in running individual modules to obtain needed distribution system design information. The expert system interface 945 reduces the knowledge required by the user to run individual modules of the system 800 and allows the user to concentrate on end goals such as "reduce the number of system momentary outages by 20%."

RELIABILITY MODULE 905

When the user selects the reliability analysis menu item 1210 from the application menu item 1145, or when the logic engine 900 determines that reliability analysis is needed, the processor 825, under control of the reliability analysis module 905, computes reliability indices 605. These indices indicate a frequency and duration of sustained and momentary outages in all or part of the distribution system.

To calculate the reliability indices 605, several variables must first be defined and determined. An integer i indexes interruption events that can occur due to a fault. A variable $r_i$ is a restoration time for each interruption event i. A variable $ID_i$ is a number of interrupting device operations for an interruption event i. A variable $ID_E$ denotes a number of interrupting device events during a reporting period which is typically a year in duration. A variable $N_i$ denotes a number of interrupted customers during the reporting period for each event i. A variable $N_T$ is a total number of customers served for the area being indexed. Finally, a variable CN denotes a total number of customers who have experienced a sustained interruption during the reporting period.

With this nomenclature established, system reliability may be quantified in terms of the several IEEE standard indices described below and determined by the processor 825 after the reliability module 905 has been called by the user or the logic engine 900.

A System Average Interruption Frequency Index (SAIFI) relates to sustained interruptions. The system average interruption frequency index gives information about the average frequency of sustained interruptions per customer over a predefined area. This index may be described in words as:

$$SAIFI = \frac{\text{Total Number of Customer Interruptions}}{\text{Total Number of Customers Served}}. \quad (1)$$

Figure 16:
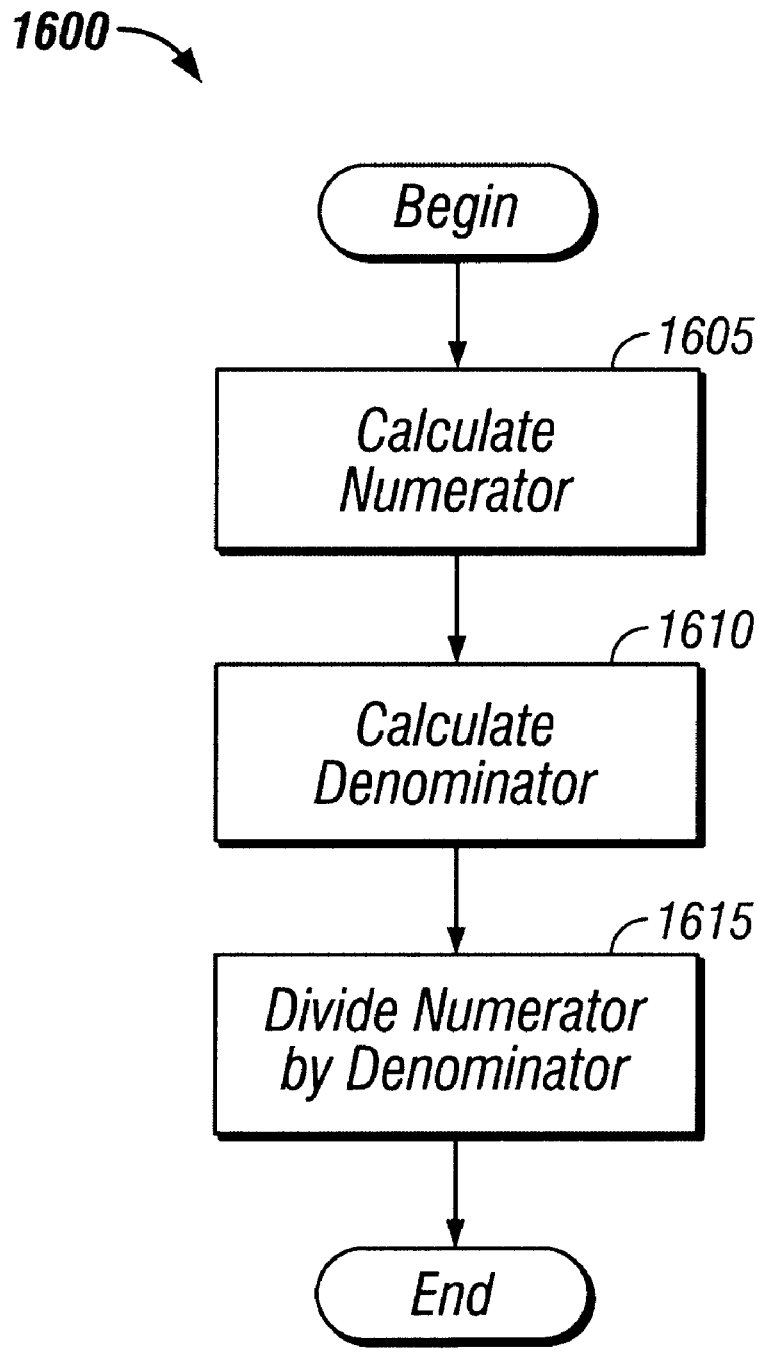
FIG. 16 is a flow chart of a procedure implemented by the optimization system for calculating reliability indices.

The processor 825, under control of the reliability module 905, calculates SAIFI according to a procedure 1600 detailed in FIG. 16. Initially, the processor calculates a numerator (step 1605). Then, the processor calculates a denominator (step 1610). After the numerator and the denominator are calculated, the processor divides the numerator by the denominator (step 1615).

The processor 825 calculates the numerator of the SAIFI index (step 1605) by determining the total number of customer sustained interruptions in a reporting period. Therefore, the processor sums, for all sustained interruption events in the reporting period, the number of interrupted customers $N_i$. The processor then calculates the denominator of the SAIFI index (step 1610) by counting a total number of customers served for the area, $N_T$. Therefore, SAIFI is calculated using the following equation:

$$SAIFI = \frac{\sum N_i}{N_T}. \quad (2)$$

FIG. 17 provides a table 1700 that shows a utility's customer information system (CIS) database for a particular feeder 1705 that serves 2000 customers (NT=2000) for a total load of 4 MW. In this example, the feeder circuit 1705 constitutes a "system" for which the indices are calculated. However, more typically, the "system" combines together all circuits for a region or for a whole company. Table 1700 displays interruption data for feeder 1705 during a year long reporting period. For each interruption event i 1707, a date is recorded in column 1710, a beginning time for the interruption is recorded in column 1715, an ending time for the interruption is recorded in column 1720, a number of interrupted customers Ni is recorded in column 1725, a load power is recorded in column 1730, and an interruption type (sustained s or momentary M) is recorded in column 1735. The restoration time $r_i$ for each interruption event is found by taking the difference between the ending time 1720 and the beginning time 1715.

Using table 1700 as an example, the SAIFI index for this customer database is calculated as:

$$SAIFI = \frac{200 + 600 + 25 + 90 + 700 + 1500 + 100}{2000} = 1.6075. \quad (3)$$

A System Average Interruption Duration Index (SAIDI) also relates to sustained interruptions. This index is commonly referred to as Customer Minutes or Hours of Interruption, and is designed to provide information about the average time the customers are interrupted. In words, the definition is:

$$SAIDI = \frac{\sum \text{Customer Interruptions Durations}}{\text{Total Number of Customers Served}}. \quad (4)$$

The processor 825, under control of the reliability module 905, calculates SAIDI according to the procedure 1600 detailed in FIG. 16. The processor calculates the SAIDI numerator by multiplying the number of interrupted customers $N_i$ by the restoration time $r_i$ for an interruption event and then summing all events in a reporting period. To determine the denominator in the SAIDI index (step 1610), the processor counts the total number of customers served for the area being indexed. Therefore, the SAIDI index may be written as:

$$SAIDI = \frac{\sum r_i \cdot N_i}{N_T}. \quad (5)$$

Using table 1700 as an example, the SAIDI index for this customer database is calculated as:

$$SAIDI = \quad (6)$$

$$\frac{(8.17 \cdot 200) + (71.3 \cdot 600) + (30.3 \cdot 25) + (267.2 \cdot 90) + (120 \cdot 700) + (10 \cdot 1500) + (40 \cdot 100)}{2000} = 86.11 \text{ min.}$$

A Customer Average Interruption Duration Index (CAIDI) also relates to sustained interruptions. CAIDI represents the average time required to restore service to the average customer per sustained interruption. In words, the definition is:

$$CAIDI = \frac{\sum \text{Customer Interruption Durations}}{\text{Total Number of Customer Interruptions}}(\text{Duration}). \quad (7)$$

The processor 825, under control of the reliability module 905, calculates CAIDI according to the procedure 1600 detailed in FIG. 16. The processor first sets a numerator of the CAIDI index equal to the value of the SAIDI index (step 1605). Then, the processor sets a denominator of the CAIDI index equal to the value of the SAIFI index (step 1610). Therefore, the CAIDI index may be written as:

$$CAIDI = \frac{\sum r_i \cdot N_i}{\sum N_i} = \frac{SAIDI}{SAIFI}. \quad (8)$$

An Average Service Availability Index (ASAI) represents a fraction of time (often written as a percentage) that a customer has power provided during one year or another defined reporting period. In words, the definition is:

$$ASAI = \frac{\text{Customer Hours Service Availability}}{\text{Customers Hours Service Demand}}. \quad (9)$$

To calculate the ASAI index, the processor uses the following equation:

$$ASAI = \frac{N_T \cdot (\text{No. Hours/Year}) - \sum r_i \cdot N_i}{N_T \cdot (\text{No. Hours/Year})}, \quad (10)$$

where No. Hours/Year is 8760 hours in a regular year, and 8784 hours in a leap year. Thus, an alternatively simpler formula that may also be used by the processor is:

$$ASAI = \frac{8760 - SAIDI}{8760}. \quad (11)$$

Using the example from table 1700, the ASAI index may be determined as:

$$ASAI = \frac{8760 \text{ hrs} - 1.43517 \text{ hrs}}{8760 \text{ hrs}} = 0.99984\%. \quad (12)$$

A Momentary Average Interruption Event Frequency Index (MAIFI$_E$) relates to momentary interruptions 405. MAIFI$_E$ is very similar to SAIFI, but it tracks the average frequency of momentary interruption events. In words, the definition is:

$$MAIFI_E = \frac{\text{Total No. of Customers Experiencing Momentary Interruption Events}}{\text{Total Number of Customers Served}}. \quad (13)$$

The processor 825, under control of the reliability module 905, calculates MAIFI$_E$ according to the procedure 1600 detailed in FIG. 16. The processor calculates the numerator in the MAIFI$_E$ index by multiplying the number of interrupting device events during the reporting period ID$_E$ by the number of interrupted customers during the reporting period $N_i$ and summing over all momentary interruption events. The processor then calculates the denominator in the MAIFI$_E$ index to be the total number of customers served for the area being indexed, $N_T$.

Written mathematically, the MAIFI$_E$ index is:

$$MAIFI_E = \frac{\sum ID_E \cdot N_i}{N_T}, \quad (14)$$

where $N_i$ is the number of customers experiencing momentary interruption events. The MAIFI$_E$ index does not include the events immediately preceding a lockout or sustained outage. That is, for customers that experience one or more momentary interruptions, followed by a sustained outage, the entire event is considered a sustained outage. The momentary interruptions are not counted for those customers that experience the sustained outage.

Other indices that are defined by the IEEE standard include a Customer Total Average Interruption Duration Index (CTAIDI) that relates to sustained interruptions, an Average Service Unavailability Index (ASUI) that represents a fraction of time (often written as a percentage) that a customer does not have power provided during one year or the defined reporting period, and a Momentary Average Interruption Frequency Index (MAIFI) that relates to momentary interruptions.

Recently, utility companies have begun using load-weighted indices such as a Load Average Interruption Frequency Index (LAIFI) and a Load Average Interruption Duration Index (LAIDI). These indices are calculated in the same manner as SAIFI and SAIDI, except that each customer affected by the fault is now weighted by that customer's load. The processor may be configured to calculate such load-weighted indices for utility companies that base their restoration practices on each customer's load. For example, because a shopping mall has a much greater load than a single-family house, a utility may focus service restoration measures on the shopping mall initially because an interruption in electricity at the shopping mall has an impact on more people than does an interruption in a small house.

Figure 18A:
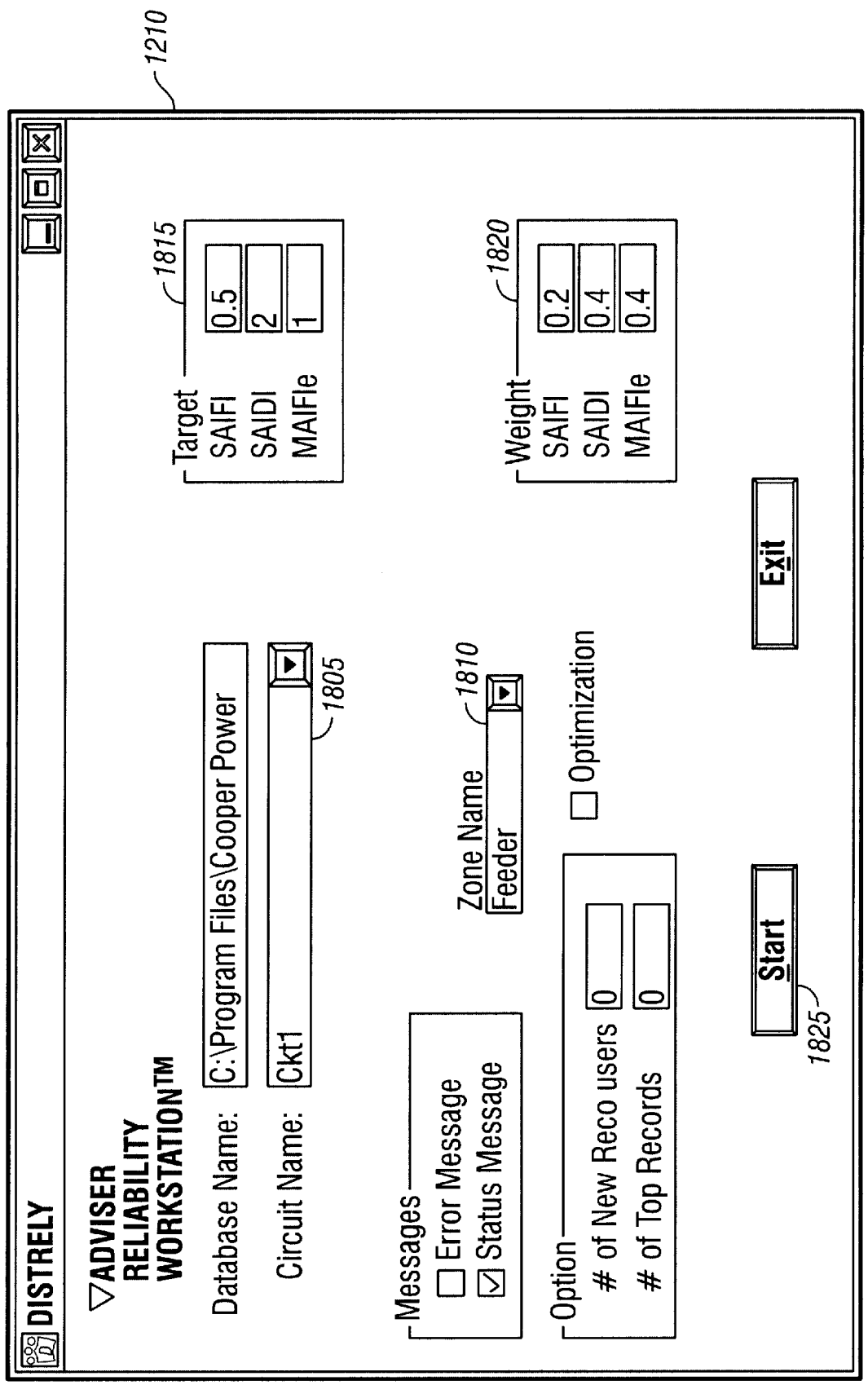
FIG. 18A is a window that is displayed when a reliability module in the optimization system is implemented.
Figure 19:
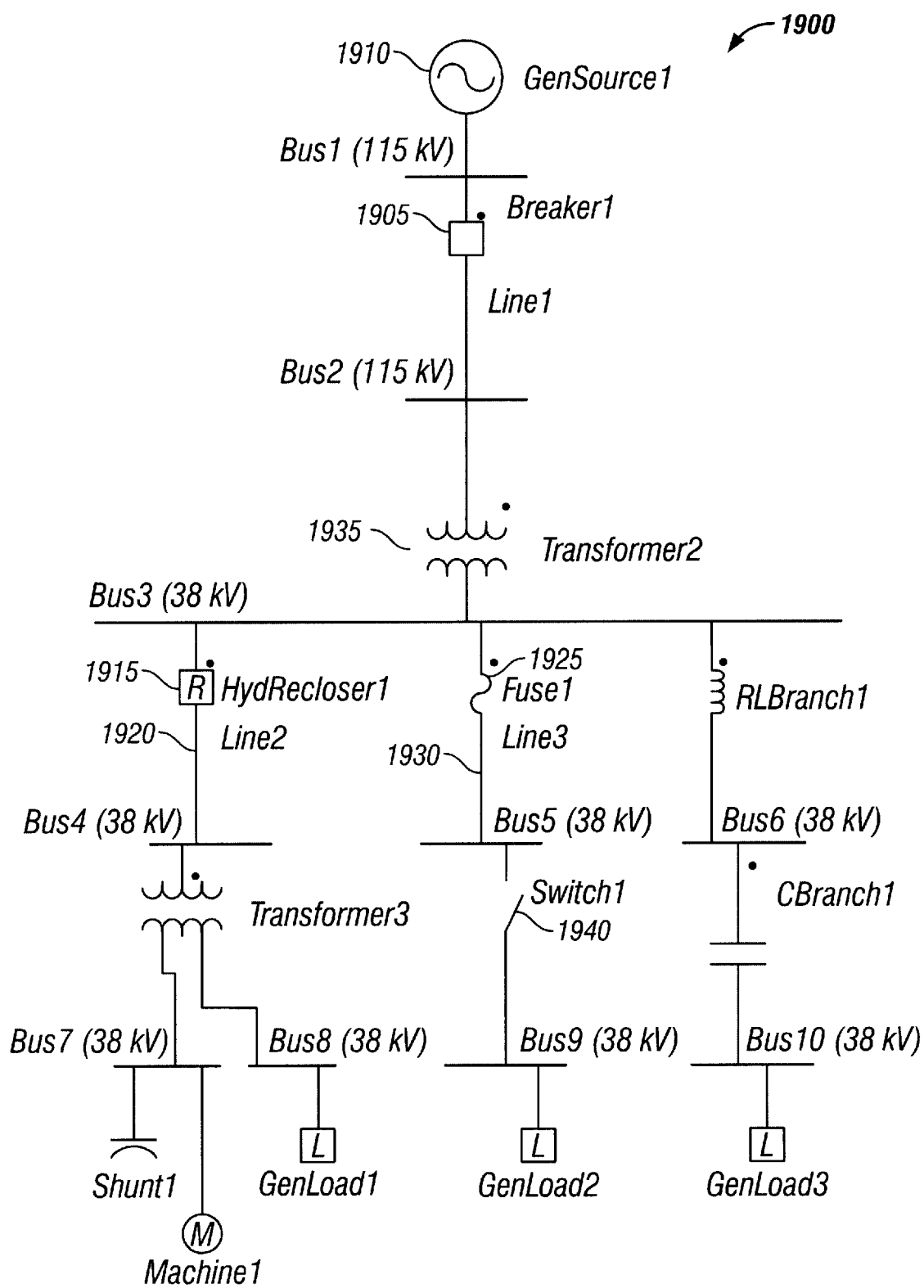
FIG. 19 is a circuit that may be built in a workspace of the GUI.

Referring also to FIG. 18A, when a user pulls down the application menu item 1145 and selects the DISTRELY menu 1210 to run the reliability module or when a user selects the DISTRELY shortcut button, a main DISTRELY dialog box 1210 is invoked. Using the dialog box 1210, the user can select a name of the circuit for which indices will be calculated using box 1805, and a name of a zone in which the circuit will be analyzed using box 1810. A circuit 1900 corresponding to name "Ckt1" in box 1805 is shown in FIG. 19.

Target reliability levels may be set in window 1815. In the implementation shown in FIG. 18A, three indices (SAIFI, SAIDI, and $MAIFI_E$) may be set. For example, in FIG. 18A, the user sets the target value for the SAIFI index to 0.5 outages per customer per year. The user also sets the target value for the SAIDI index to 2 hours of outages per customer per year. Finally, the user sets the target value for the $MAIFI_E$ index to 1.0 momentary outages per customer per year.

In window 1820, weights for each of the indices may be set, with a weight indicating an importance level for the corresponding index. Weights may be used by the processor to calculate a composite index of all indices, the composite index indicating a general level of reliability. Generally, the composite index is calculated using a composite equation that includes basic arithmetic operations applied to each of a set of reliability indices. Moreover, the composite equation may be edited or created in an equation parser by the user, thus permitting the user to form a reliability index suited for a specific application.

Figure 18B:
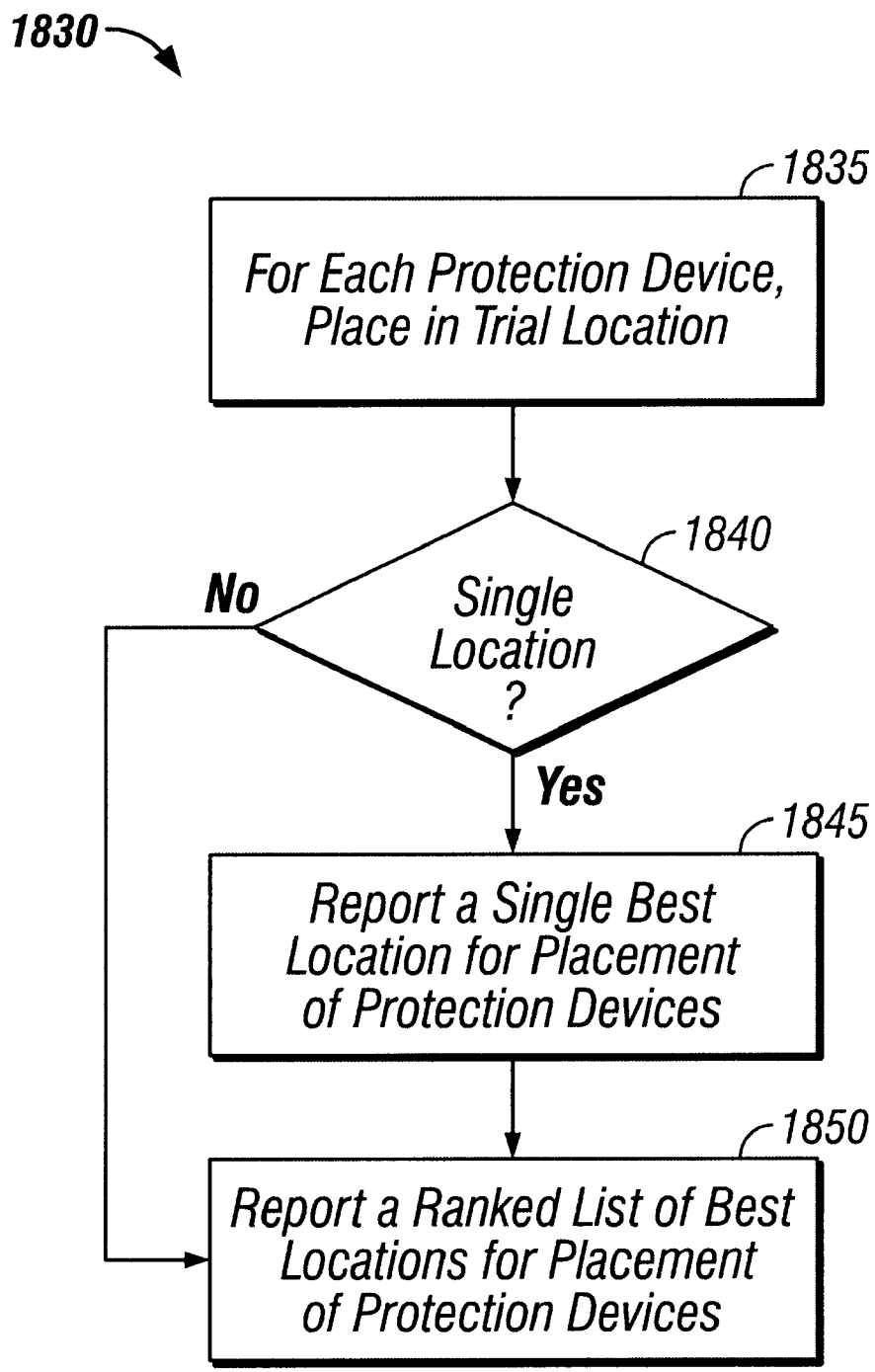
FIG. 18B is a flow chart of a procedure for predicting optimized placement of protection devices using a composite index of reliability.

Referring also to FIG. 18B, the processor, following a procedure 1830, may use the composite index to predict optimized placement of reclosers, sectionalizers, fuses, and other distribution system overcurrent protective devices to achieve greater system reliability. To perform this optimized placement analysis, the processor first makes trial placements of the devices at all possible locations in the distribution system (step 1835). Then, upon a choice made by the user (step 1840), the processor reports a single best location for the placement of one or more of the devices (step 1845). Alternatively, based on the user's choice (step 1840), the processor reports a ranked list of the n best (n is an integer) locations for the placement of one or more overcurrent protection devices (step 1850).

Target reliability levels indicate values of the reliability indices that typically optimize distribution system reliability. The most common reliability goals are concerned with SAIFI and SAIDI. One view is that SAIFI should be less than 1.5 outages per customer per year and SAIDI should be less than 1.5 hours of outage per customer per year. Once SAIFI and SAIDI goals are determined, other index goals may be derived. For the goals noted above, the index CAIDI has a goal value of 1.0, while the index ASAI has a goal value of 99.983%.

Often, utility companies have momentary outage goals as well, although these goals vary much more from utility to utility than the sustained outage goals described above. For example, one such goal may be that the index MAIFI should be less than 4.0 momentary outages per customer per year.

Under ideal conditions, the index SAIFI would equal 0.0, SAIDI would equal 0.0, CAIDI would equal 0.0, and ASAI would equal 1.000.

Referring also to FIG. 19, a one-line diagram or circuit 1900 may be created and edited in the V-GRAPH work space 1105. To build the one-line diagram 1900, the user first specifies a distance for each line and a number of customers that use each line. The user then may insert devices such as transformers and protection devices along the line.

Protection devices in circuit 1900 are chosen and placed to improve reliability. For example, a circuit breaker 1905 is placed at a power source 1910, a recloser 1915 is placed on a first feeder line 1920, and a fuse 1925 is placed on a second feeder line 1930. Other devices in circuit 1900 include a transformer 1935 after circuit breaker 1905 and a switch 1940 on the second line 1930.

Figure 20A:
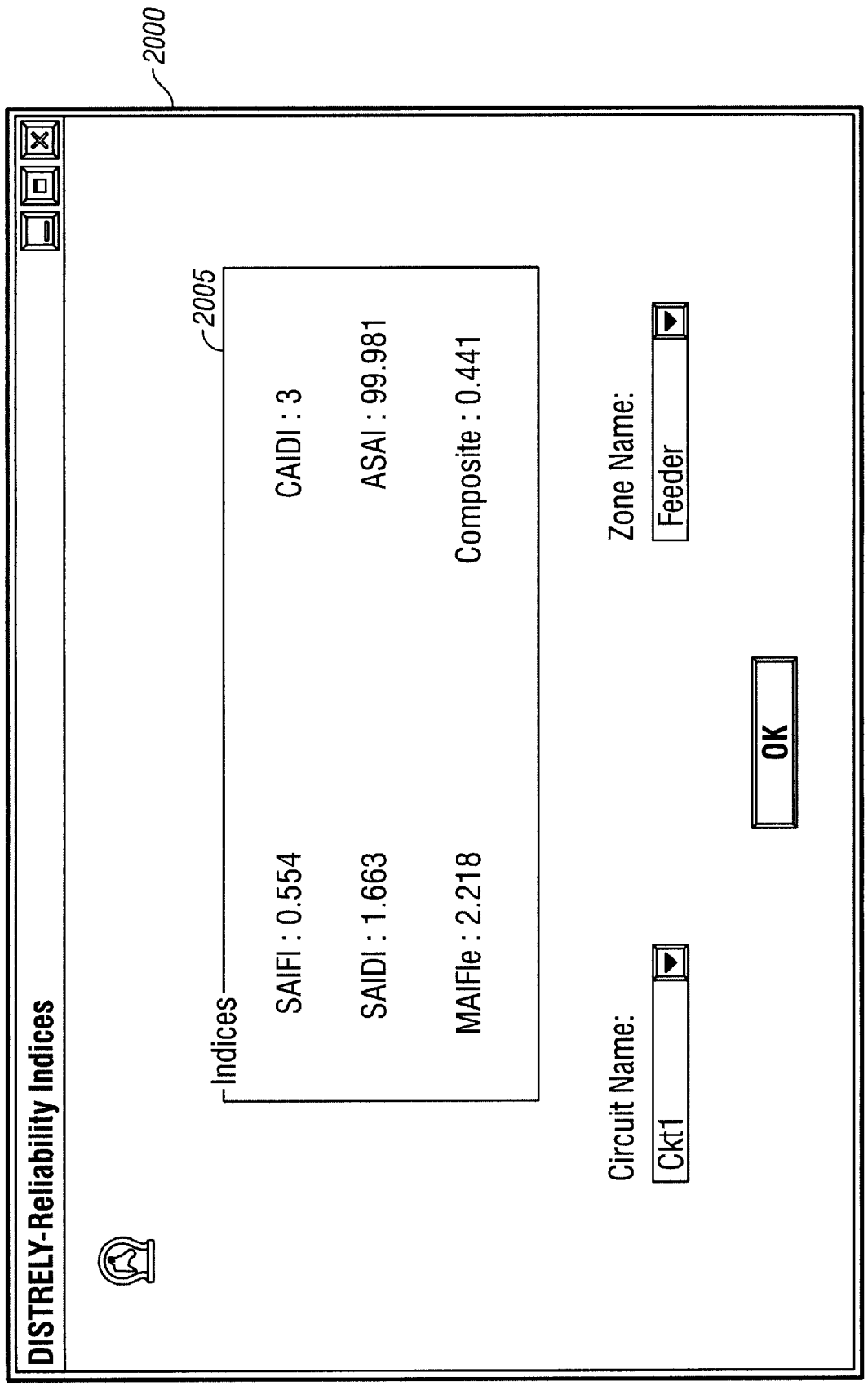
FIG. 20A is a window that displays reliability index results when the optimization system implements the reliability module for the circuit of FIG. 19.

After the user clicks the Start button 1825 in the DISTRELY window 1210, the processor calculates the reliability indices and the composite reliability index. Referring also to FIG. 20A, a DISTRELY results window 2000 may be opened by selecting "DISTRELY Results" from the View Results pull-down menu 1155. Within the results window 2000, an index window 2005 displays the calculated values for the reliability indices and the composite index. For example, in index window 2005, the SAIFI index has a calculated value of 0.554, while the target value was set to 0.5 in window 1210. The calculated SAIDI index, 1.663, is within the target goal of 2. On the other hand, the calculated $MAIFI_E$ index, 2.218, is not within the target goal of 1.

One way of improving the indices, and in particular the $MAIFI_E$ index, might be to add additional protection devices, coordinate operation of reclosers in the circuit 1900, or change a tripping time of the protection devices such as the circuit breaker 1905 or recloser 1915.

Referring again to FIG. 14C, a report may be generated that gives information about the circuit under analysis. An example of a typical DISTRELY line report is shown in table 2050 in FIG. 20B. This table lists all lines in the circuit under column labeled Line Name 2055, and gives basic information about each line such as connecting buses (column 2060), line length (column 2065), and number of customers fed by that line (column 2070). Important reliability values are displayed, such as Restoration Time after a fault occurrence (columns 2075 and 2080), fault incident rate (column 2085), and fraction of faults occurring on that line that are permanent (column 2090). This information may be used by the utilities to further inspect system reliability.

POWER FLOW MODULE

Referring again to FIG. 12E, the power flow module 915 (called V-FLOW) may be invoked using menu item 1200 in the pull down Application menu 1145 or through a special V-FLOW button on the toolbar 1122. Prior to running the V-FLOW load flow analysis module, the user must build or open a complete and error-free one-line circuit diagram in the work space 1105. Some common errors that occur while building a one-line circuit diagram include missing device data, missing devices, and unconnected circuit elements.

Because the V-FLOW module 915 only models three-phase balanced distribution line systems, V-FLOW is not used for unbalanced systems. For unbalanced systems, the Unbalanced Load Flow Module 930 may be invoked. Using V-FLOW 915, the processor 825 analyzes existing or proposed electrical distribution systems to determine commonly-monitored system operating characteristics such as bus voltages, branch currents, power flow, and power loss.

Figure 21A:
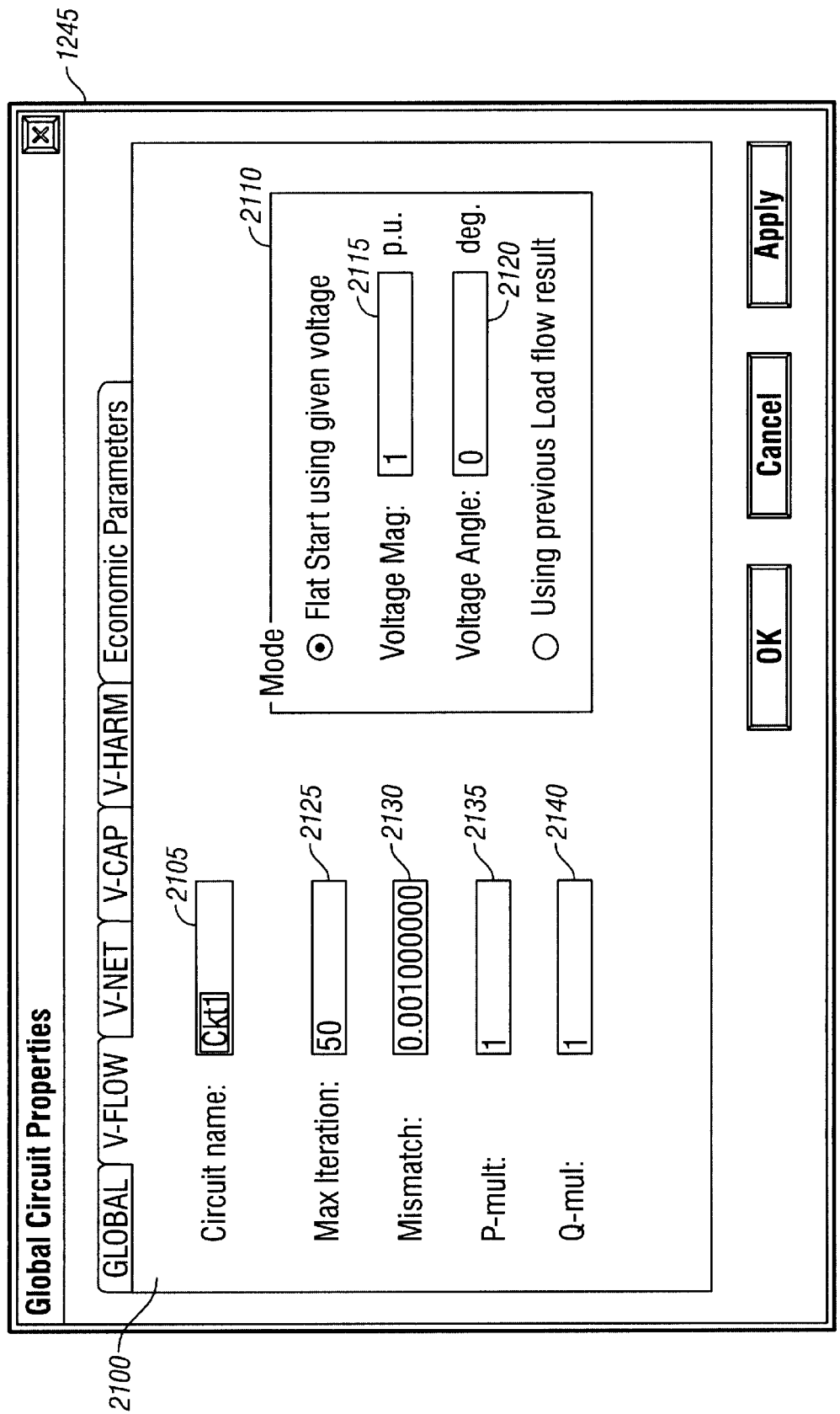
FIG. 21A is a window for setting default parameters for a power flow module implemented by the optimization system.

Referring also to FIG. 21A, default parameters for the V-FLOW analysis module may be set prior to running V-FLOW using the program options window 1245 accessed through the Tools menu 1150 or through a button along the toolbar 1122. A V-FLOW options window 2100 contains data pertaining only to calculations made by the V-FLOW analysis module 915.

A box labeled Circuit name 2105 allows a user to enter a circuit name of a drawing created using V-GRAPH. For example, the circuit name "Ckt1" is entered into box 2105, so that V-FLOW analysis, if begun, will operate on circuit 1900.

A box labeled Mode 2110 enables the user to select a starting value for the voltage used by the processor while operating the V-FLOW module. For example, in FIG. 21A, the user selected "Flat Start using given voltage." Therefore, when the processor runs the V-FLOW module, the voltage is taken from a user-input value. Boxes labeled Voltage Mag 2115 and Voltage Angle 2120 permit the user to enter, respectively, a starting voltage magnitude (in per unit (p.u.)) and a starting voltage angle (in units of angular degrees). In FIG. 21A, for example, the user has input a voltage magnitude of 1 p.u. and a voltage angle of 0 degrees.

A box labeled Max Iteration 2125 permits the user to select a number of iterations that the processor performs while running V-FLOW. In FIG. 21A, for example, the user has selected 50 iterations. A box labeled Mismatch 2130 permits the user to input a bus power mismatch factor. In FIG. 21A, for example, the user has input a value of 0.001.

Boxes labeled P-mult 2135 and Q-mult 2140 permit the user to enter, respectively, a factor to increase real power of all loads in the circuit and a factor to increase reactive or imaginary power of all loads in the circuit. In FIG. 21A, for example, the user has input a P-mult factor of 1 and a Q-mult factor of 1. These factors are quite useful when analyzing a circuit with a large number of loads. The user wanting to adjust all values of the loads may change them globally using P-mult or Q-mult, as opposed to individually.

Figure 21B:
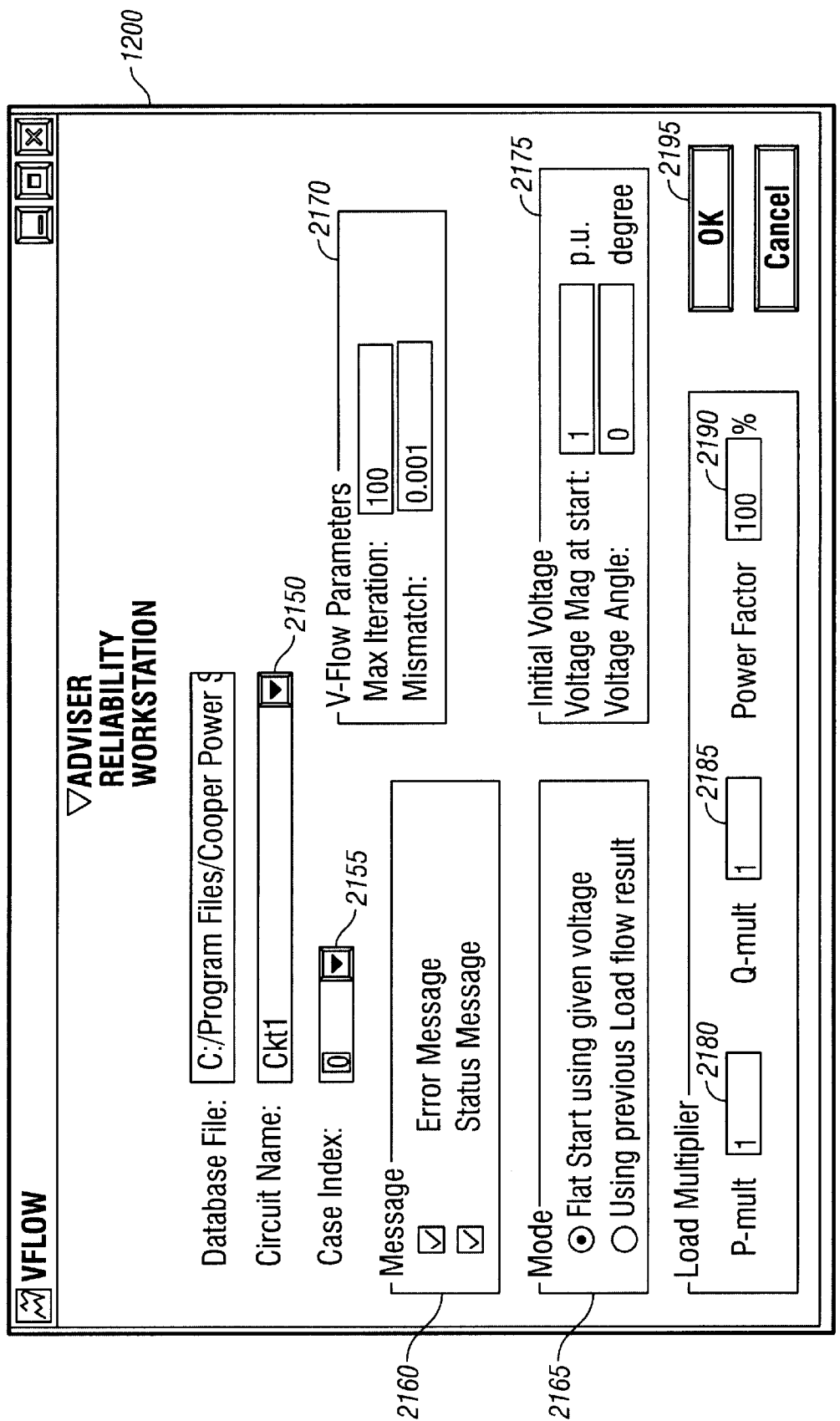
FIG. 21B is a window that is displayed when the power flow module is implemented.

Referring also to FIG. 21B, when the user selects the item V-FLOW 1200 from the Applications menu 1145 or from the tool bar 1122, a V-FLOW window 1200 is displayed to the user. The user may enter values for the circuit name in a Circuit Name box 2150, and a circuit case study in a Case Index box 2155. The circuit case study might correspond to several different device placement schemes for a single distribution system.

A user also may specify messaging during the processing through a Message box 2160. For example, to be notified of any error occurring during processing, "Error Message" may be checked in the Message box 2160.

The user may select a mode through a Mode box 2165 (similar to box 2110 in window 1200). Furthermore, the user may enter iteration and mismatch parameters in a V-FLOW Parameters box 2170 (similar to boxes 2125 and 2130 in window 1200), Voltage values in an Initial Voltage box 2175, and Voltage factors in boxes P-mult 2180 and Q-mult 2185 (similar to boxes 2135 and 2140 in window 2100). Lastly, a power factor may be set in box 2190. Because average power directly depends on the cosine of a phase angle difference $\phi$ between the current and the voltage, maximum power coupling is achieved when cos $\phi$ is close to unity. Therefore, the term cos $\phi$, deemed to be the power factor, is preferably unity. This optimum value occurs when the phase difference $\phi$ is zero.

Figure 22:
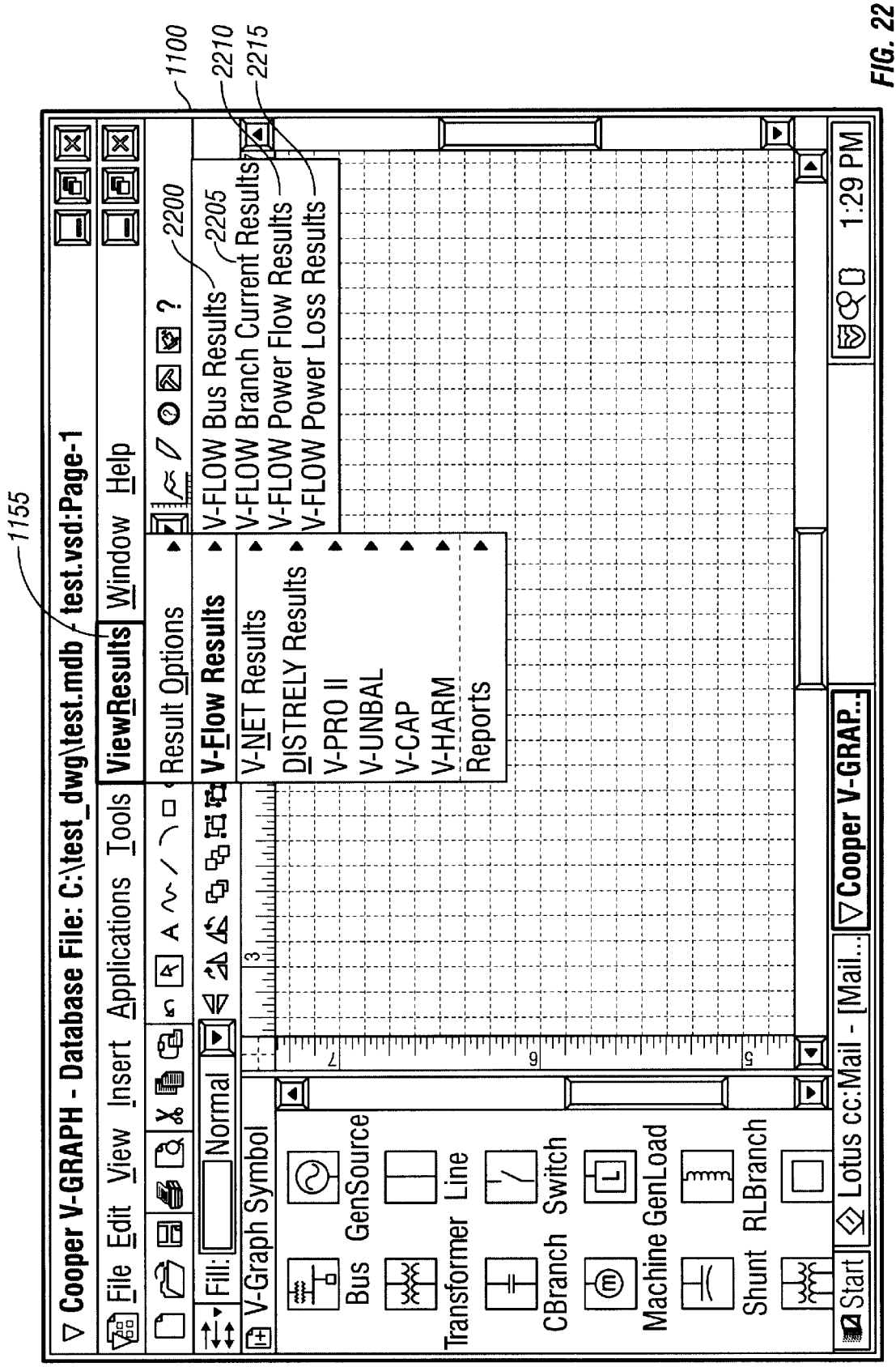
FIG. 22 is a screen shot of the menu items for displaying results of the power flow module implementation.

After a user clicks an OK button 2195, the processor, under control of the power flow module 915, computes voltages at all buses and currents in all branches of the selected circuit. Referring also to FIG. 22, upon completion of the V-FLOW analysis, a user may select from the pull-down menu View Results 1155 either results for bus voltages 2200, branch current values 2205, power flow through the circuit 2210, or power loss through the circuit 2215. Results are displayed directly in the work space 1105 within a text box.

Figure 23A:
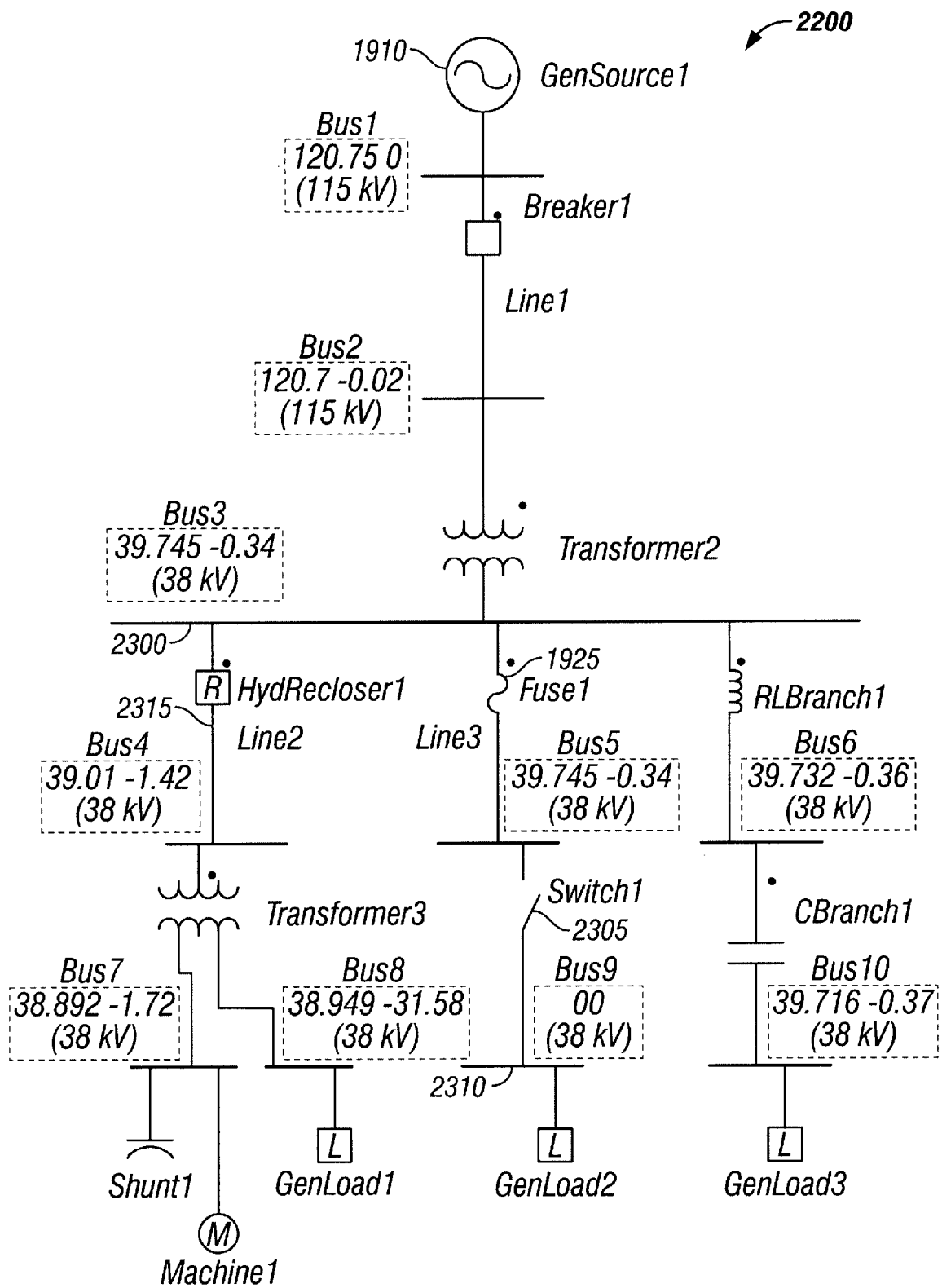
FIGS. 23A–D are results, shown for the circuit of FIG. 19, after the optimization system implements the power flow module.

Referring also to FIG. 23A, results for bus voltages 2200 are shown for circuit 1900 using settings in FIG. 21B. Results, given in text boxes that are highlighted for clarity, include a voltage magnitude (that may be set in units of kV) and a voltage phase angle (in units of angular degrees) difference between the voltage phase at the bus and the voltage phase at the source. For example, the calculated voltage magnitude for Bus3 2300, which has an optimum voltage rating at 38 kV, is 39.745 kV, and the calculated voltage phase angle is −0.34°. Because a Switch1 2305 upstream from Bus9 2310 is open, the calculated voltage magnitude for Bus9 is 0 kV.

Figure 23B:
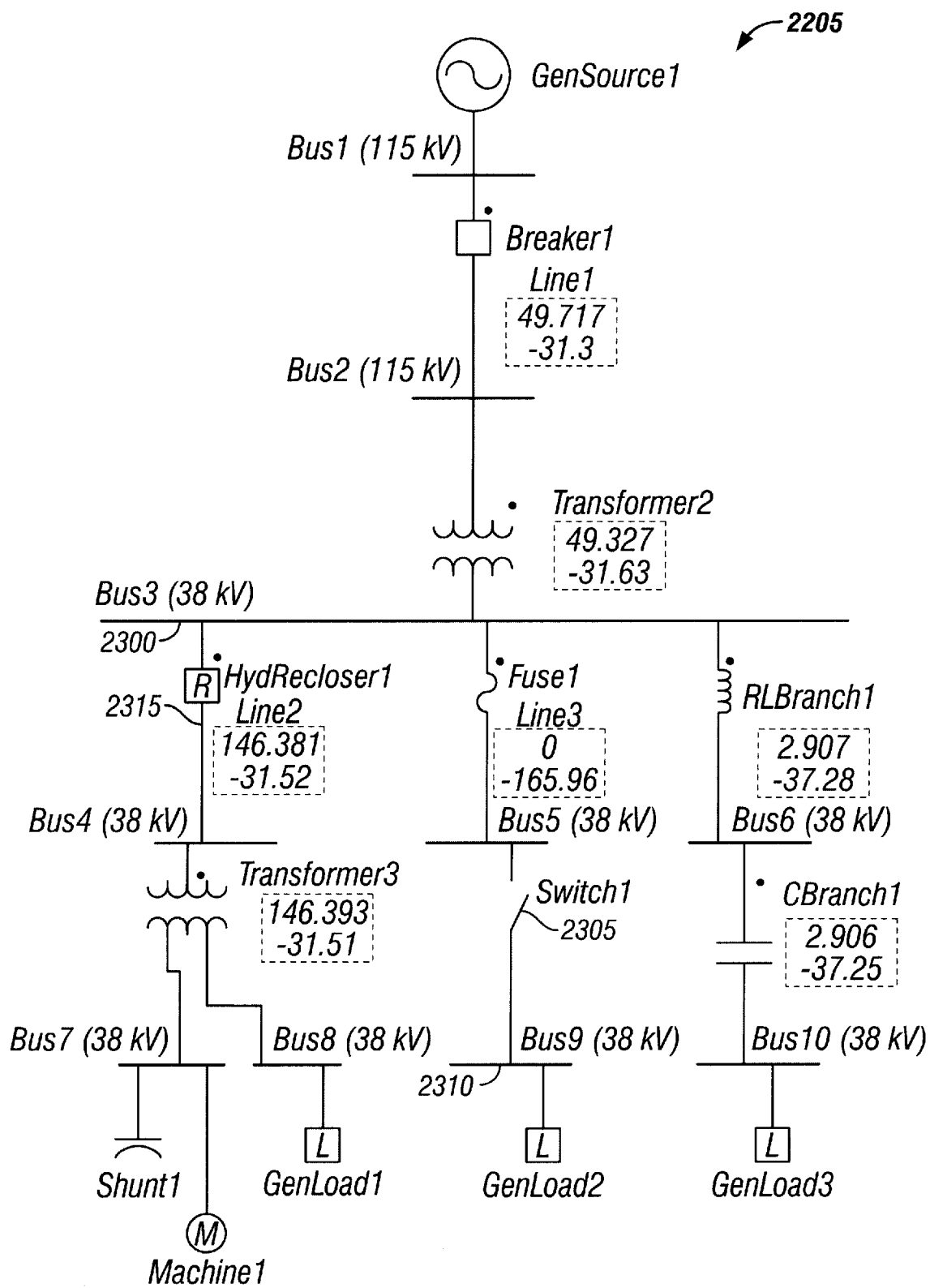

Referring also to FIG. 23B, results for branch current values 2205 are shown for circuit 1900 using settings in FIG. 21B. Results, given in text boxes that are highlighted for clarity, include a current magnitude (that may be set in units of A) and a current phase angle (in units of angular degrees) difference between the current phase on the branch and the current phase at the source. For example, the calculated current magnitude for Line2 2315 is 146.381 A, and the calculated current phase angle is −31.52°. Because the Switch1 2305 downstream from Bus5 is open, the calculated current magnitude for Line3 is 0 A.

Figure 23C:
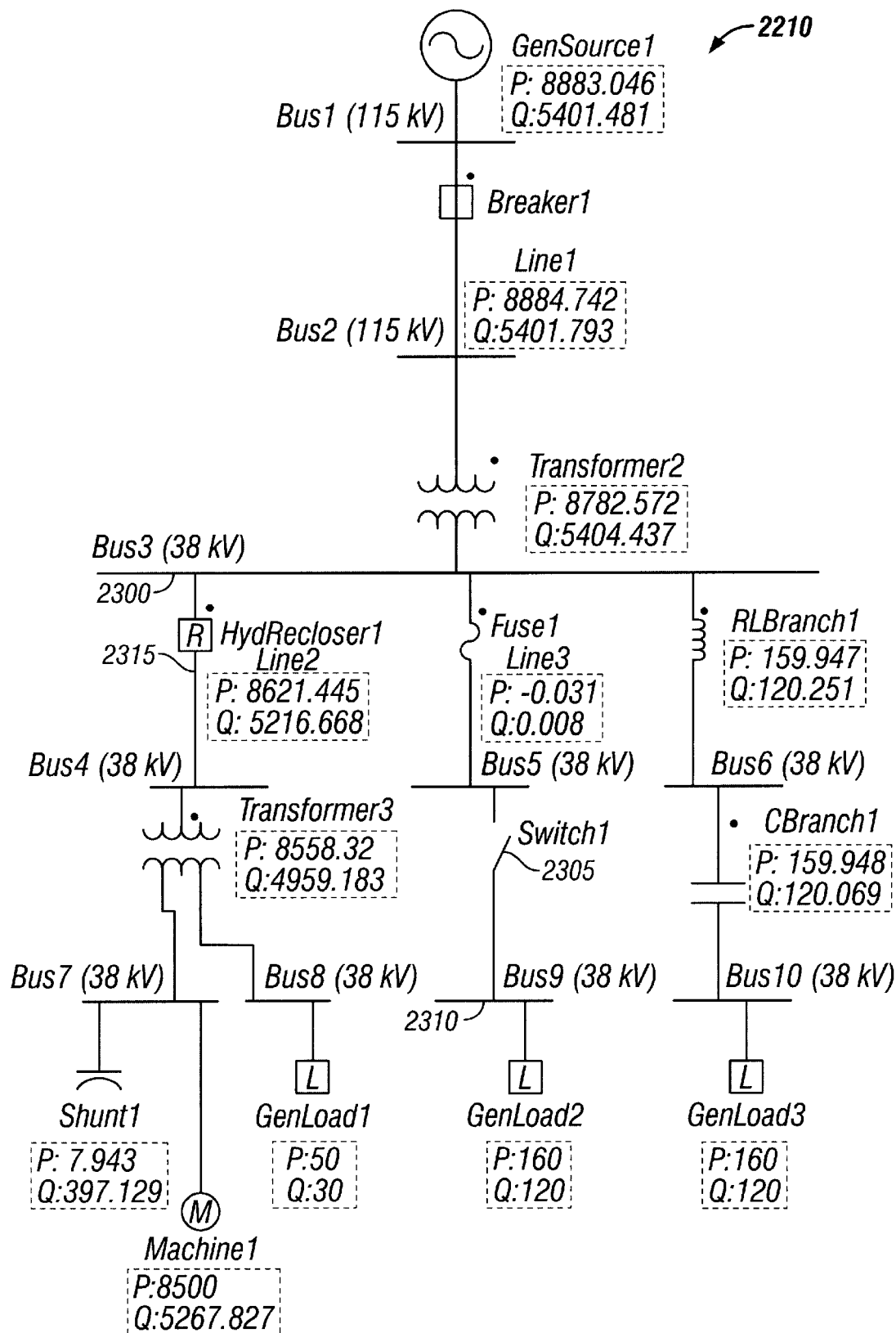

Referring also to FIG. 23C, results for power flow 2210 are shown for circuit 1900 using settings in FIG. 21B. Results, given in text boxes that are highlighted for clarity, include a real component P of the power (that may be set in units of kVA) and an imaginary component Q of the power (in units of kVA). For example, the calculated real power flow component for Line2 2315 is 8621.445 kVA, and the calculated imaginary power flow component for Line2 2315 is 5216.668 kVA.

Figure 23D:
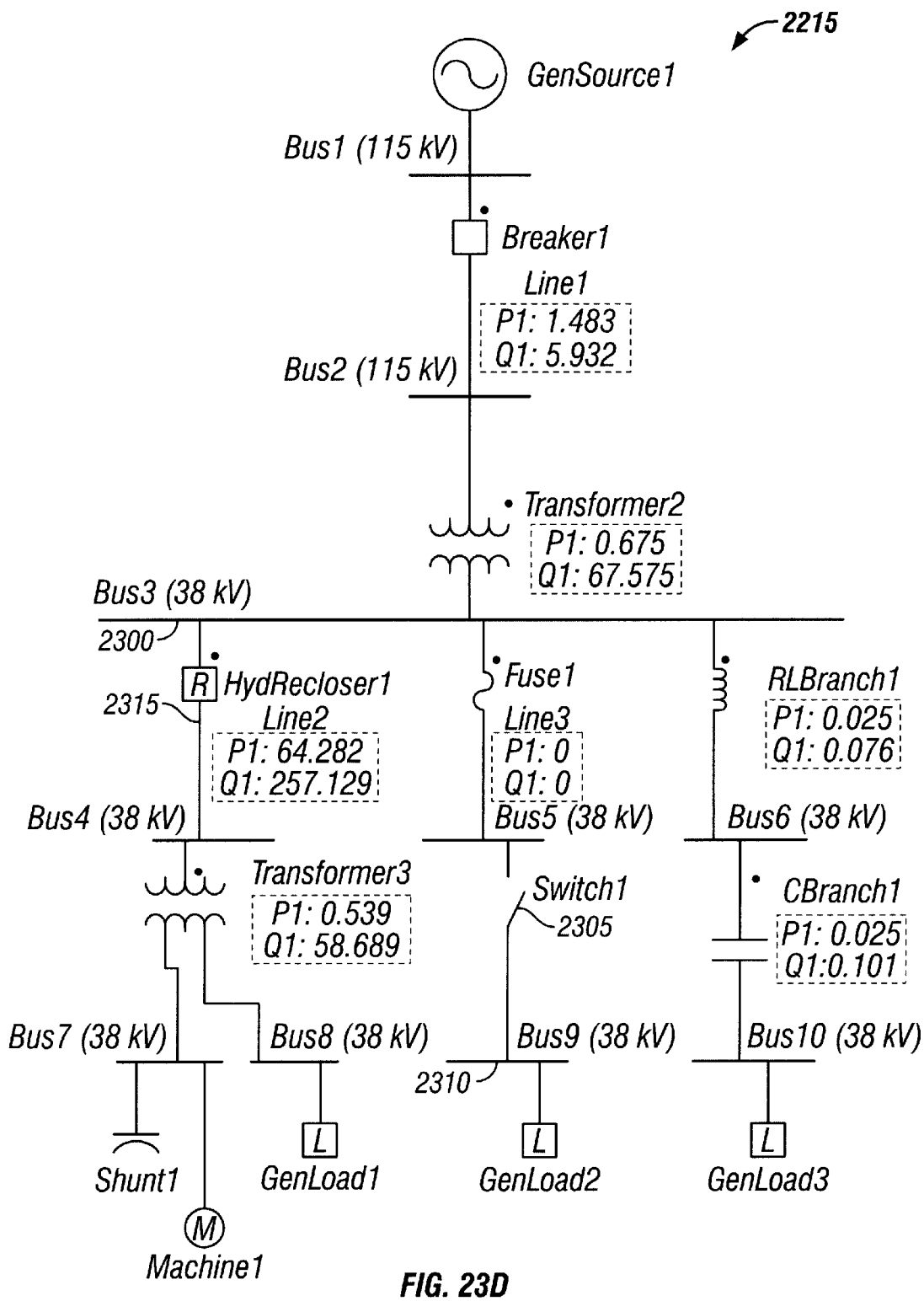

Referring also to FIG. 23D, results for power loss 2215 are shown for circuit 1900 using settings in FIG. 21B. Results, given in text boxes that are highlighted for clarity, include a real component Pl of the power loss (that may be set in units of kVA) and an imaginary component Ql of the power loss (in units of kVA). For example, the calculated real power loss component Pl for Line2 2315 is 64.282 kVA, and the calculated imaginary power loss component Ql for Line2 2315 is 257.129 kVA.

SHORT CIRCUIT MODULE

Referring again to FIG. 12E, the short circuit module 920 (called V-NET) may be invoked by clicking on menu item 1205 in the pull down Application menu 1145 or by clicking on a special V-NET button on the toolbar 1122. Prior to running the V-NET fault analysis module, the user must build or open a complete and error-free one-line circuit diagram in the work space 1105, and specify a fault type and location. It is only possible to specify one fault in a V-NET analysis. If multiple fault analyses are desired, the user must specify the separate faults one at a time and run V-NET for each fault.

Using V-NET 920, the processor 825 analyzes existing or proposed electrical distribution systems to determine currents and voltages when the circuit is shorted. V-NET 920 is used to, study "what if" cases and therefore may be used to improve system reliability by predicting what happens if a fault occurs at a particular location in the circuit.

Figure 24A:
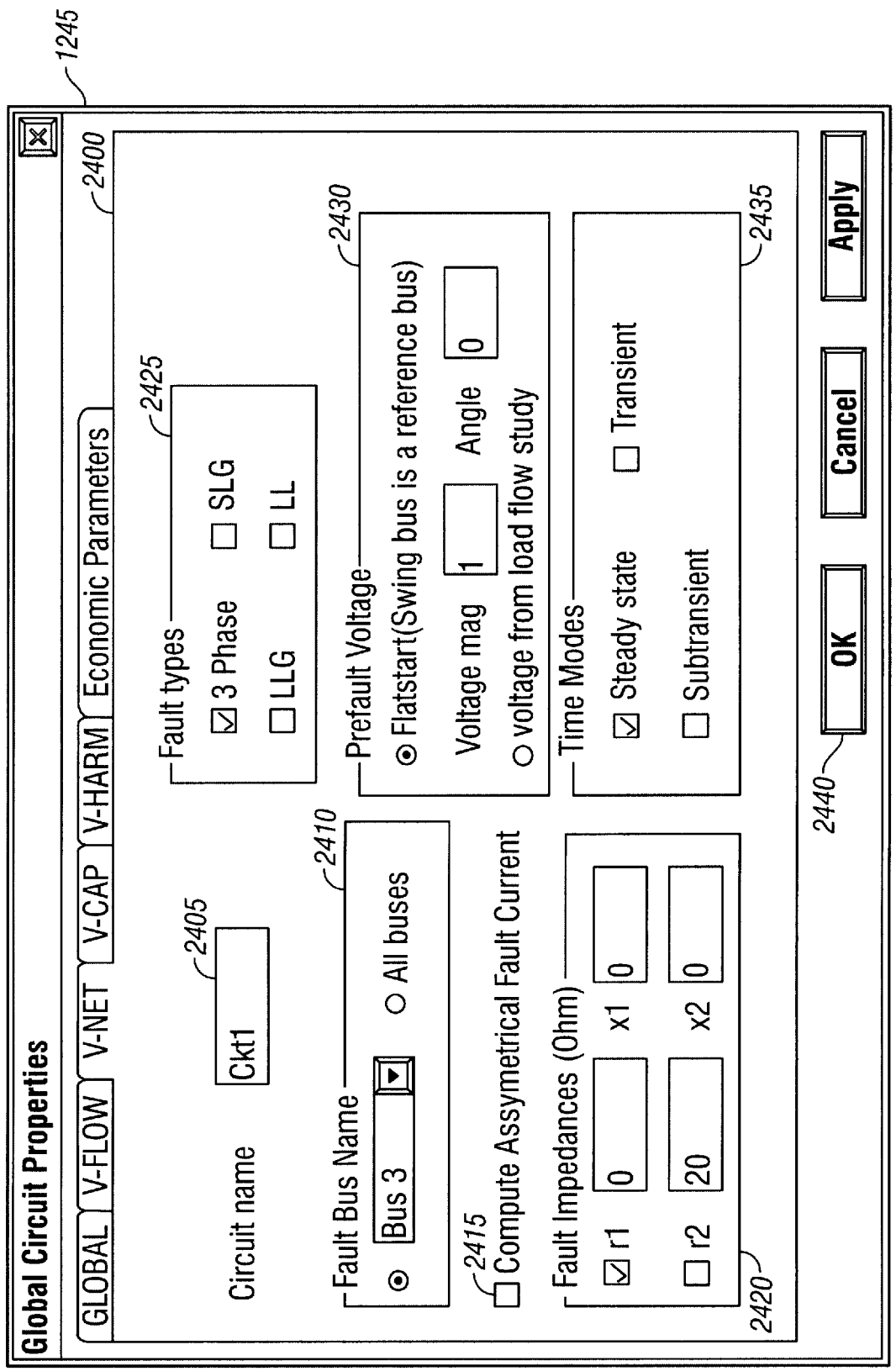
FIG. 24A is a window for setting default parameters for a short circuit module implemented by the optimization system.

Referring also to FIG. 24A, default parameters for the V-NET analysis module may be set prior to running V-NET using the program options window 1245 accessed through the Tools menu 1150 or through a button along the toolbar 1122. A V-NET options window 2400 contains data pertaining only to calculations made by the V-NET analysis module 920.

A box labeled Circuit name 2405 allows a user to enter a circuit name of a drawing created using V-GRAPH. For example, the circuit name "Ckt1" is entered into box 2405, so that V-NET analysis, if begun, will operate on circuit 1900.

A box labeled Fault Bus Name 2410 permits the user to enter a bus location at which the fault could occur. The user may enter a single bus location, or select all bus locations.

A box labeled Compute Asymmetrical Fault Current 2415, when checked by the user, would cause the processor to determine current for an asymmetrical fault at the selected bus. An asymmetrical fault is a fault that is not symmetrical about the x-axis.

A box labeled Fault Impedances (Ohm) 2420 enables the user to input real and imaginary values of the fault impedance.

A box labeled Fault Types 2425 enables the user to select the type of fault that occurs from among several options. Option labeled 3 Phase indicates the fault occurs across all three phases, that is, the circuit is shorted from phase to phase to phase. Option labeled SLG indicates the fault occurs from a single phase to ground, that is, the circuit is shorted from phase to ground. Option labeled LLG indicates the fault occurs across two phases and to ground, that is, the circuit is shorted from phase to phase to ground. Option labeled LL indicates the fault occurs across two phases, that is, the circuit is shorted from phase to phase.

A box labeled Prefault Voltage 2430 enables the user to select the voltage at the bus before the start of the fault. A box labeled Time Modes 2435 permits the user to enter information about the time nature of the fault, for example, if the fault is transient or steady state.

Figure 24B:
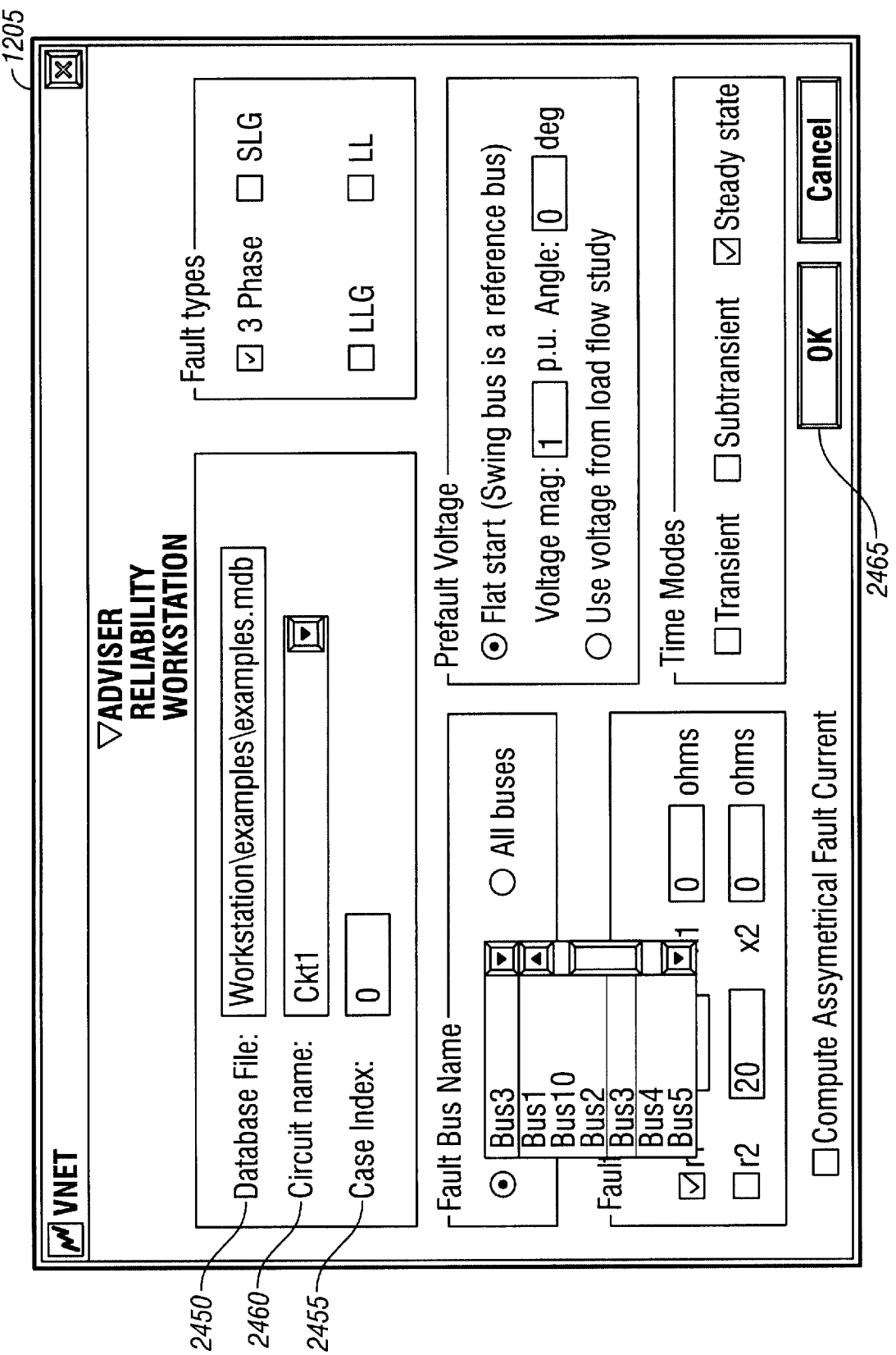
FIG. 24B is a window that is displayed when the short circuit module is implemented.

After the user selects an OK button 2440, the default properties are entered for V-NET. Now the user may invoke the short circuit module 920 through the pull down Application menu 1145 or through a special V-NET button on the toolbar 1122. Referring also to FIG. 24B, upon invoking the short circuit module, a V-NET application window 1205 is displayed to the user. The V-NET application window 1205 contains many of the same selections as the V-NET default window 2400 and reference is made to the above description with respect to FIG. 24A.

In the V-NET application window 1205, the user may select a Database File in box 2450 and a Case Index in box 2455 in addition to a Circuit Name in box 2460. Once all data is entered into window 1205, the user may run V-NET by clicking an OK button 2465. The processor 825 then calculates voltages at all buses, current through the branches, and current through the fault.

Figure 24C:
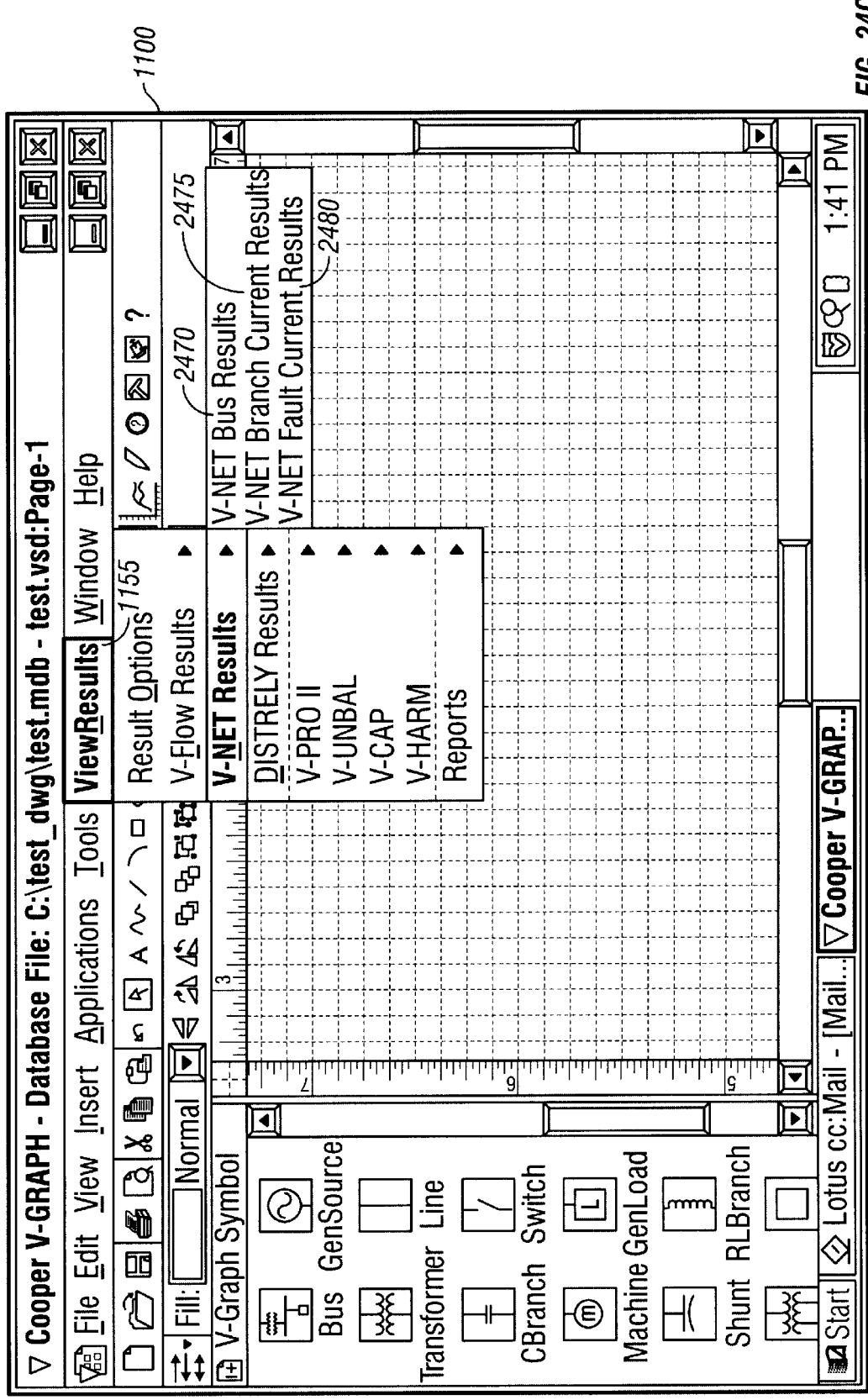
FIG. 24C is a screen shot of menu items for displaying results of the short circuit module implementation.

Referring also to FIG. 24C, upon selecting the View Results pull down menu 1155, the user may view V-NET results by clicking on one of several results options: Bus Results 2470, Branch Current Results 2475, and Fault Current Results 2480. Results are shown directly on the work space 1105 within a text box that is placed near the analyzed circuit device.

Figure 25A:
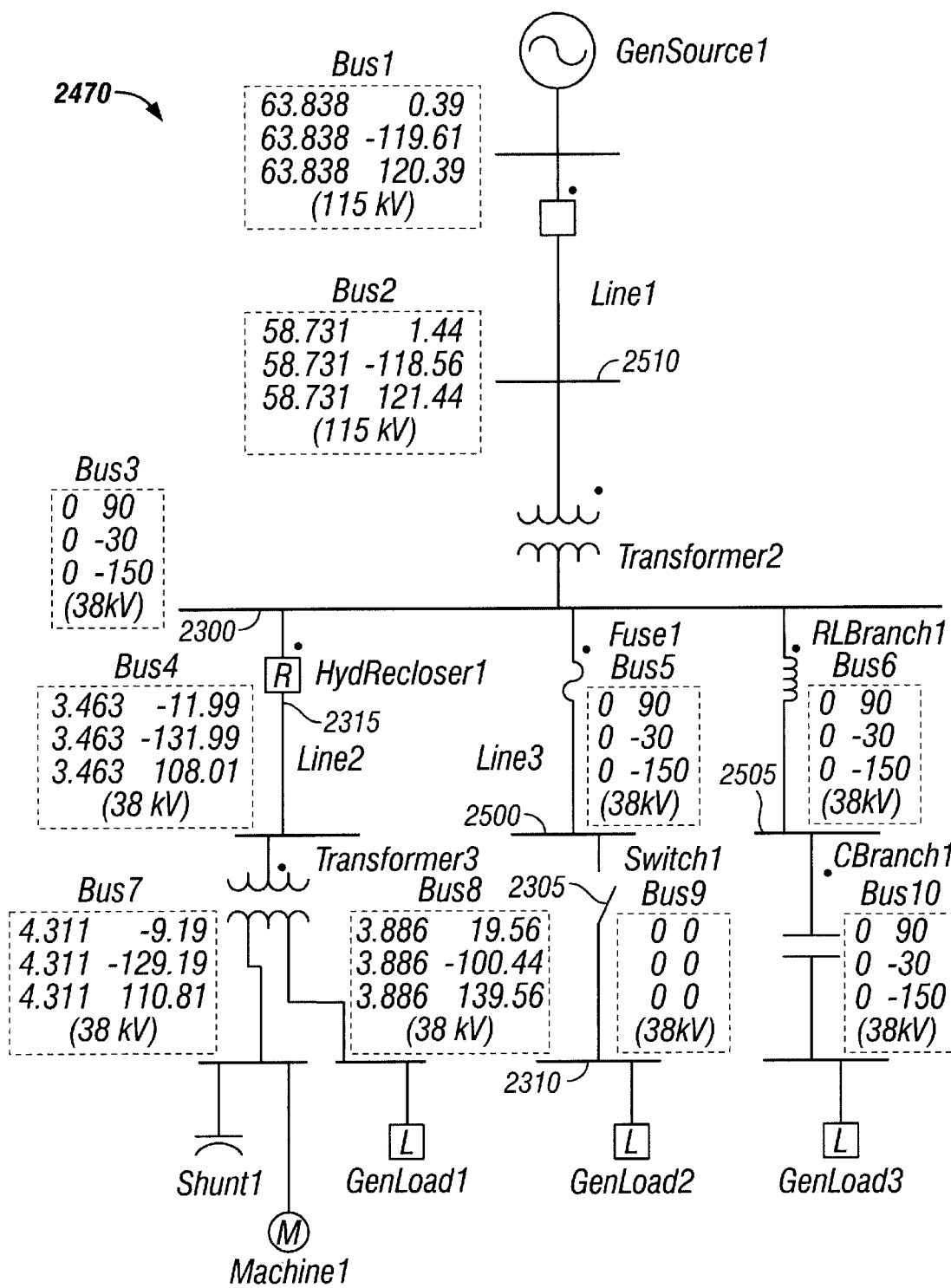
FIGS. 25A–C are results, shown for the circuit of FIG. 19, after the optimization system implements the short circuit module.
Figure 25B:
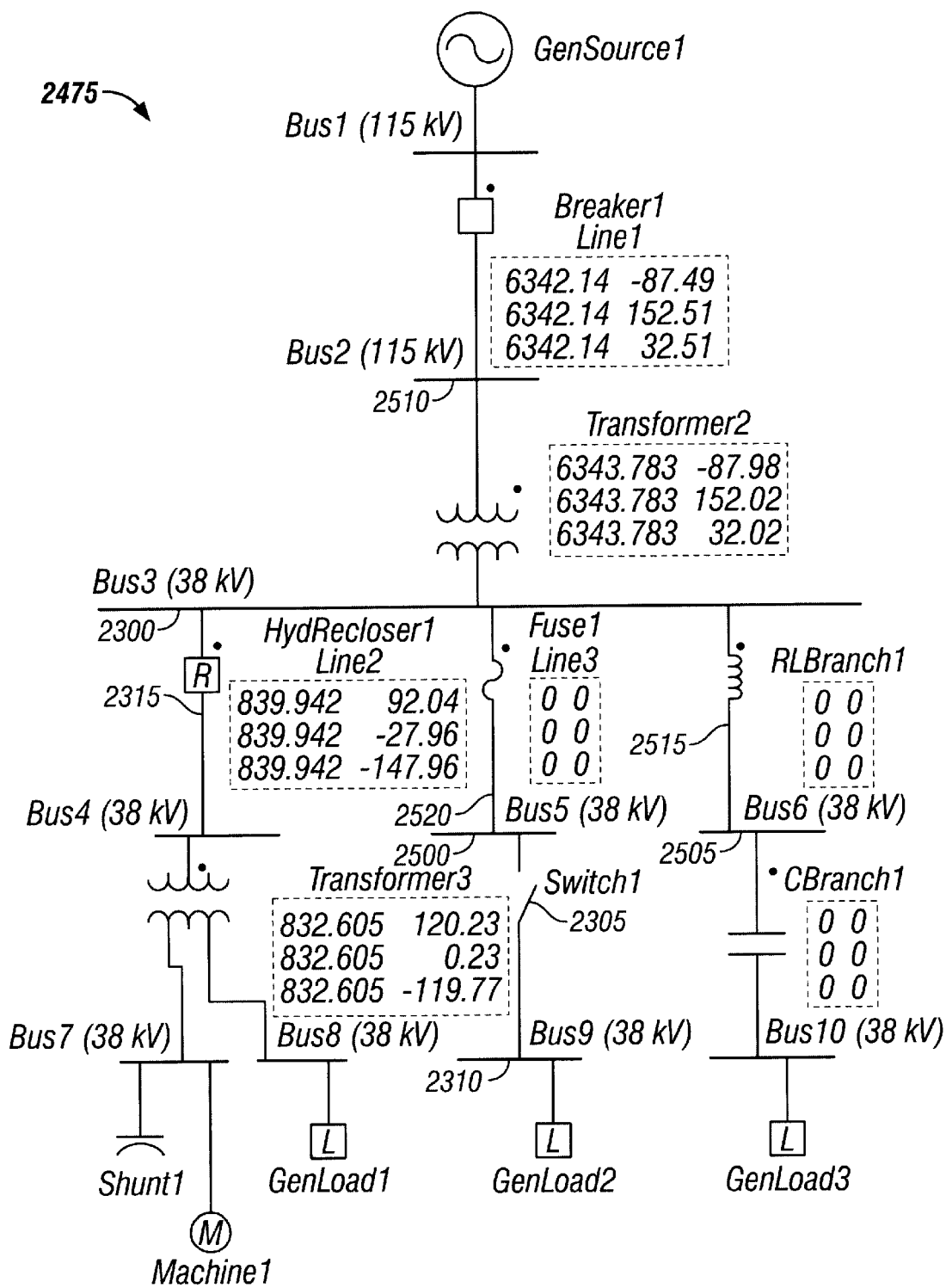
Figure 25C:
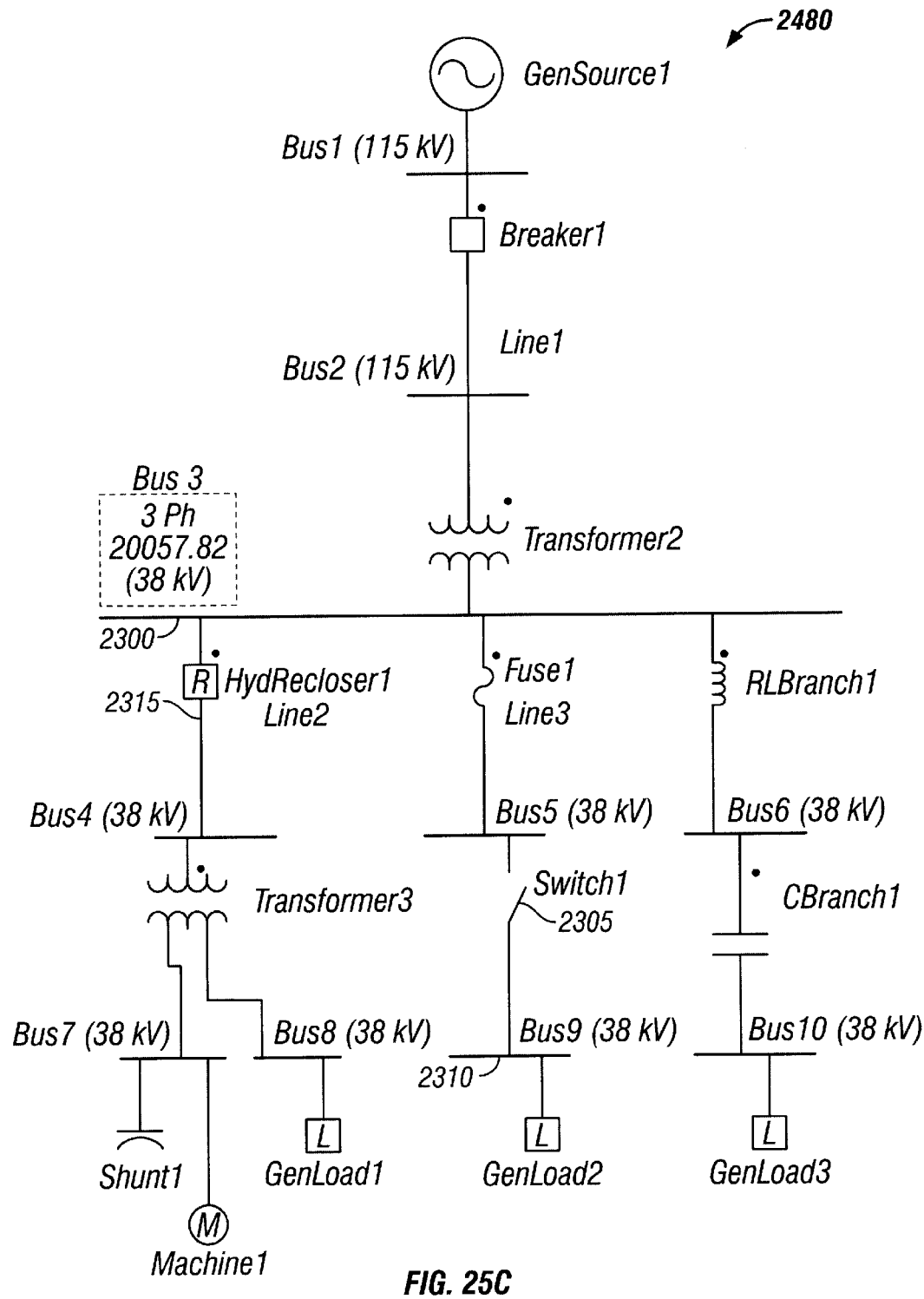

Referring also to FIGS. 25A–25C, V-NET results for circuit 1900 are displayed in highlighted text boxes.

In FIG. 25A, bus Voltage results 2470 are shown for each phase. Each of the first three lines in the text box gives a voltage magnitude (in units of kV) followed by a relative phase angle (in angular degrees). For example, for a fault that occurs at Bus3, there would be no voltage surge at buses parallel to Bus3, such as Bus5 2500 or Bus6 2505. However, there is a voltage at Bus2 2510, that is, 58.731 kV magnitude on each phase.

In FIG. 25B, line current results 2475 are shown for each phase. Each of the three lines in the text box gives a current magnitude (in units of A) followed by a relative phase angle (in degrees). For example, for the fault that occurs at Bus3, there would be no current through lines parallel the line downstream of the fault, such as RLBranch1 2515 or Line3 2520. However, there is a current at Line2 2315 of 839.942 A on each phase.

In FIG. 25C, fault current results 2480 are shown for the selected bus, that is Bus3 2300. The first line in the text box at Bus3 indicates the type of fault occurring at Bus3, namely 3 Ph for this example. The second line in the text box at Bus3 indicates the current across the fault, namely 20057.82 A.

PROTECTION MODULE

Referring again to FIG. 12E, the protection module 925 (called V-PRO II) may be invoked by clicking on menu item 1215 in the pull down Application menu 1145 or by clicking on a special V-PRO II button on the toolbar 1122.

Using V-PRO II 925, the processor 825 analyzes existing or proposed electrical distribution systems to determine overcurrent device coordination. Equipment damage in the distribution system may be minimized or even prevented when overcurrent protection devices are properly applied and properly and accurately coordinated. Furthermore, overcurrent protection device coordination in the distribution system can greatly improve electrical power service to customers.

To maximize power system reliability, overcurrent protection devices are selected and set such that, in the event of a fault, electrical power flow is interrupted to the smallest possible extent. For example, if a fault occurs at or near a distant terminus of a distribution feeder, it is only necessary to shut off power to the faulted part of the feeder. It is wasteful and inefficient to shut off power to the entire feeder. Proper sectionalizing of power distribution systems by overcurrent protection devices, and the proper coordination of these devices produces dramatically increased system reliability. Default parameters for the V-PRO II analysis module 925 may be set prior to running V-PRO II using the program options window 1245 accessed through the Tools menu 1150 or through a button along the toolbar 1122. A V-PRO II options window (not shown) contains data pertaining only to calculations made by the V-PRO II analysis module 925. The V-PRO II options window has the same input boxes as a V-PRO II application window, and therefore the below description of the application window pertains also to the options window.

When V-PRO II is run, the processor displays in the work space 1105 a time current characteristic (TCC) window that displays TCC curves for phase and ground coordination of a selected device. While running the V-PRO II analysis, the user may select devices in the circuit by, for example, double clicking on the device. After double clicking, the TCC curve for that selected device will be displayed in the TCC window.

The V-PRO II analysis module uses an extensive device and TCC curve database that may be easily expanded by the user.

After the user selects V-PRO II 1215 from the Application pull down menu 1145 or after selecting V-PRO II from an icon on the toolbar 1122, a V-PRO II application window 1215 is displayed to the user.

A Database Name is displayed in box 2600. The user may select a circuit to analyze using a Circuit Name box 2605.

A TCC Window Settings box 2610 enables the user to control the configuration of the TCC grid. For example, the user may adjust the interval on the current axis by entering data in the I Int boxes 2615. Likewise, the user may adjust the interval on the time axis by entering data in the T Int boxes 2620. A current scale may be set by clicking on an appropriate I Scale button 2625, and a time scale may be set by clicking on an appropriate T Scale button 2630. The user may select a grid choice 2635 by clicking on either Simple or Full. And, if the Common Base Voltage is enabled, the user may enter the value in kV in window 2640.

The user may select a device in the circuit to be analyzed by clicking a device from a pull down menu 2645. Furthermore, the user may select all devices from the circuit by clicking on an "All Devices" choice from the pull down menu 2645. These selections may be changed after the TCC window is opened. On the other hand, the user may choose not to enter the devices into the application window 1215, but may select the device only after the TCC window is opened.

Figure 26A:
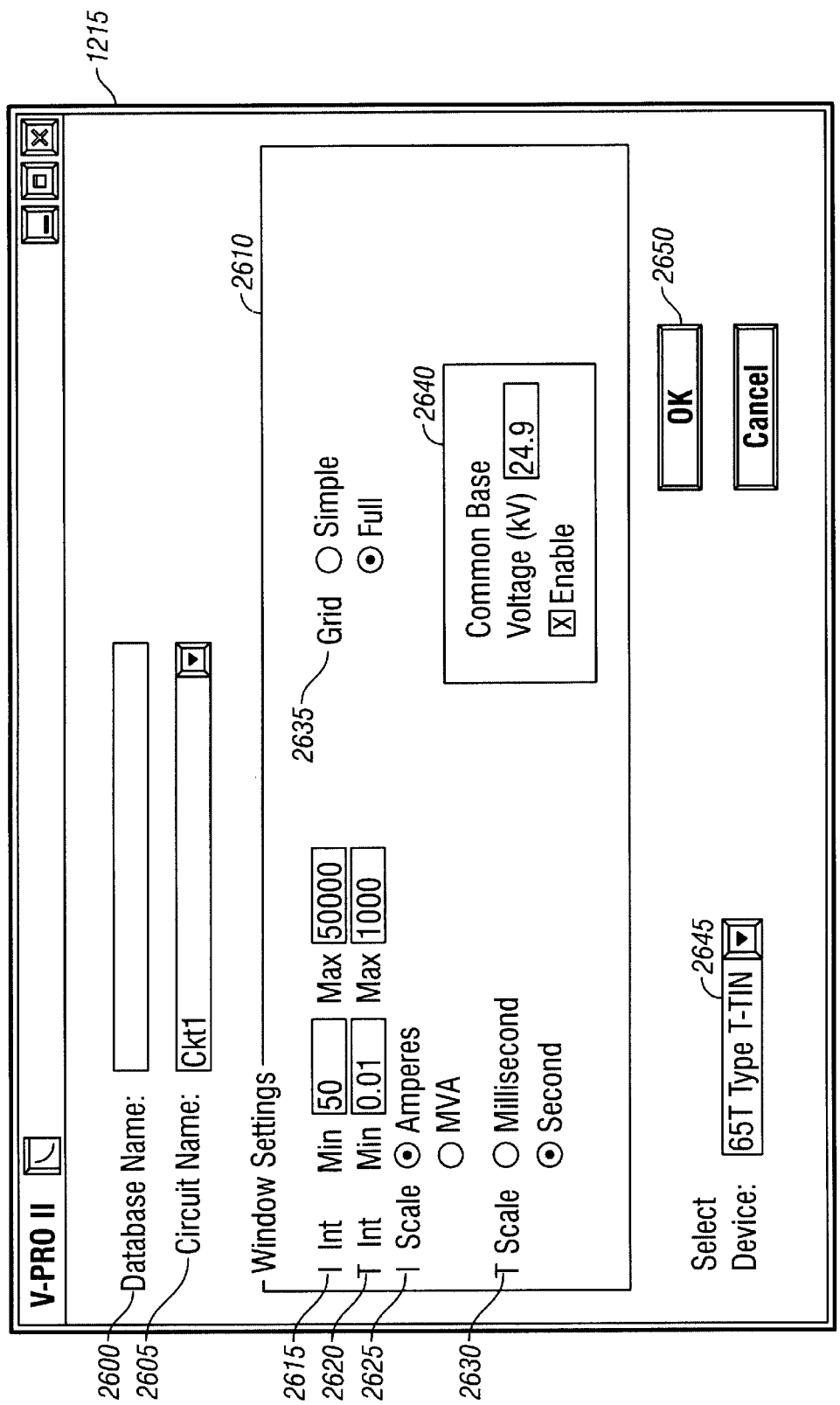
FIG. 26A is a window that is displayed when a protection module is implemented by the optimization system.
Figure 26B:
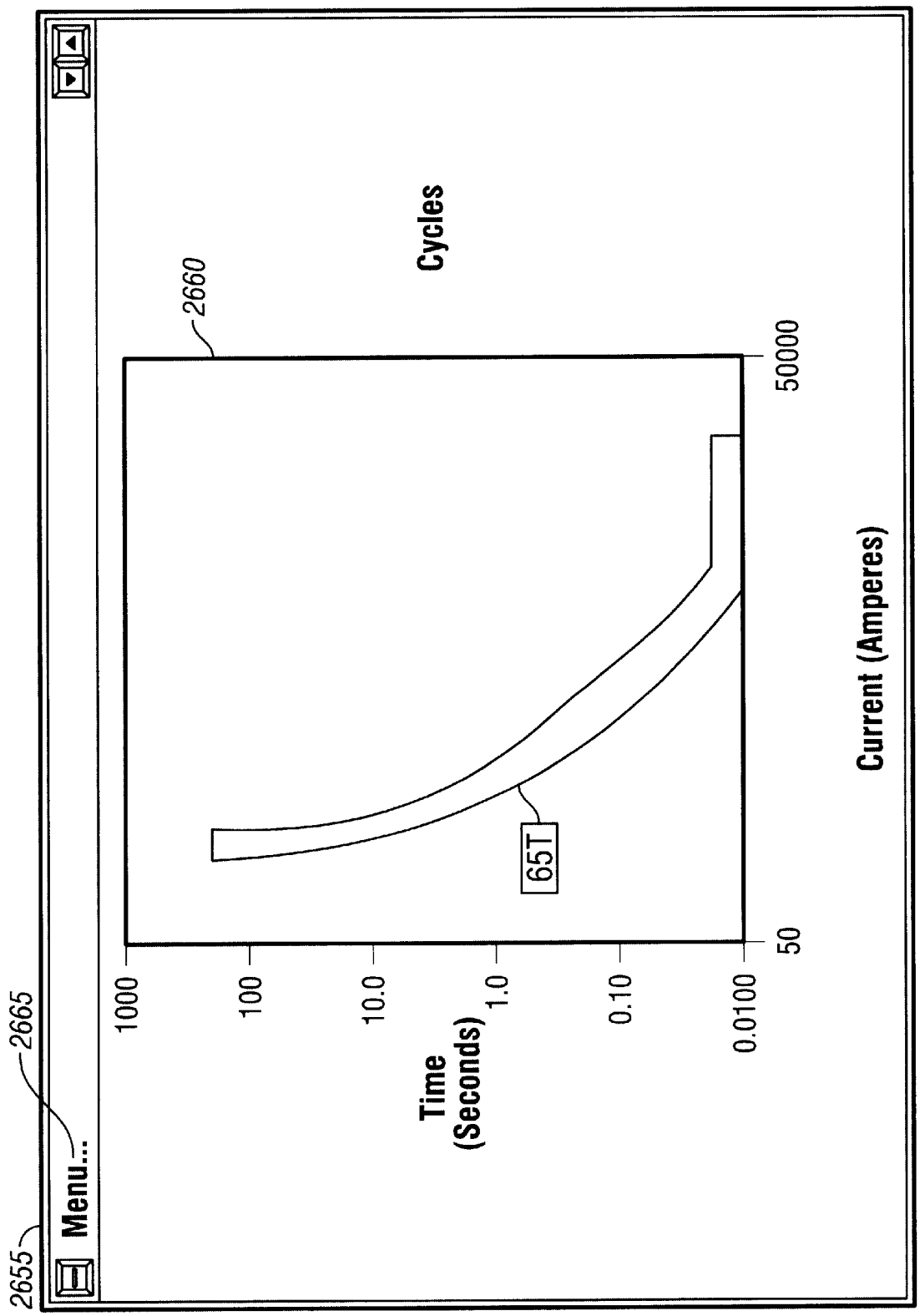
FIG. 26B is a window, displaying a time current characteristic (TCC) curve, that is used during implementation of the protection module.

Referring also to FIG. 26B, once the user enters the information into window 1215, after clicking an OK button 2650, the processor displays the TCC window 2655 in the work space 1105. Within the TCC window 2655, a graph 2660 of time versus current is shown for a selected device, or alternatively, for all devices, in the circuit. For example, in FIG. 26A, the user selected a 65 A type T-TIN fuse, and in FIG. 26B, the TCC curve for that device is graphed.

The TCC window 2655 may include a menu 2665 that allows the user to change options such as axis scale or interval. The menu 2665 may offer many of the options that the application window 1215 provided. The TCC window 2655 is preferably displayed within the one-line diagram circuit in the workspace.

Figure 26C:
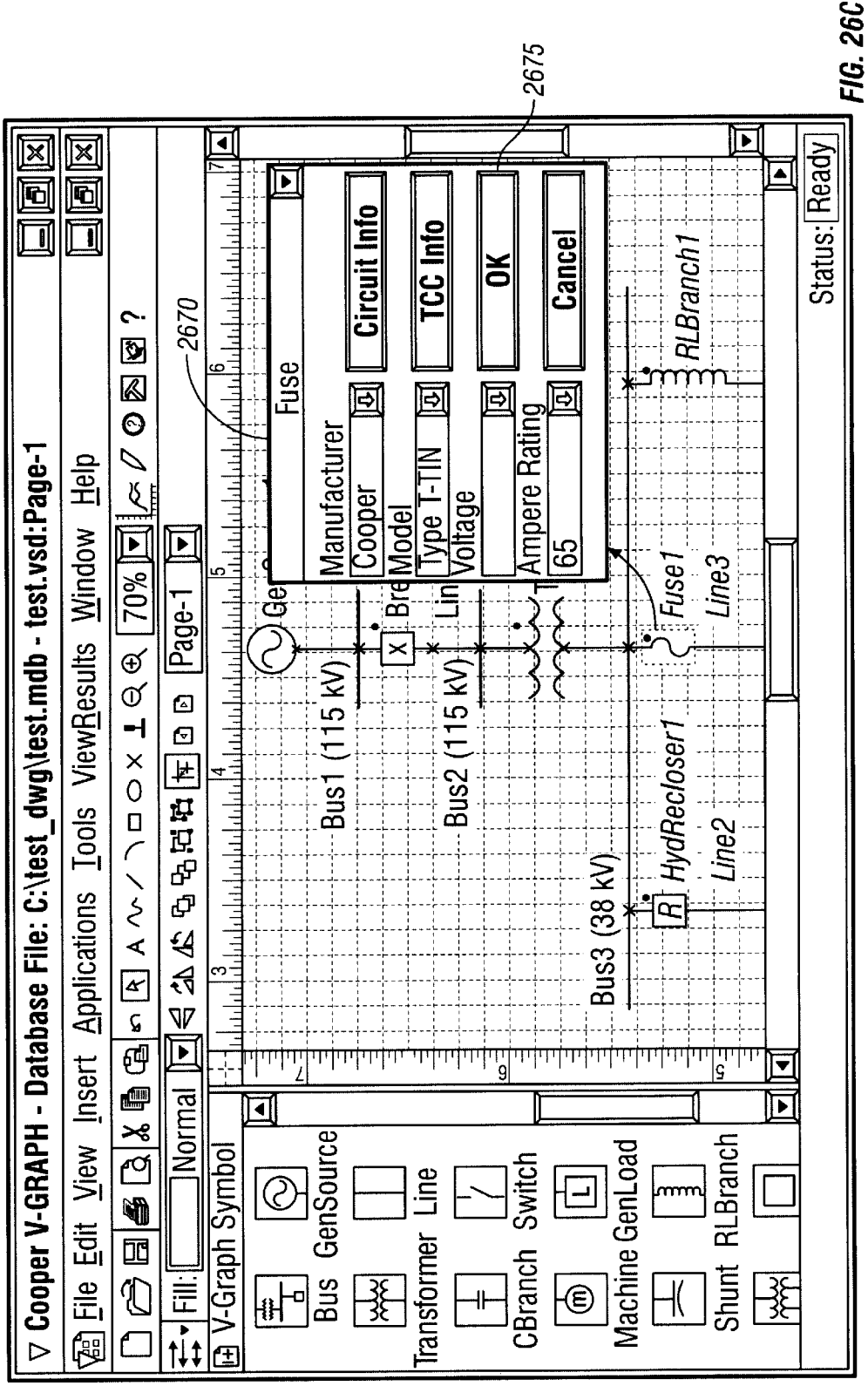
FIG. 26C is a screen shot showing a device window that displays and permits adjustment of device settings.

The user may select a device from the displayed circuit by double clicking on that device. Referring to FIG. 26C, when this occurs, a device window 2670 is opened onto the workspace. The user is able to change, using the device window 2670, settings such as manufacturer, model number, or Ampere rating of the selected device. After the user clicks an OK button 2675 in the device window 2670, the TCC curve for the altered device is displayed while viewing the circuit.

Using the menu 2665, the user is able to manipulate the TCC curve. Therefore, the menu 2665 contains a set of general curve manipulation functions so the user may select virtually any curve criteria.

Figure 27A:
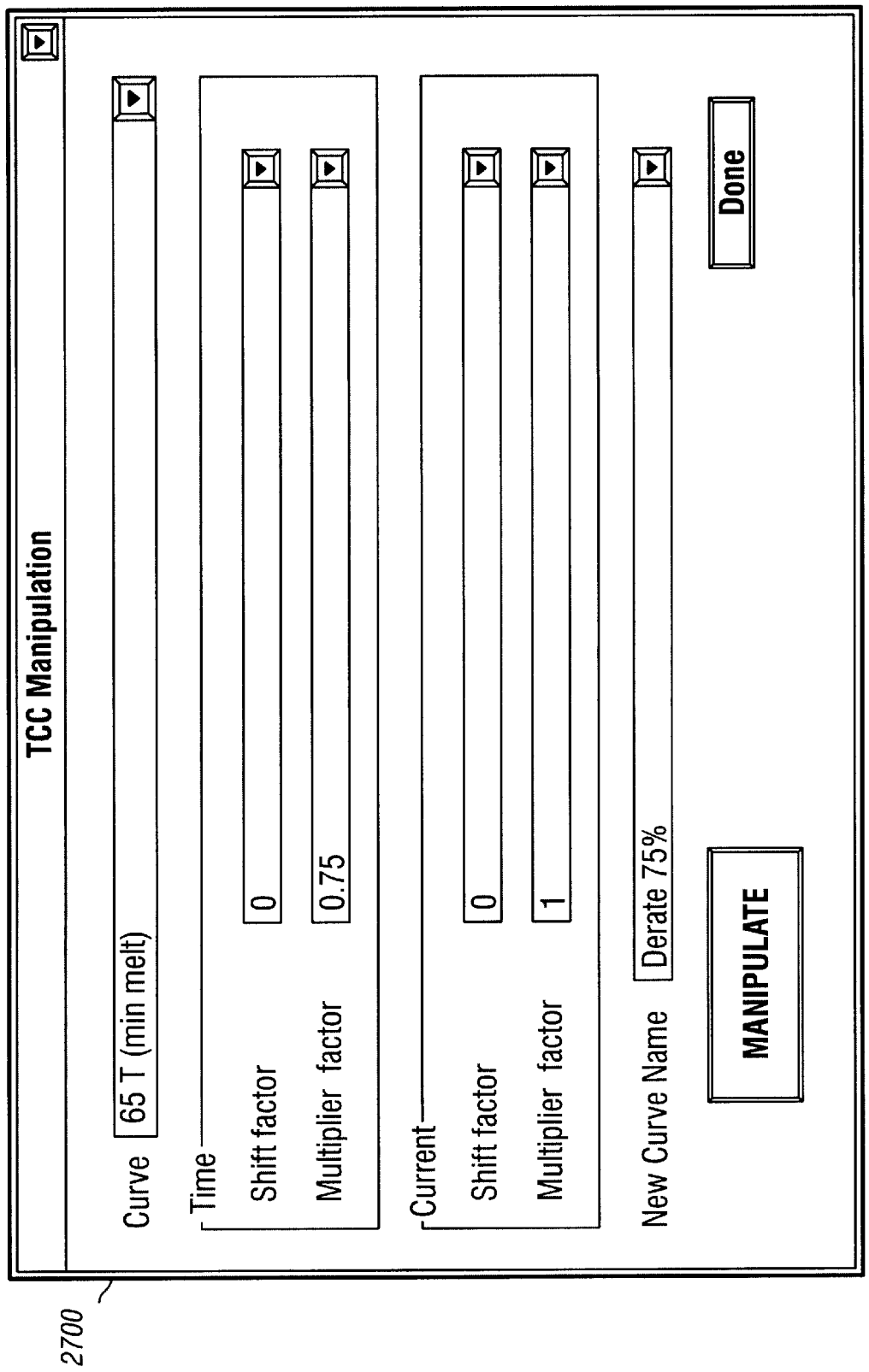
FIG. 27A is a window for manipulating TCC curve settings used during implementation of the protection module.
Figure 27B:
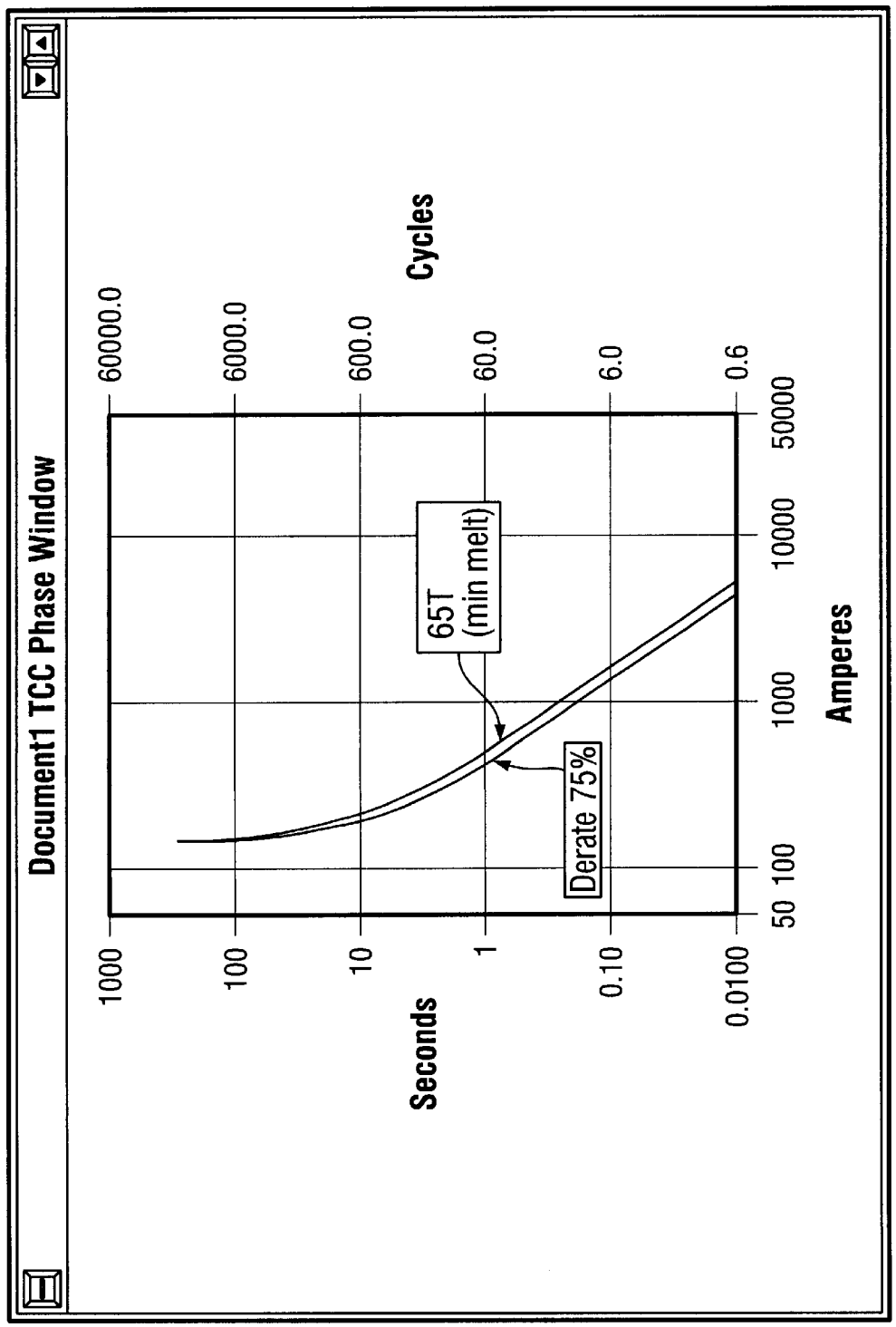
FIG. 27B is a TCC curve in which the settings have been changed using the window of FIG. 27A.

Referring also to FIG. 27A, one basic curve manipulation function enables the user to shift time and/or current to perform various operations (window 2700). For example, the user may shift a fuse minimum melt curve by the coordination margin for fuse to fuse coordination. Or, the user may apply a K-factor to a recloser curve for upstream or downstream fuse coordination. Results of a current shifted by a multiplier factor of 0.75 are shown, for example, in FIG. 27B for a 65T fuse.

Figure 27C:
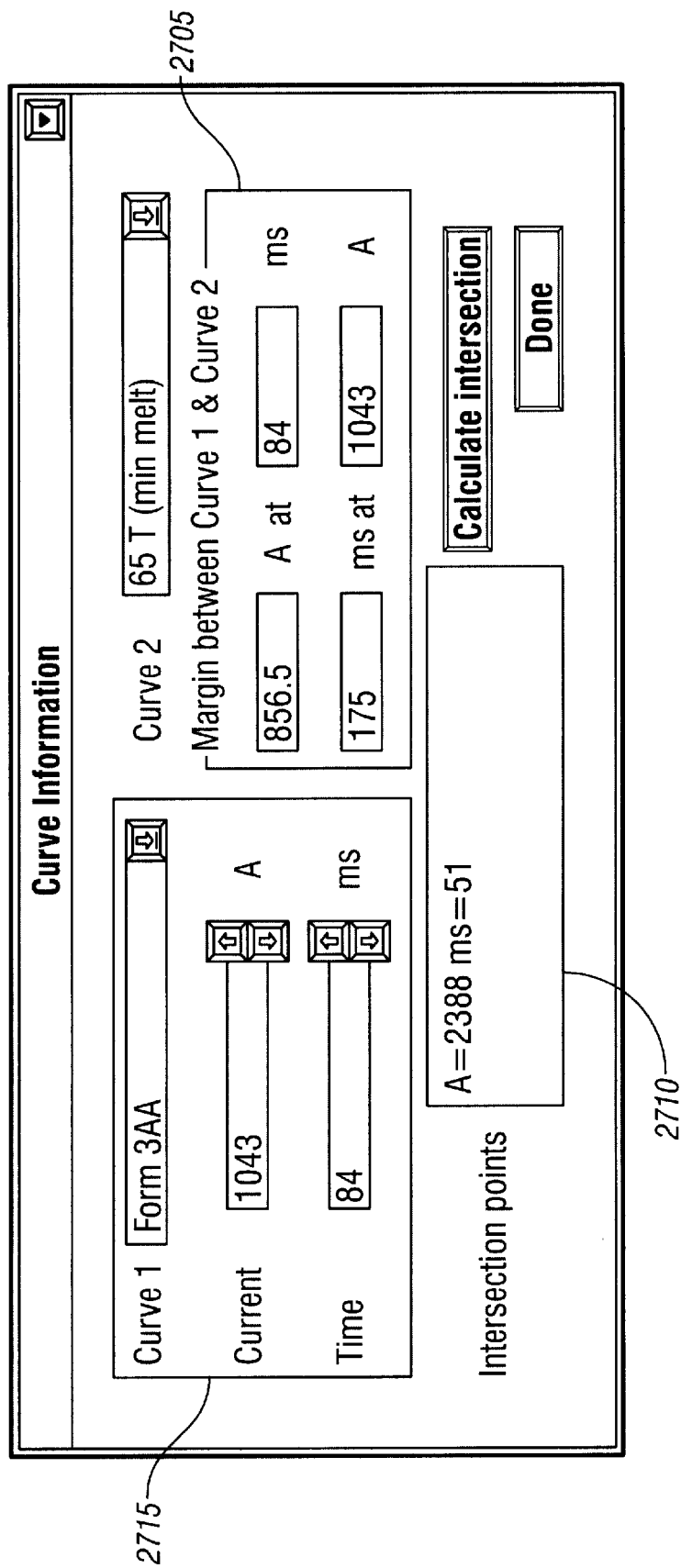
FIG. 27C is a window for checking time margins between two TCC curves.

Referring also to FIG. 27C, a time margin 2705 may be checked between two curves at a given current level to facilitate checking the time difference between two time-current curves. Moreover, intersection points 2710 may be checked to determine the coordinates of an intersection point between two curves. For example, this is useful to determine a maximum current value for temporary coordination between an upstream recloser and a downstream fuse. In box 2715, a constant time (or current) may be added to a curve to add breaker interrupt time to a relay curve, or to identify a maximum fault level that will afford a minimum margin of protection. The desired time margin can be added to a downstream curve and intersection points 2710 may be used to determine a current level yielding actual coordination margin.

Using a coordinate menu item from the menu 2665, the user may be able to obtain a time value for a given current value, or a current value for a given time value to obtain test points for relay settings. Likewise, using an interpolate menu item from the menu 2665, the user may be able to interpolate between two curves to facilitate coordination checks.

Figure 27D:
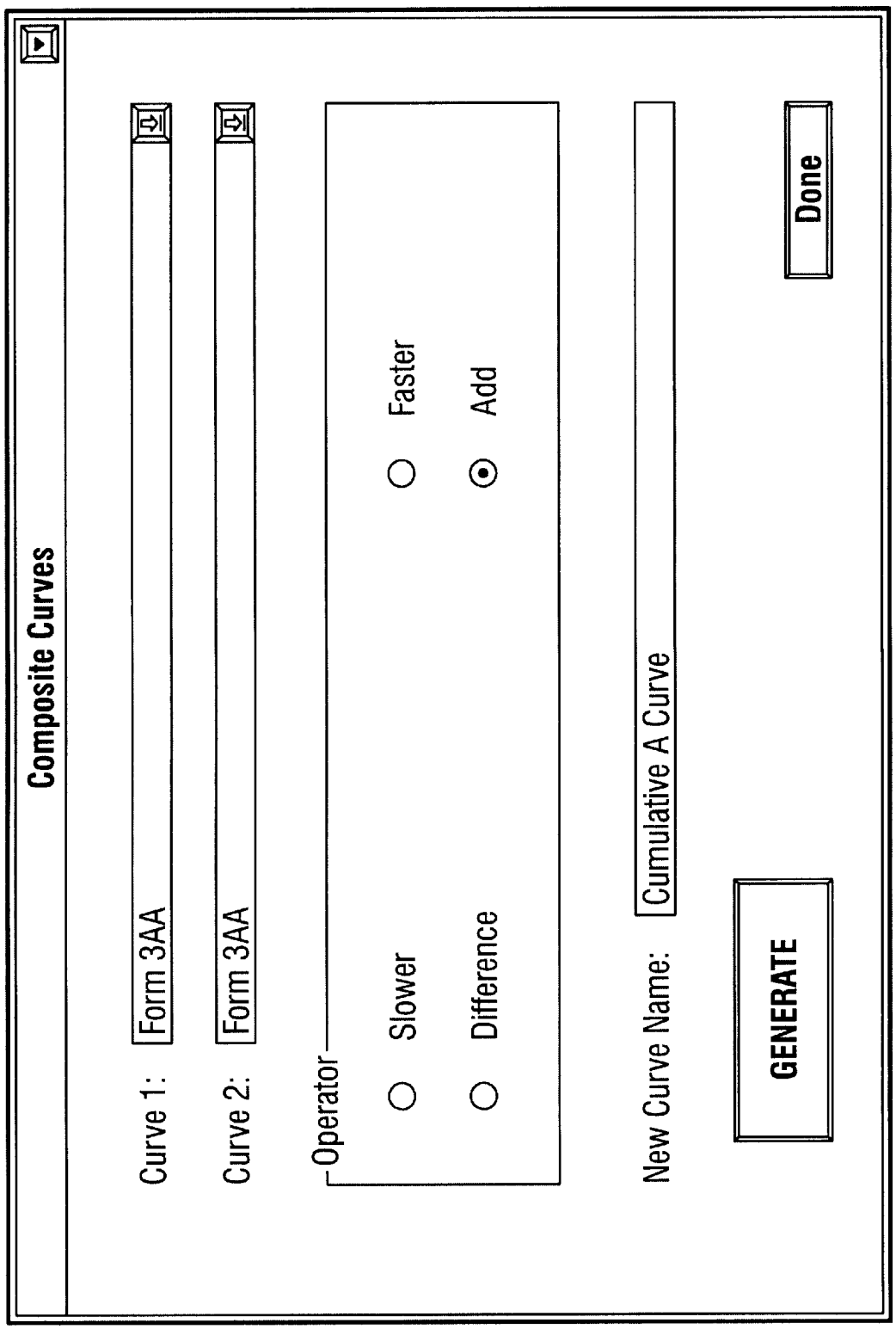
FIG. 27D is a window for building a composite TCC curve.
Figure 27E:
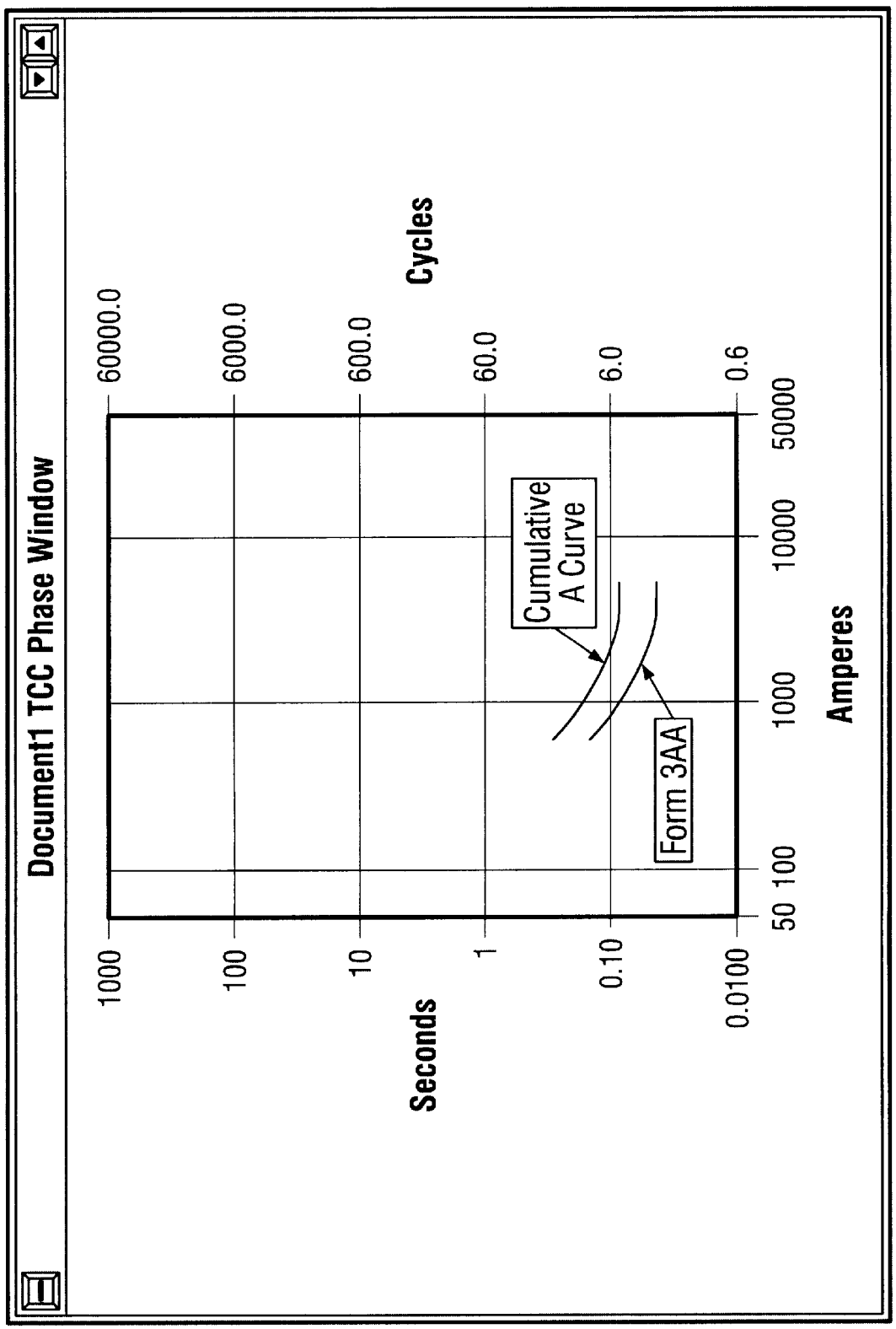
FIG. 27E is an example of a composite TCC curve.

Referring also to FIGS. 27D and 27E, the user may build a composite curve, that is, a new curve that is based on a combination of two curves. The composite curve is useful for forming a composite of phase and ground curves for a relay scheme or an electronic recloser.

The user may also add curves in time to calculate a total accumulated time that a device experiences fault current, if the downstream device is capable of reclosing. A typical application for this function is checking coordination between an upstream relay and a downstream recloser.

By manipulating time-current curves with the above functions, the user can immediately determine a range of coordination between two devices. If coordination is not achieved, the user can copy new curves into memory for another iteration of coordination checking.

Once coordination is completed, labels and colors may be added to the curves along with a single-line diagram. A hard copy of the composite curves than may be produced to provide the user with a permanent record of the coordination scheme.

UNBALANCED LOAD FLOW MODULE

Referring again to FIG. 12E, the unbalanced load flow module (called V-UNBAL) 930 may be invoked by clicking on menu item 1220 in the pull down Application menu 1145 or by clicking on a special V-UNBAL button on the toolbar 1122.

Using V-UNBAL, the processor 825 analyzes existing or proposed electrical distribution systems to determine commonly-monitored system operating characteristics such as bus voltages, branch currents, power flow, and power loss. The processor, under control of the unbalanced load flow module 930, performs essentially the same analysis as it would while under control of the power flow module. However, the processor now models three-phase unbalanced distribution line systems, and uses a more detailed model of the circuit to be analyzed.

CAPACITOR BANK PLACEMENT MODULE

Referring again to FIG. 12E, the capacitor bank placement module 935 (called V-CAP) may be invoked by clicking on menu item 1225 in the pull down Application menu 1145 or by clicking on a special V-CAP button on the toolbar 1122.

Using V-CAP 935, the processor 825 analyzes existing or proposed electrical distribution systems to determine optimum size and location of capacitor banks and voltage regulators to improve the power factor and voltage profile. With the V-CAP module 935, the user may perform voltage-drop, power flow, and loss/economic analyses, in addition to comparing relative costs of alternative solutions.

Capacitor banks, inserted into circuits, adjust the power factor by adding additional capacitance to the circuit and therefore changing the phase angle φ between the current and the voltage. In power distribution systems, voltage and current waveforms are sinusoidal functions of time. Because distribution systems contain capacitors and inductors, the system current may be out of phase with the system voltage. The delivery of power to customers and other loads is maximized when voltage and current are perfectly in phase with each other. The power factor, cos φ, is used to characterize this phase disparity between voltage and current. The optimum power factor for delivery of power to loads is 1, that is cos φ=1 or φ=0° and current and voltage are perfectly in phase. Capacitors are used to correct the power factor of the distribution system. The total capacitance (and thus dollar expenditure) required to make a power factor correction is dependent on the location at which the capacitor is placed in the distribution system. For this reason, optimized selection of capacitor size and location offers a financial benefit to customers and utilities.

Optimized placement and setting of voltage regulating transformers is also important for system reliability. Voltage regulating transformers are used to correct under-voltage or over-voltage conditions on distribution systems.

Figure 28A:
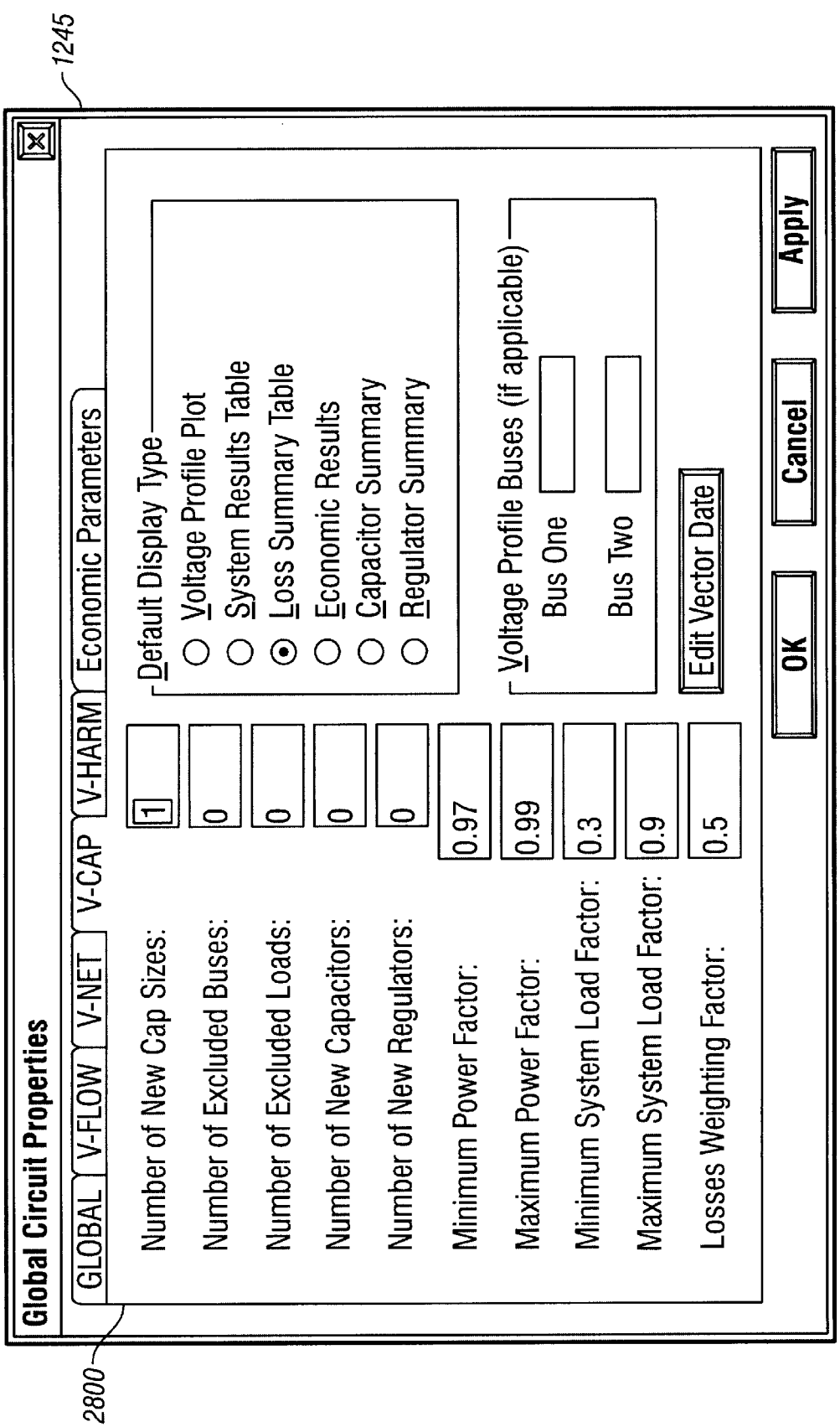
FIG. 28A is a window for setting default parameters for a capacitor bank placement module implemented by the optimization system.

Referring to FIG. 28A, default parameters for the V-CAP analysis module may be set in a V-CAP default window 2800 prior to running V-CAP using the program options window 1245 accessed through the Tools menu 1150 or through a button along the toolbar 1122.

Figure 28B:
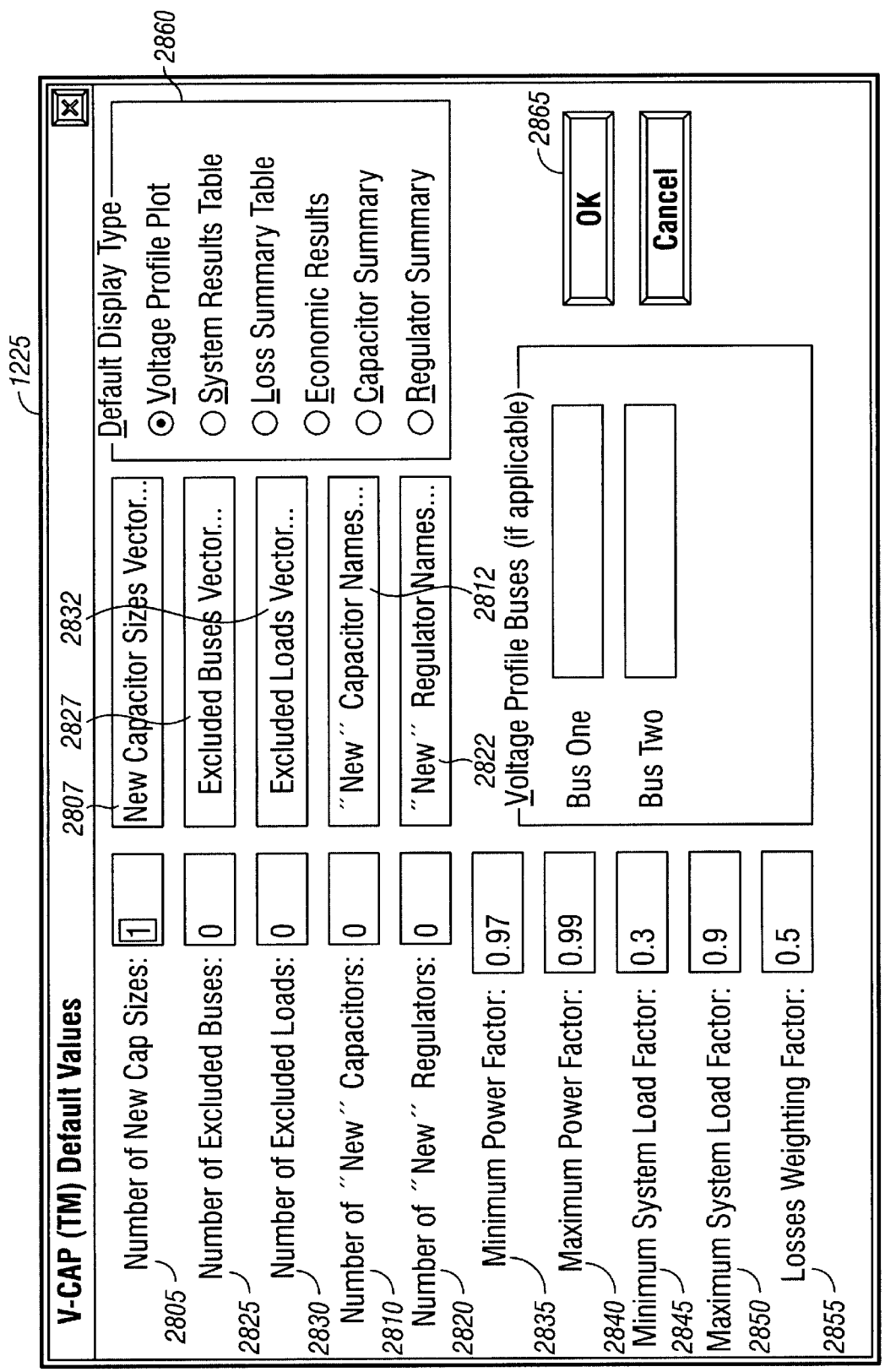
FIG. 28B is a window that is displayed when the capacitor bank placement module is implemented.

Referring also to FIG. 28B, when V-CAP is run, the processor displays in the work space 1105 a V-CAP window 1225 in V-GRAPH. In this window, the user may adjust settings for running the V-CAP module. Using items Number of New Capacitor Sizes 2805 and New Capacitor Sizes Vector 2807, the user specifies, respectively, a number and a list of capacitor bank sizes to use during the optimization process. Using items Number of New Capacitors 2810 and New Capacitor Names 2812, the user specifies, respectively, a number and a list of capacitor device names to be considered as new during an economic analysis.

Using items Number of New Regulators 2820 and New Regulator Names 2822, the user specifies, respectively, a number and a list of regulator device names to be considered as new during the economic analysis. Using items Number of Excluded Buses 2825 and Excluded Buses Vector 2827, the user specifies, respectively, a number and a list of bus names that are not suitable for capacitor installation. Using items Number of Excluded Loads 2830 and Excluded Loads Vector 2832, the user specifies, respectively, a number and a list of load names that should be held constant during the optimization process.

Using items Minimum Power Factor 2835, Maximum Power Factor 2840, Minimum Load Factor 2845, and Maximum Load Factor 2850, the user can set these factors for the selected circuit. Furthermore, the user uses item Losses Weighting Factor 2855 to set a weighting factor for the optimization process between loss reduction and voltage improvement. A Display Type window 2860 enables the user to choose a method of displaying the results of running the capacitor bank placement module.

Figure 29A:
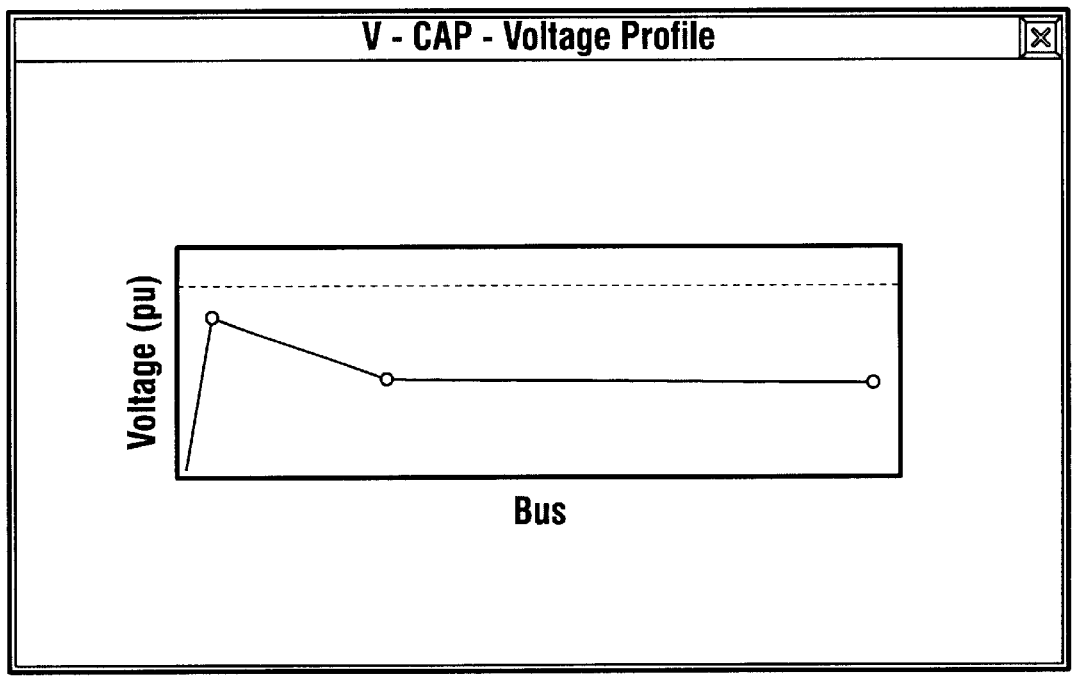
FIGS. 29A and 29B are graphs of voltage profiles for, respectively, an originally-designed circuit and a circuit in which the capacitor setup has been changed.
Figure 29B:
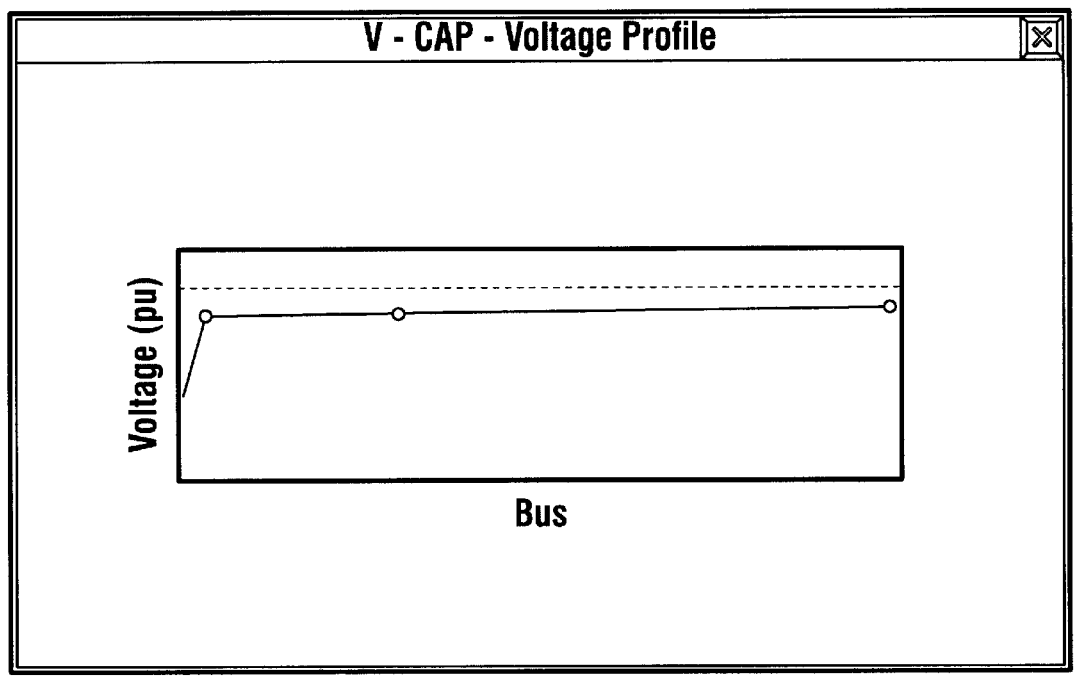

After clicking an OK button 2865, the processor, under control of the capacitor bank placement module, automatically determines optimum capacitor locations, sizes, and switching levels. If the user selects to view a Voltage Profile Plot, in the Display Type window 2860, that plot is displayed to the user for the original circuit (FIG. 29A) and for the adjusted circuit (FIG. 29B). The voltage profile plot may display all phases in the circuit. The voltage profile plot is a graph of voltage relative to bus location.

Figure 30A:
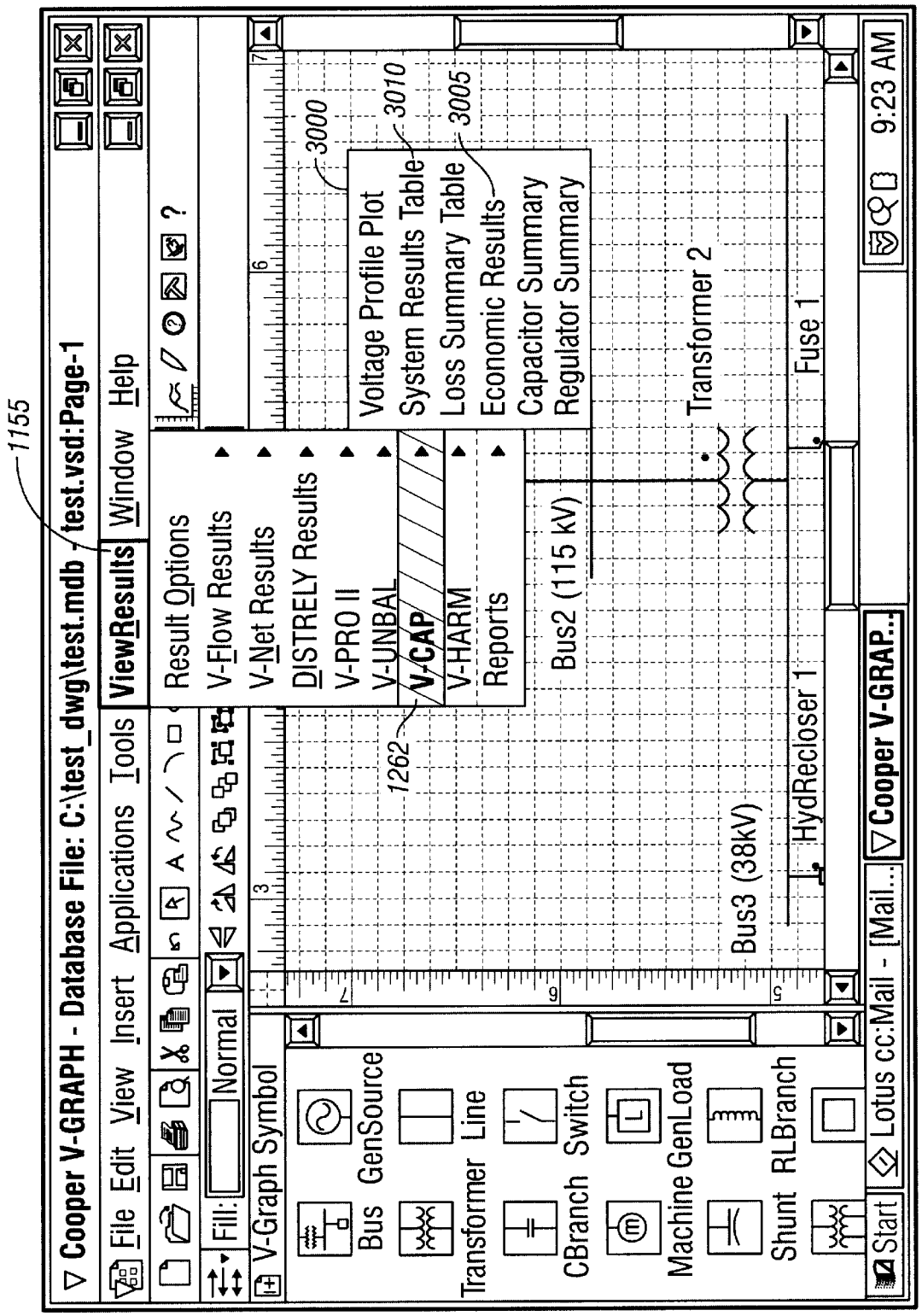
FIG. 30A is a screen shot of menu items for displaying results of the capacitor bank placement module implementation.

Referring also to FIG. 30A, using menu item V-CAP 1262 selected from the View Results 1155 pull down menu the user may display other capacitor bank analysis results by selecting an item from window 3000. For example, when the user selects an Economics Results item 3005, a window 3005 (shown in FIG. 30B) opens and displays, in tabular form, an economic summary for the adjusted circuit relative to a base circuit. As another example, when the user selects a System Results Table item 3010, a window 3010 (shown in FIG. 30C) opens and displays, in tabular form, a general results summary for the adjusted circuit.

HARMONICS MODULE

Referring again to FIG. 12E, the harmonics module 937 (called V-HARM) may be invoked by clicking on menu item 1230 in the pull down Application menu 1145 or by clicking on a special V-HARM button on the toolbar 1122. Using V-HARM 937, the processor 825 analyzes existing or proposed electrical distribution systems to calculate steady-state harmonic frequency levels throughout the system.

Harmonic frequency components are sinusoidal voltage components which occur at integer multiples of the base frequency. For example, if the generator frequency is 60 Hz, harmonic frequencies include 120 Hz, 180 Hz, and 240 Hz. Harmonic frequency components cause heating in transformers and motors without providing delivered power. Harmonic frequency components also cause electromagnetic interference with telephones and other communication equipment.

It is of financial concern to electrical distributors to know the extent to which harmonic frequency components are present on their systems. The reliability optimizing system 800 allows users to predict the propagation of harmonic frequency components on power systems, and provide functionality for optimized design and placement of electrical power filters for the elimination of frequency harmonics.

Other embodiments are within the scope of the claims.

What is claimed is:

1. A computer-implemented system for use in improving reliability of an electrical distribution network, the system comprising:
    a storage device configured to store different configurations of the distribution network, data corresponding to elements of the distribution network, and a set of engineering analysis modules; and
    a processor configured to:
        display a graphical user interface (GUI),
        use the GUI to prompt a user to answer one or more questions about the distribution network,
        receive answers from the user,
        retrieve data corresponding to elements of the distribution network,
        automatically select and run one or more of the engineering analysis modules based on the received answers, and
        automatically perform a reliability analysis of the distribution network based on the retrieved data.

2. The system of claim 1, wherein performing the reliability analysis comprises running one or more of the engineering analysis modules.

3. The system of claim 1, wherein the set of engineering analysis modules comprises:
- a reliability module that causes the processor to compute distribution network reliability indices,
- a power flow module that causes the processor to compute load or power flow for three-phase balanced distribution networks,
- a short circuit module that causes the processor to analyze currents and voltages in the distribution network for short circuit situations,
- a protection module that causes the processor to coordinate action of overcurrent devices in the distribution network,
- an unbalanced load flow module that causes the processor to compute load or power flow for three-phase unbalanced distribution networks,
- a capacitor bank placement module that causes the processor to determine size and location of capacitor banks or voltage regulators, and
- a harmonics module that causes the processor to calculate steady-state harmonic frequency levels throughout the distribution network.

4. The system of claim 1, further comprising an external database associated with a utility company that supports the electrical distribution network.

5. The system of claim 4, wherein the processor is configured to select and run an engineering analysis module included in the external database.

6. The system of claim 1, wherein the processor is configured to display a visual representation of the distribution network.

7. The system of claim 6, wherein the visual representation comprises a one-line circuit diagram.

8. The system of claim 6, wherein the processor is configured to display commands and tools that enable the user to manipulate the visual representation.

9. The system of claim 1, wherein the processor is configured to display results of the reliability analysis.

10. A computer-implemented system for use in improving reliability of an electrical distribution network, the system comprising:
- a storage device configured to store different configurations of the distribution network, data corresponding to elements of the distribution network, and a set of engineering analysis modules; and
- a controller configured to:
  - display a graphical user interface (GUI),
  - receive data from a user, the user data including an engineering analysis module selection,
  - retrieve data corresponding to elements of the distribution network,
  - access one or more engineering analysis modules based on the engineering analysis module selection,
  - based on received user data and retrieved distribution network data, compute reliability indices of the distribution network to improve distribution network reliability,
  - based on received user data and retrieved distribution network data, pose hypothetical situations to the user, and
  - determine a distribution network design that improves reliability based on one or more user responses to the hypothetical situations.

11. The system of claim 10, further comprising an expert system that causes the controller to prompt the user to answer one or more questions about the distribution network, and automatically selects and runs one or more of the engineering analysis modules based on received answers.

12. The system of claim 10, wherein the set of engineering analysis modules comprises:
- a reliability module that causes the controller to compute distribution network reliability indices,
- a power flow module that causes the controller to compute load or power flow for three-phase balanced distribution networks,
- a short circuit module that causes the controller to analyze currents and voltages in the distribution network for short circuit situations,
- a protection module that causes the controller to coordinate action of overcurrent devices in the distribution network,
- an unbalanced load flow module that causes the controller to compute load or power flow for three-phase unbalanced distribution networks,
- a capacitor bank placement module that causes the controller to determine size and location of capacitor banks or voltage regulators, and
- a harmonics module that causes the controller to calculate steady-state harmonic frequency levels throughout the distribution network.

13. The system of claim 10, further comprising an external database associated with a utility company that supports the electrical distribution network.

14. The system of claim 13, wherein the controller is configured to select and run an engineering analysis module included in the external database.

15. The system of claim 10, wherein the controller is configured to display a visual representation of the distribution network.

16. The system of claim 15, wherein the visual representation comprises a one-line circuit diagram.

17. The system of claim 15, wherein the controller is configured to display commands and tools that enable the user to manipulate the visual representation.

18. The system of claim 10, wherein the controller is configured to display results of the computed reliability indices and the determined distribution network design that improves reliability.

19. The system of claim 10, wherein a reliability index comprises a frequency of outages in the distribution network.

20. The system of claim 10, wherein a reliability index comprises a duration of outages in the distribution network.

21. The system of claim 10, wherein the reliability indices comprise standard indices recommended by the Institute of Electrical and Electronics Engineers (IEEE).

* * * * *